(12) United States Patent
Furukawa

(10) Patent No.: US 6,970,593 B2
(45) Date of Patent: Nov. 29, 2005

(54) STEREO IMAGE PROCESSING APPARATUS AND METHOD OF PROCESSING STEREO IMAGE

(75) Inventor: Hisao Furukawa, Tokyo (JP)

(73) Assignee: NEC Corporation, Tokyo (JP)

( * ) Notice: Subject to any disclaimer, the term of this patent is extended or adjusted under 35 U.S.C. 154(b) by 649 days.

(21) Appl. No.: 09/986,358

(22) Filed: Nov. 8, 2001

(65) Prior Publication Data

US 2002/0061132 A1 May 23, 2002

(30) Foreign Application Priority Data

Nov. 22, 2000 (JP) .............................. 2000-355126

(51) Int. Cl.[7] .............................................. G06K 9/00
(52) U.S. Cl. ...................... 382/154; 382/109; 382/113; 382/168; 382/170; 382/172; 382/254; 382/294
(58) Field of Search ...................... 382/109, 113, 154, 382/168, 170, 172, 254, 284, 294; 345/419, 345/427; 348/42, 47; 701/208

(56) References Cited

U.S. PATENT DOCUMENTS

| | | | | |
|---|---|---|---|---|
| 4,984,279 | A | * | 1/1991 | Kidney et al. ............... 382/113 |
| 5,864,632 | A | * | 1/1999 | Ogawa et al. ............... 382/113 |
| 5,995,681 | A | * | 11/1999 | Lee et al. .................... 382/293 |
| 6,470,265 | B1 | | 10/2002 | Tanaka |
| 6,587,601 | B1 | * | 7/2003 | Hsu et al. .................... 382/294 |

FOREIGN PATENT DOCUMENTS

| JP | 3-167678 | 7/1991 |
|---|---|---|
| JP | 8-16930 | 2/1996 |
| JP | 11-184375 A | 7/1999 |
| JP | 11-248446 A | 9/1999 |
| JP | 11-328378 A | 11/1999 |
| JP | 11-339074 A | 12/1999 |
| JP | 2000-105814 A | 4/2000 |

OTHER PUBLICATIONS

N. Haala et al., "Acquisition of 3D urban models by analysis of aerial images, digital surface models and existing 2D building information," Proceedings of the SPIE, 1997, vol. 3115, pp. 212-222, XP-002106026.

N. Paparoditis, "Building Detection and Reconstruction from Mid- and High-Resolution Aerial Imagery," Computer Vision and Image Understanding, vol. 72, No. 2, 1998, pp. 122-142, XP-004448833.

(Continued)

Primary Examiner—Bhavesh M. Mehta
Assistant Examiner—John Strege
(74) Attorney, Agent, or Firm—Foley & Lardner LLP

(57) ABSTRACT

To provide a stereo image processing device enabling sufficiently accurate three-dimensional data to be obtained from satellite stereo images and aerial stereo images automatically with no involvement of operators and for complicated objects such as buildings in urban areas. A satellite image storing unit stores satellite image data. A stereo processing unit subjects satellite image data obtained from the satellite image storing unit to stereo matching processing to generate three-dimensional data. A DEM data automatic correcting unit uses information of external shape of buildings and the like obtained from map data in a map data storing unit to correct automatically erroneous data such as noises and losses in the three-dimensional data obtained with the stereo processing unit. The map data storing unit provides map data such as external shapes of buildings and the like to the DEM data automatically correcting unit.

18 Claims, 46 Drawing Sheets

OTHER PUBLICATIONS

M. Roux, "Cooperative analysis of maps and aerial images for urban scene description," Proceedings of the SPIE, vol. 3217, 1997, pp. 254-267, XP-002106025.

*Image Analysis Handbook* (Edited by Mikio Takagi and Hirohisa Simoda), Tokyo Univ. Press, Jan. 1991, pp. 597-599.

* cited by examiner

DEM DATA VALUE

DEM DATA VALUE

DEM DATA VALUE

FIG. 11

| 1 | 1 | 1 | 1 | 1 | 1 | 4 | 4 | 5 | 5 | 5 | 5 |
|---|---|---|---|---|---|---|---|---|---|---|---|
| 1 | 1 | 1 | 4 | 4 | 4 | 4 | 5 | 5 | 5 | 5 | 5 |
| 1 | 4 | 4 | 4 | 5 | 5 | 5 | 5 | 5 | 5 | 6 | 6 |
| 4 | 4 | 5 | 5 | 5 | 5 | 6 | 8 | 8 | 6 | 8 | 8 |
| 4 | 5 | 5 | 5 | 5 | 5 | 6 | 8 | 6 | 7 | 8 | 8 |
| 5 | 5 | 5 | 5 | 5 | 5 | 5 | 6 | 7 | 8 | 8 | 8 |
| 5 | 5 | 5 | 5 | 5 | 5 | 6 | 7 | 8 | 8 | 8 | 8 |
| 5 | 5 | 5 | 5 | 5 | 5 | 6 | 8 | 8 | 8 | 8 | 8 |

FIG. 13

| 1 | 1 | 1 | 1 | 1 | 1 | A | A | A | A | A | A |
|---|---|---|---|---|---|---|---|---|---|---|---|
| 1 | 1 | 1 | A | A | A | A | A | A | A | A | A |
| 1 | A | A | A | A | A | A | A | A | A | A | A |
| A | A | A | A | A | A | A | A | A | A | B | B |
| A | A | A | A | A | A | A | A | A | B | B | B |
| A | A | A | A | A | A | A | A | B | B | B | B |
| A | A | A | A | A | A | A | B | B | B | B | B |
| A | A | A | A | A | A | A | B | B | B | B | B |

FIG. 15

| A | A | A | A | A | A | A | A | A | A | A | A |
|---|---|---|---|---|---|---|---|---|---|---|---|
| A | A | A | A | A | A | A | A | A | A | A | A |
| A | A | A | A | A | A | A | A | A | A | A | A |
| A | A | A | A | A | A | A | A | A | A | B | B |
| A | A | A | A | A | A | A | A | A | B | B | B |
| A | A | A | A | A | A | A | A | B | B | B | B |
| A | A | A | A | A | A | A | B | B | B | B | B |
| A | A | A | A | A | A | A | B | B | B | B | B |

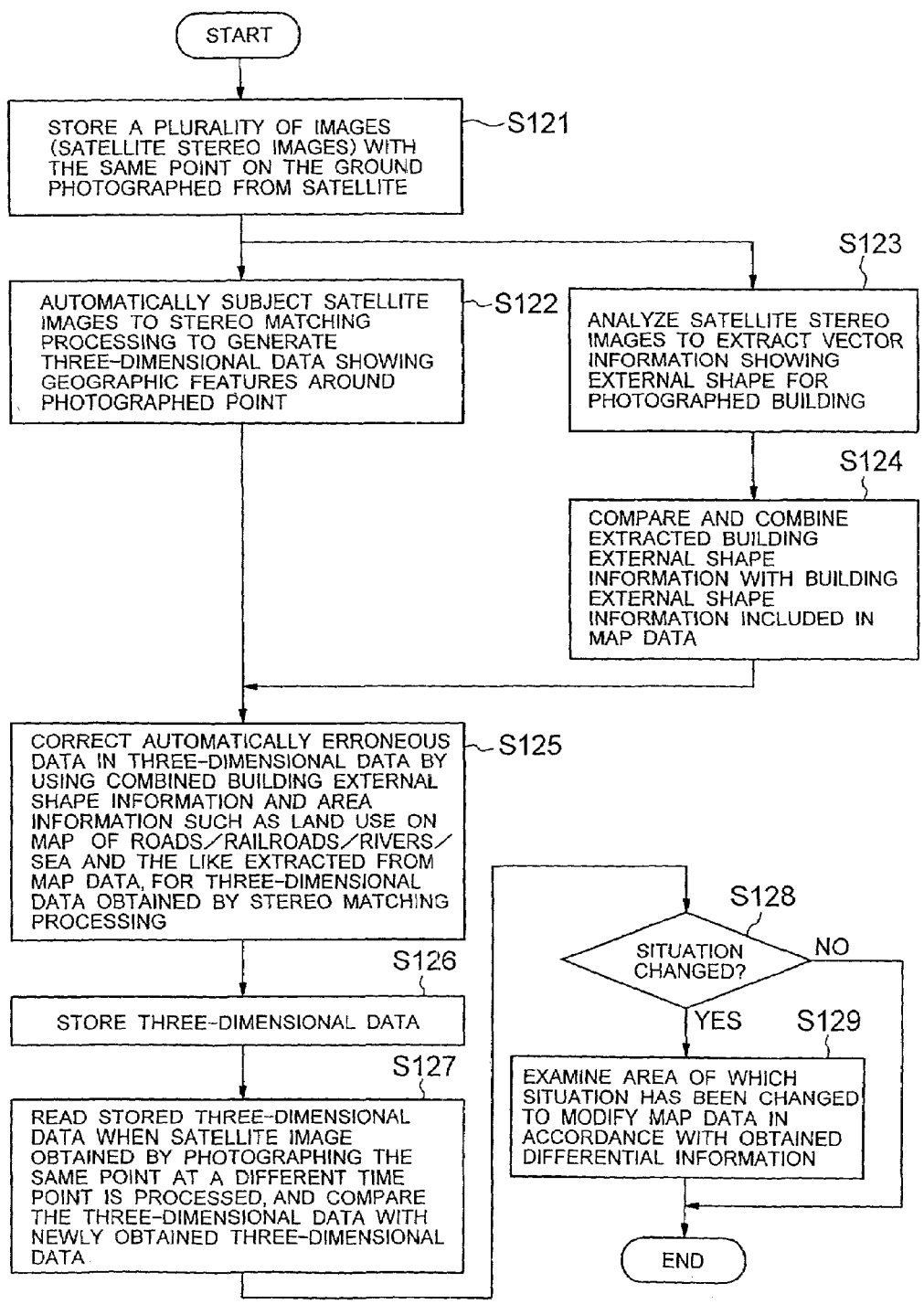

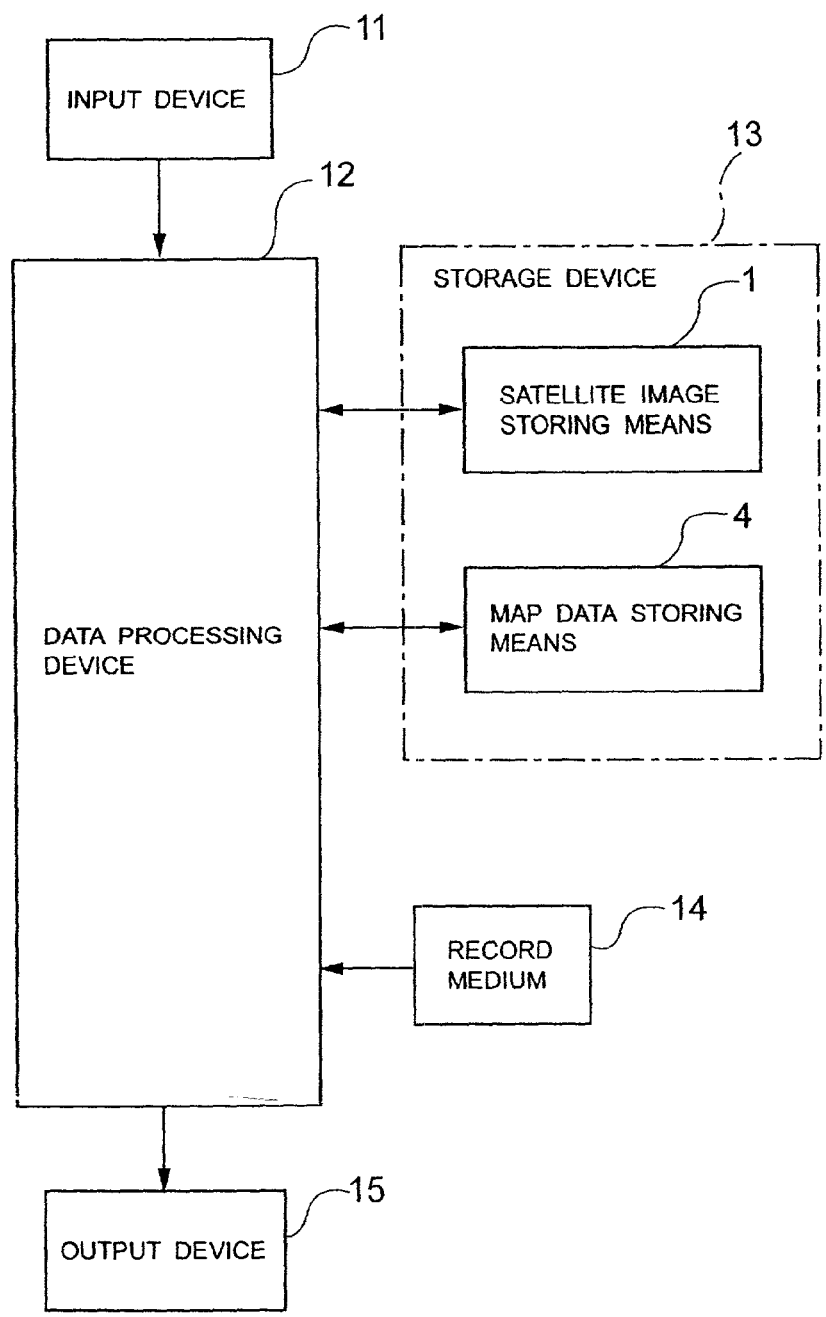

STEREO IMAGE PROCESSING APPARATUS AND METHOD OF PROCESSING STEREO IMAGE

BACKGROUND OF THE INVENTION

1. Field of the Invention

The present invention relates to a stereo image processing apparatus and a stereo image processing method, and a recording medium in which a program for processing stereo image is recorded, and particularly relates to a method of automatically generating three-dimensional data from satellite stereo image or aerial stereo image.

2. Description of the Prior Art

Conventionally, in this type of method of automatically generating three-dimensional data, methods of generating three-dimensional data indicative of geographical features [DEM (Digital Elevation Map) Data] by stereo matching based on images obtained from an artificial satellite and aircraft are widely used, and methods in which operators are involved in correcting points for which correspondence cannot be obtained have also been proposed.

Here, the stereo matching processing is to determine corresponding points in images having the same point imaged therein, for two images obtained by photographing an object from different viewpoints, namely stereo images, and, by using their parallax to determine the depth dimension and form up to the target according to the principle of triangulation technique.

A various methodologies have already been proposed for this stereo matching processing. For example, Japanese Patent Publication No. 8-16930 specification discloses a methodology of using an area correlation method that is widely used in general. This area correlation method is a method in which a correlation window is set in the left image as a template, a search window in the right image is moved to calculate a mutual coefficient of correlation with the template, and a point with a high coefficient is searched with this coefficient considered as a matching degree, thereby obtaining a corresponding point.

In the method described above, the range in which the search is moved is limited to the direction of epipolar lines in the image for alleviating processing, whereby the magnitude of displacement in the x direction of the corresponding point in the right image, namely a parallax can be obtained for each point in the left image. Here, the epipolar line is a line that can be drawn, for a point in one image of stereo images, as a range in which a point corresponding to such a point in the other image exists. The epipolar line is described in "Image Analysis Handbook" (edited by Mikio Takagi and Hirohisa Simoda, Tokyo Univ. Press, Jan. 1991, pp 597–599).

The direction of epipolar lines is usually different from the direction of scan lines in the image, but coordinate transformation is performed, whereby the direction of epipolar lines can be made to match with the direction of scan lines to make rearrangement. The method of coordinate transformation is described in the above described "Image Analysis Handbook".

In the stereo image rearranged as described above, the range in which the search window of the corresponding point is moved can be restricted on the scan line, and thus the parallax is obtained as a difference in x coordinates between corresponding points in the left and right images.

In FIG. 5 is shown an example of two satellite images obtained by stereo-photographing the same point from different viewpoints. Furthermore, for the satellite image, usually a rather wide range of area is photographed, but for simplifying description, the image is shown with apart thereof magnified, and several buildings are seen around the roads intersecting each other in the center of the image.

When comparing the left and right images in two satellite images obtained by stereo-photographing an object, the rooftop surfaces of buildings are imaged in the positions displaced depending on their respective heights, while the position of a road is substantially the same in both images. For example, a building a in the left image shown in FIG. 5 corresponds to a building b in the right image, but this building b drawn in the same position in the left image corresponds to a building b'. For the rooftop surfaces of these buildings a and b', the magnitude of displacement c in each x coordinate is a parallax.

When the parallax obtained through the above described processing is visualized as a pixel value, the image is dark for the ground surface of a road with no parallax, while the image is bright depending on the height of the building for the rooftop of the building, as shown in FIG. 6A. Cross sections of those buildings with pixel values showing parallaxes (DEM data values showing heights) in the dot line in FIG. 6A plotted on the longitudinal axis are shown in FIG. 6B. Height information corresponding to a structure on the rooftop of the building can be obtained from FIG. 6B. If information of imaging points and visual angles obtained from these images are used, the height per pixel for parallax can be known, and thus three-dimensional data showing geographical features around the photographed point is obtained from the above described image.

For methods of generating three-dimensional data by conventional stereo matching, however, since areas with no textures and areas in which correspondence by coefficients of correlation cannot be obtained are also included, a large number of points indicating erroneous heights that are very different from surroundings are included in the image of the above described three-dimensional data. Particularly, since hiding occurs around a building and so oil, the number of points for which correspondence cannot be obtained may become large, which may result in cases where extremely high values are shown, or the building is significantly damaged.

Thus, for methods of generating three-dimensional data by conventional stereo matching, errors due to mismatching of corresponding points are caused, and accurate three-dimensional information cannot be obtained, thus raising a disadvantage that application to complicated images with a large number of buildings such as those of urban areas is difficult.

Also, because a satellite image or aerial photograph has usually enormous amounts of image data, there is also a disadvantage that modification operations by operators are difficult and complicated. In view of these problems, a method of generating and processing three-dimensional data by which sufficiently accurate information can be obtained even from images of urban areas and processing can be performed automatically is desired.

SUMMARY OF THE INVENTION

Hence, an object of the present invention is to solve the above described problems and provide a stereo image processing apparatus and stereo image processing method and a program for processing stereo images, by which sufficiently accurate three-dimensional data can be obtained from satellite stereo images and aerial stereo images with no intervention by operators and for complicated objects such as buildings in urban areas.

A first stereo image processing apparatus according to the present invention is a stereo image processing apparatus subjecting image data obtained from a flying object to stereo matching processing to generate three-dimensional data, said apparatus comprising:

data correcting means for correcting erroneous data to be corrected including at least noises and losses in said three-dimensional data by using at least information of external shape of buildings obtained from map data including said information of external shape.

A second stereo image processing apparatus according to the present invention is a stereo image processing apparatus subjecting image data obtained from a flying object to stereo matching processing to generate three-dimensional data, said apparatus comprising:

area information extracting means for extracting at least area information of land use on the map of roads/railroads/rivers/sea from map data including at least information of external shape of buildings; and data correcting means for correcting erroneous data to be corrected including at least noises and losses in said three-dimensional data by using the area information from said area information extracting means.

A third stereo image processing apparatus according to the present invention is a stereo image processing apparatus subjecting image data obtained from a flying object to stereo matching processing to generate three-dimensional data, said apparatus comprising:

building external shape information detecting means for analyzing said image data to extract information of external shape of buildings; and data correcting means for correcting erroneous data to be corrected including at least noises and losses in said three-dimensional data by using the information of external shape of buildings obtained from said building external shape information detecting means.

A fourth stereo image processing apparatus according to the present invention is a stereo image processing apparatus subjecting image data obtained from a flying object to stereo matching processing to generate three-dimensional data, said apparatus comprising:

building external shape information detecting means for analyzing said image data to extract information of external shape of buildings;

building external shape information comparing/combining means for comparing and combining the external shape information obtained from map data including at least information of external shape of buildings with the external shape information extracted from said building external shape information detecting means; and data correcting means for correcting erroneous data to be corrected including at least noises and losses in said three-dimensional data by using the combined information from said building external shape information comparing/combining means.

A fifth stereo image processing apparatus according to the present invention is a stereo image processing apparatus subjecting image data obtained from a flying object to stereo matching processing to generate three-dimensional data, said apparatus comprising:

area information extracting means for extracting at least area information of land use on the map of roads/railroads/rivers/sea from map data including at least information of external shape of buildings;

building external shape information detecting means for analyzing said image data to extract information of external shape of buildings;

building external shape information comparing/combining means for comparing and combining the information of external shape of buildings obtained from said map data with the information of external shape of buildings extracted by said building external shape information detecting means; and data correcting means for correcting erroneous data to be corrected including at least noises and losses in said three-dimensional data by using the combined information from said building external shape information comparing/combining means.

A first method of processing stereo images according to the present invention is a method of processing stereo images in which image data obtained from a flying object is subjected to stereo matching processing to generate three-dimensional data, said method comprising:

a step of correcting erroneous data to be corrected including at least noises and losses in said three-dimensional data by using at least information of external shape obtained from map data including information of external shape of buildings.

A second method of processing stereo images according to the present invention is a method of processing stereo images in which image data obtained from a flying object is subjected to stereo matching processing to generate three-dimensional data, said method comprising the steps of:

extracting at least area information of land use on the map of roads/railroads/rivers/sea from map data including information of external shape of buildings; and correcting erroneous data to be corrected including at least noises and losses in said three-dimensional data by using the extracted area information.

A third method of processing stereo images according to the present invention is a method of processing stereo images in which image data obtained from a flying object is subjected to stereo matching processing to generate three-dimensional data, said method comprising the steps of:

analyzing said image data to extract information of external shape of buildings; and correcting erroneous data to be corrected including at least noises and losses in said three-dimensional data by using the extracted information of external shape of buildings.

A fourth method of processing stereo images according to the present invention is a method of processing stereo images in which image data obtained from a flying object is subjected to stereo matching processing to generate three-dimensional data, said method comprising the steps of:

analyzing said image data to extract information of external shape of buildings;

comparing and combining the extracted information of external shape of buildings with the information of external shape of buildings obtained from map data including at least information of external shape of buildings; and correcting erroneous data to be corrected including at least noises and losses in said three-dimensional data by using this combined information.

A fifth method of processing stereo images according to the present invention is a method of processing stereo images in which image data obtained from a flying object is subjected to stereo matching processing to generate three-dimensional data, comprising the steps of:

extracting at least area information of land use on the map of roads/railroads/rivers/sea from map data including at least information of external shape of buildings;

analyzing said image data to extract information of external shape of buildings;

comparing and combining the information of external shape of buildings obtained from said map information with the information of external shape of buildings extracted in said step of extracting said information of external shape of buildings; and correcting erroneous data to be corrected including at least noises and losses in said three-dimensional data by using this combined information.

A first recording medium according to the present invention in which a program for processing stereo images is recorded is a recording medium in which a program for processing stereo images is recorded for making a computer carryout stereo image processing for subjecting image data obtained from a flying object to stereo matching processing to generate three-dimensional data, wherein said program for processing stereo images makes said computer correct erroneous data to be corrected including at least noises and losses in the three-dimensional data by using at least information of external shape of buildings obtained from map data including at least the information of external shape of buildings.

A second recording medium according to the present invention in which a program for processing stereo images is recorded is a recording medium in which a program for processing stereo images is recorded for making a computer carry out stereo image processing for subjecting image data obtained from a flying object to stereo matching processing to generate three-dimensional data, wherein said program for processing stereo images makes said computer extract at least area information of land use on the map of roads/railroads/rivers/sea from map data including at least information of external shape of buildings, and correct erroneous data to be corrected including at least noises and losses in said three-dimensional data by using the extracted area information.

A third recording medium according to the present invention in which a program for processing stereo images is recorded is a recording medium in which a program for processing stereo images is recorded for making a computer carry out stereo image processing for subjecting image data obtained from a flying object to stereo matching processing to generate three-dimensional data, wherein said program for processing stereo images makes said computer analyze said image data to extract information of external shape of buildings, and correct erroneous data to be corrected including at least noises and losses in said three-dimensional data by using the extracted information of external shape of buildings.

A fourth recording medium according to the present invention in which a program for processing stereo images is recorded is a recording medium in which a program for processing stereo images is recorded for making a computer carry out stereo image processing for subjecting image data obtained from a flying object to stereo matching processing to generate three-dimensional data, wherein said program for processing stereo images makes said computer analyze said image data to extract information of external shape of buildings, compare and combine the extracted information of external shape of buildings with the information of external shape of buildings obtained from map data including at least information of external shape of buildings, and correct erroneous data to be corrected including at least noises and losses in said three-dimensional data by using this combined information.

A fifth recording medium according to the present invention in which a program for processing stereo images is recorded is a recording medium in which a program for processing stereo images is recorded for making a computer carry out stereo image processing for subjecting image data obtained from a flying object to stereo matching processing to generate three-dimensional data, wherein said program for processing stereo images makes said computer extract at least area information of land use on the map of roads/railroads/rivers/sea from map data including at least information of external shape of buildings, analyze said image data to extract information of external shape of buildings, compare and integrate the information of external shape of buildings obtained from said map data with the information of external shape of buildings obtained from the analysis of said image data, and correct erroneous data to be corrected including at least noises and losses in said three-dimensional data by using the combined information.

That is, the stereo image processing apparatus according to the present invention comprises satellite image storing means for storing satellite image data, stereo processing means for generating three-dimensional data from a plurality of satellite images by stereo matching processing, DEM data automatically correcting means for correcting the three-dimensional data obtained by this stereo matching processing by using map data, and map data storing means for storing map data.

By having the above described configuration, the stereo image processing apparatus of the present invention operates in such a manner as to subject a pair of satellite images obtained by photographing the same point in a plurality of directions to stereo matching processing, generate height information in each point in the image according to the obtained parallax information, namely three-dimensional data, superimpose thereon information of external shape of buildings included in map data, and transform internal three-dimensional data into a typical value of high frequency for each building area, thereby modifying three-dimensional data with noises and losses.

More specifically, the stereo image processing apparatus of the present invention extracts shape information of a building from images by image processing means or obtains the same from vector data included in existing map data, superimposes the shape information of the building on the three-dimensional data obtained by stereo matching processing, and replaces internal three-dimensional data values with several values of high frequency to modify the same for each building area. Thereby, three-dimensional data can be generated automatically without operator involvement, and sufficiently accurate three-dimensional shapes can be obtained even for complicated objects such as those in urban areas.

BRIEF DESCRIPTION OF THE DRAWINGS

FIG. 11 illustrates modification operations by DEM data modifying means in FIG. 2;

FIG. 13 illustrates modification operations by DEM data modifying means in FIG. 2;

FIG. 15 illustrates modification operations by DEM data modifying means in FIG. 2;

FIG. 41 is a flowchart showing operations of the stereo image processing apparatus according to the seventh embodiment of the present invention;

FIG. 43 is a block diagram showing the configuration of the stereo image processing apparatus according to the eighth embodiment of the present invention.

DETAILED DESCRIPTION OF THE PREFERRED EMBODIMENTS

Figure 1:
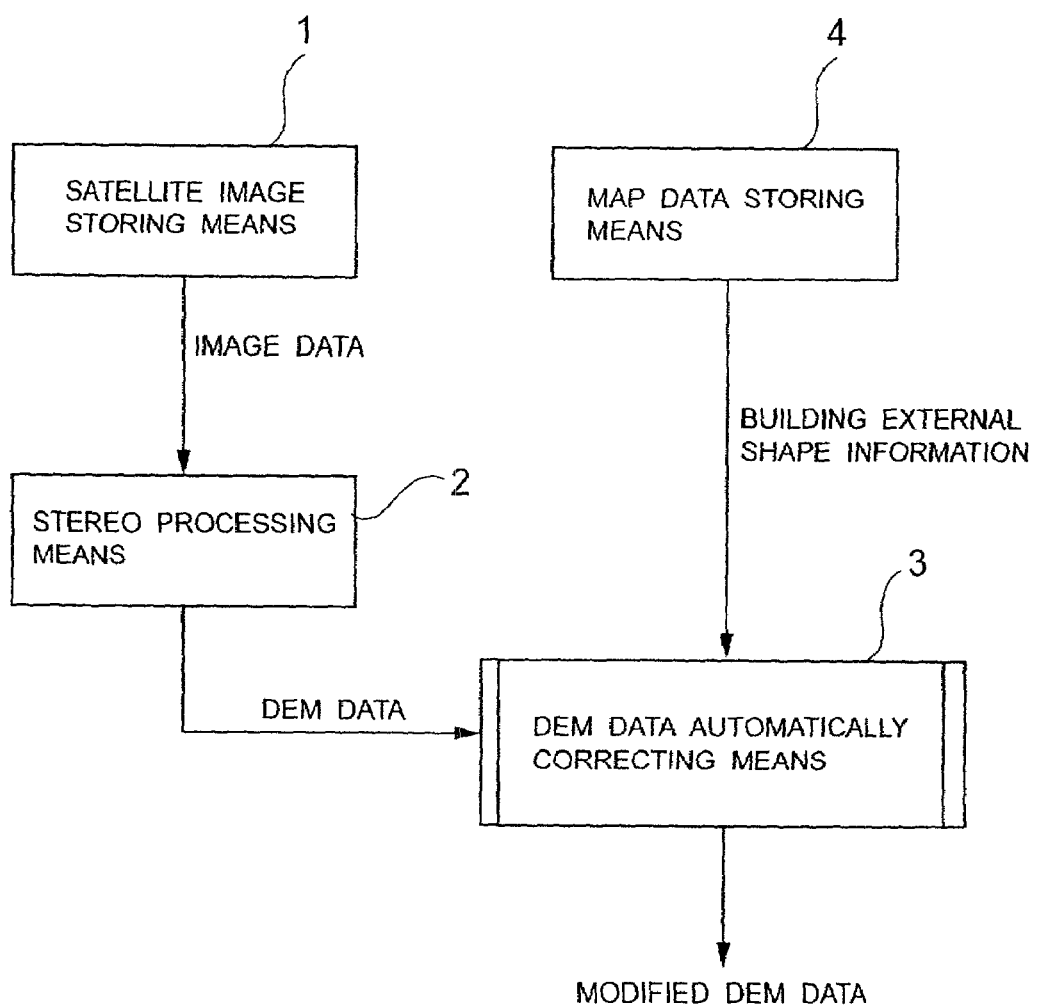
FIG. 1 is a block diagram showing the configuration of a stereo image processing apparatus according to the first embodiment of the present invention.

Embodiments of the present invention will now be described referring to the drawings. FIG. 1 is a block diagram showing a configuration of a stereo image processing apparatus according to the first embodiment of the present invention. In FIG. 1, the stereo image processing apparatus according to the first embodiment of the present invention comprises satellite image storing means 1, stereo processing means 2, DEM data automatically correcting means 3 and map data storing means 4.

The satellite image storing means 1 stores satellite image data. The stereo processing means 2 subjects the satellite image data obtained from the satellite image storing means 1 to stereo matching processing to generate three-dimensional data [DEM (Digital Elevation Map) data].

The DEM data automatically correcting means 3 automatically corrects erroneous data such as noises and losses in the three-dimensional data obtained by the stereo processing means 2, by using shape information of the external shape of buildings and the like (hereinafter, referred to as external shape information). The map data storing means 4 provides map data such as information of the external shape of buildings to the DEM data automatically correcting means 3.

The above described satellite image storing means 1 and map data storing means 4 are not always needed, and the satellite images and the map data may be, inputted externally using Internet and the like. Also, as the map data, many products are commercially available in data formats such as vector data and raster data, but any data may be used as long as they include information of the external shape of buildings and the like. These apply to other embodiments described later.

Figure 2:
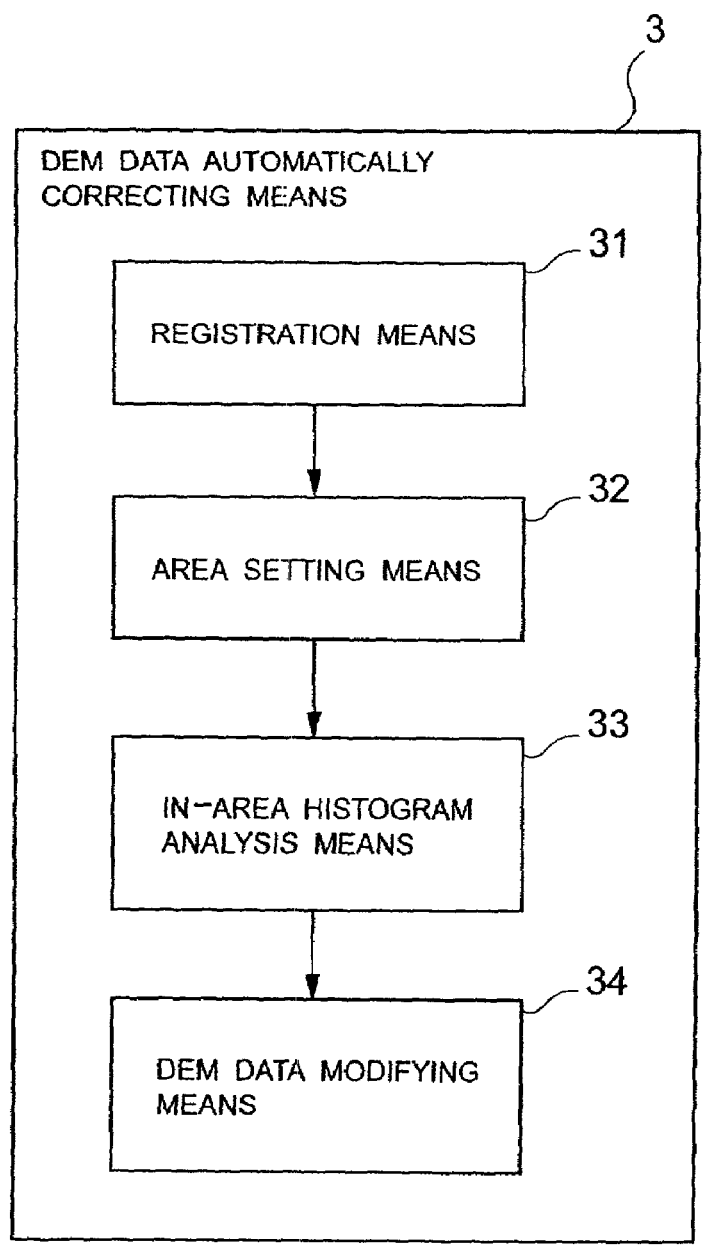
FIG. 2 is a block diagram showing the configuration of DEM data automatically correcting means in FIG. 1.

FIG. 2 is a block diagram showing the configuration of the DEM data automatically correcting means 3 in FIG. 1. In FIG. 2, the DEM data automatically correcting means 3 comprises registration means 31, area setting means 32, in-area histogram analysis means 33 and DEM data modifying means 34.

The registration means 31 superimposes three-dimensional data obtained by the stereo processing means 2 on the map data including information of the external shape of buildings given from the map data storing means 4 by performing parallel translation/transformation and the like so that the same geographical coordinate point included in each data matches with each other. For each building in the map data superimposed by the registration means 31, the area setting means 32 sets the three-dimensional data included in the area within the external shape of the building as the candidate area of each building.

The in-area histogram analysis means 33 analyzes the histogram distribution of the three-dimensional data included in the area in each area set by the area setting means 32 to obtain statistic information such as values of high frequency. Based on the statistic information in each area obtained by the in-area histogram analysis means 33, the DEM data modifying means 34 modifies the three-dimensional data included in the area by replacing the three-dimensional data with values of high frequency and outputs the same.

Figure 3:
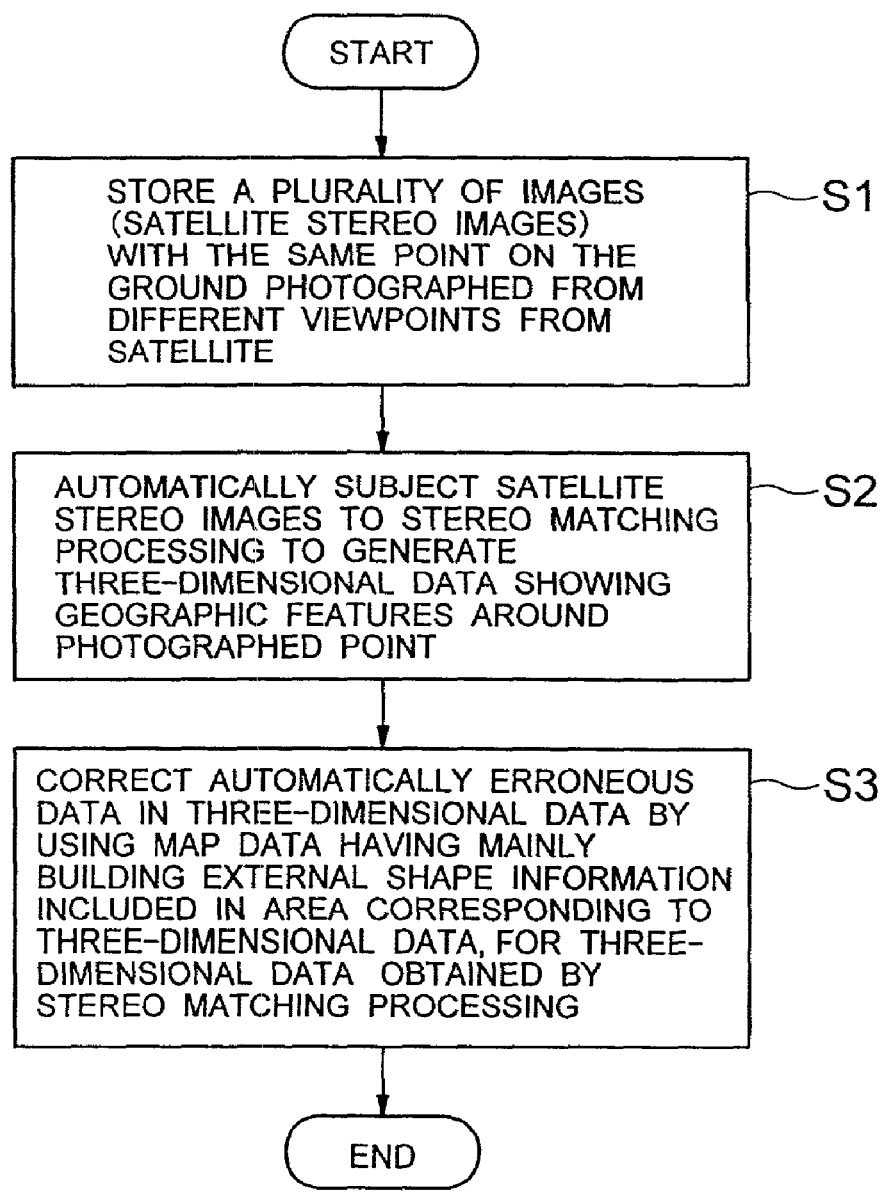
FIG. 3 is a flowchart showing operations of the stereo image processing apparatus according to the first embodiment of the present invention.
Figure 4:
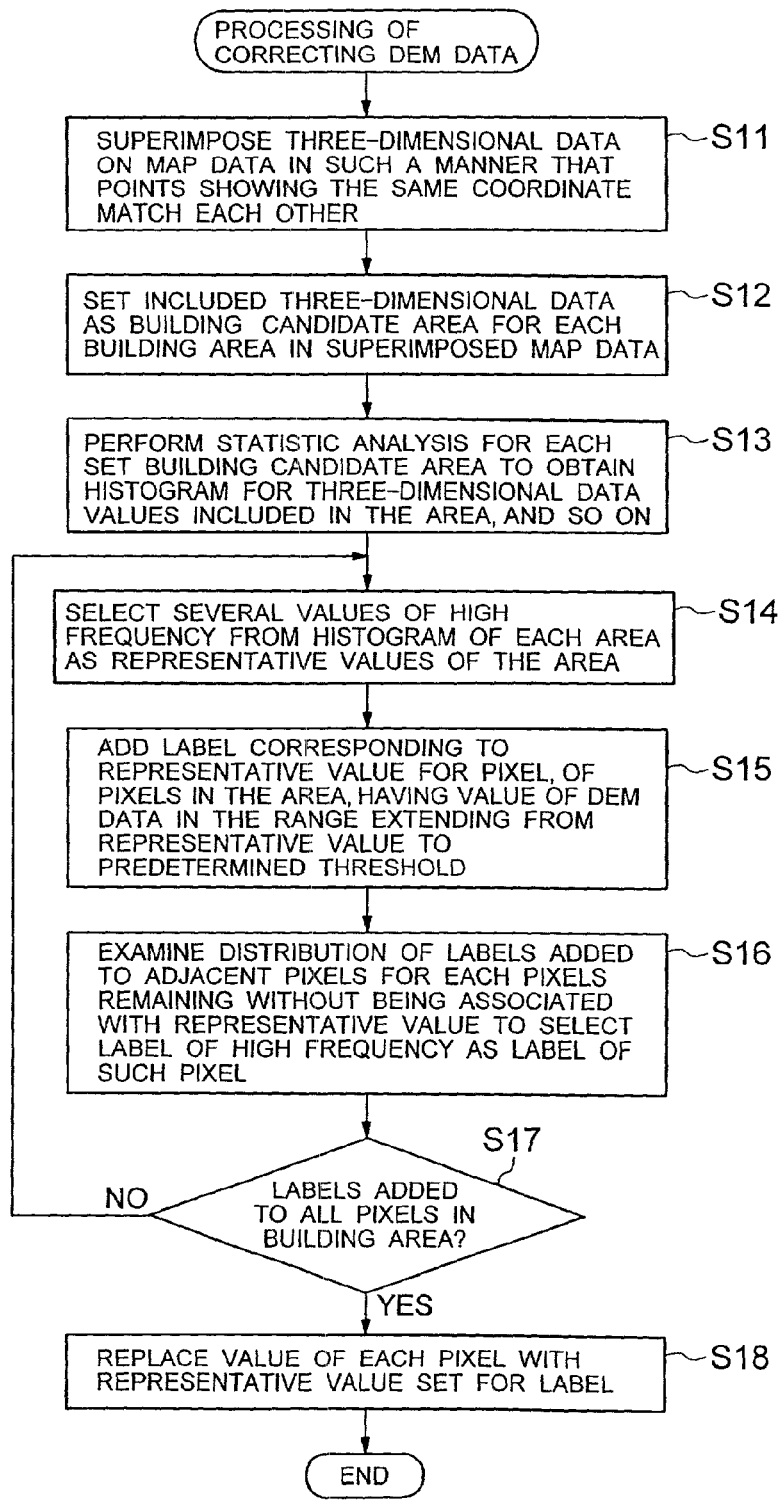
FIG. 4 is a flowchart showing the operation of DEM data automatically correcting means in FIG. 1.

FIG. 3 is a flowchart showing operations of the stereo image processing apparatus according to the first embodiment of the present invention, and FIG. 4 is a flowchart showing operations of the DEM data automatically correcting means 3 of FIG. 1. Operations of the stereo image processing apparatus according to the first embodiment of the present invention will be described referring to these FIGS. 1 to 4.

First, a plurality of images obtained by photographing the same point on the ground from different viewpoints from a satellite, namely satellite stereo images are stored in the satellite image storing means 1 (step S1 in FIG. 3), and those satellite stereo images are given to the stereo processing means 2.

The stereo processing means 2 automatically subjects the obtained satellite stereo images to stereo matching processing to generate the three-dimensional data showing geographical features around the photographed point (step S2 in FIG. 3). Specifically, this is shown by the value of height corresponding to each point on the two-dimensional map.

Here, as described in the description of the related art, the stereo matching processing is to determine corresponding points in images having the same point imaged therein, for two images obtained by photographing an object from different viewpoints, and use their parallax to determine the depth dimension and form up to the target according to the principle of triangulation technique. Generally, various methodologies such as methods in which feature amounts are determined to provide correspondence therewith and correlation methods in which correlation of left and right images is used, are proposed as the stereo matching processing, but in this embodiment, no limits are imposed on methodologies for use in the stereo matching processing.

For the three-dimensional data obtained by the stereo matching processing, the DEM data automatically correcting means 3 uses map data having mainly information of the external shape of buildings stored in the map data storing means 4 and included in the area corresponding to the three-dimensional data to correct automatically erroneous data in the three-dimensional data (step S3 in FIG. 3).

In the DEM data automatically correcting means 3, the registration means 31 superimposes the three-dimensional data on the map data in such a manner that the points showing the same coordinate match with each other (step S11 in FIG. 4). If the geodetic system employed in the three-dimensional data and the satellite images providing its base is different from the geodetic system used in the map data, since latitude and longitude values of the same point are different from each other, transformation is carried out so that the values are equal to each other, information of a predetermined point at which latitude and longitudinal values are consistent with each other is used to determine a transformation parameter, transformation such as affine transformation is applied to any one of the values, and the three-dimensional data is superimposed on the map data in such a manner that the same points in the both data match with each other.

The area setting means 32 sets the three-dimensional data included inside as a building candidate area for each building area in the superimposed map data (step S12 in FIG. 4). For each set building candidate area, the in-area histogram analysis means 33 performs statistic analysis to obtain a histogram, and so on for three-dimensional data values included in the area (step S13 in FIG. 4).

For each area, the DEM data modifying means 34 selects several values exhibiting high frequency, and replace those values of selected points with the value of highest frequency in the three-dimensional data near those selected points in the three-dimensional data within the area to modify the three-dimensional data.

That is, the DEM data modifying means 34 selects several values of high frequency from the histogram of each area as a representative value of the area (step S14 in FIG. 4), and adds labels corresponding to the representative value for pixels having values of DEM data in the range extending from the representative value to a predetermined threshold, of respective pixels in the area (step S15 in FIG. 4).

Thereafter, for each pixel remaining without being associated with the representative value, the DEM data modifying means 34 examines the distribution of the labels added to nearby pixels, and selects a label of high frequency as a label of the pixel (step S16 in FIG. 4). When labels are determined for all the pixels in the building area (step S17 in FIG. 4), the DEM data modifying means 34 replaces the value of each pixel with the representative value set for the label (step S18 in FIG. 4).

As described above, since three-dimensional data is all obtained automatically on the computer by the stereo processing means 2 and the DEM data automatically correcting means 3, operations by operators are not required.

Also, erroneous data included in three-dimensional data is corrected according to building shape information of the map data in the DEM data automatically correcting means 3, thereby making it possible to obtain the three-dimensional data of higher frequency compared to the three-dimensional data extracted automatically in a conventional way.

Figure 5:
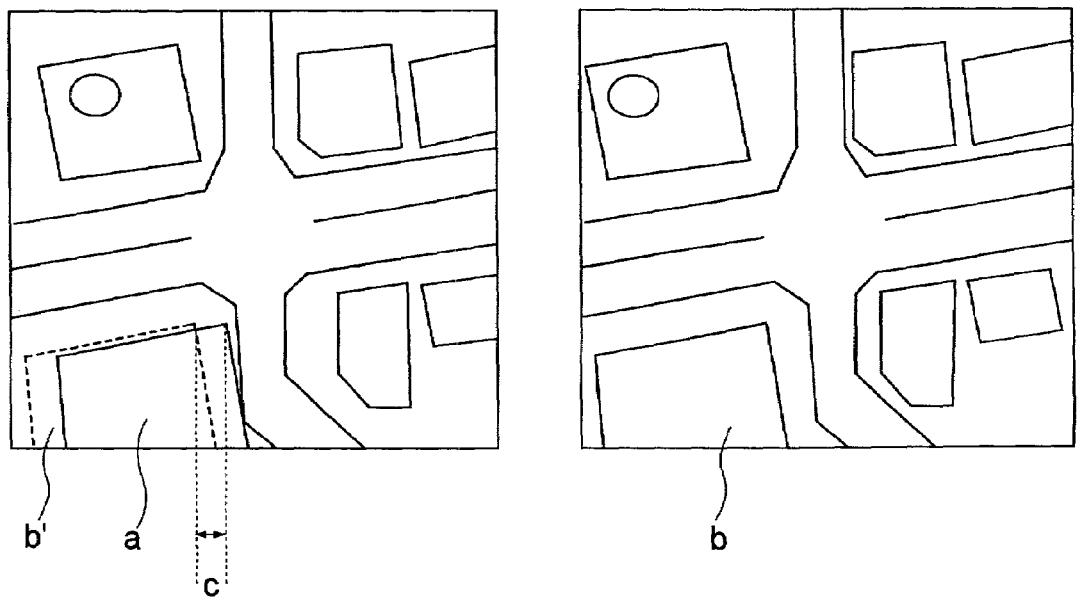
FIG. 5 is a schematic diagram showing one example of satellite images for use in the first embodiment of the present invention.
Figure 6A:
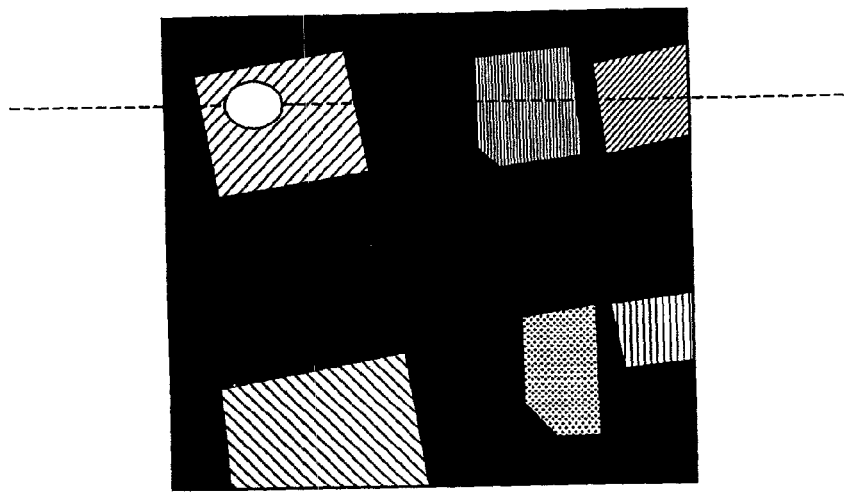
FIGS. 6A and 6B are schematic diagrams showing one example of three-dimensional data images obtained with the first embodiment of the present invention.
Figure 6B:
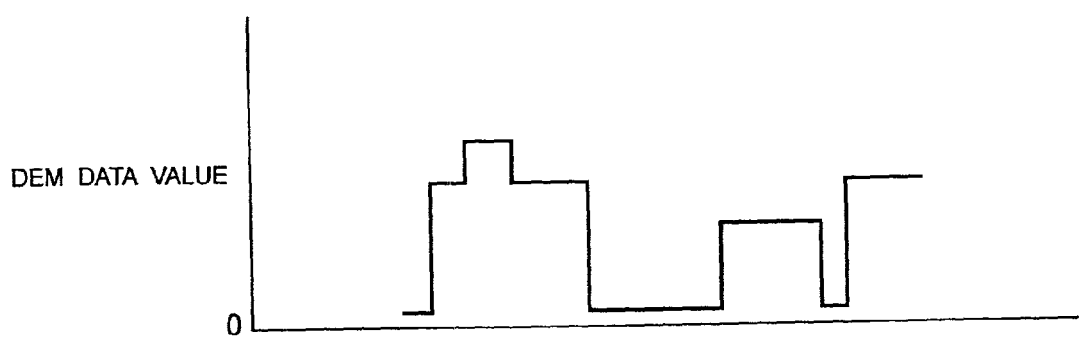
Figure 7:
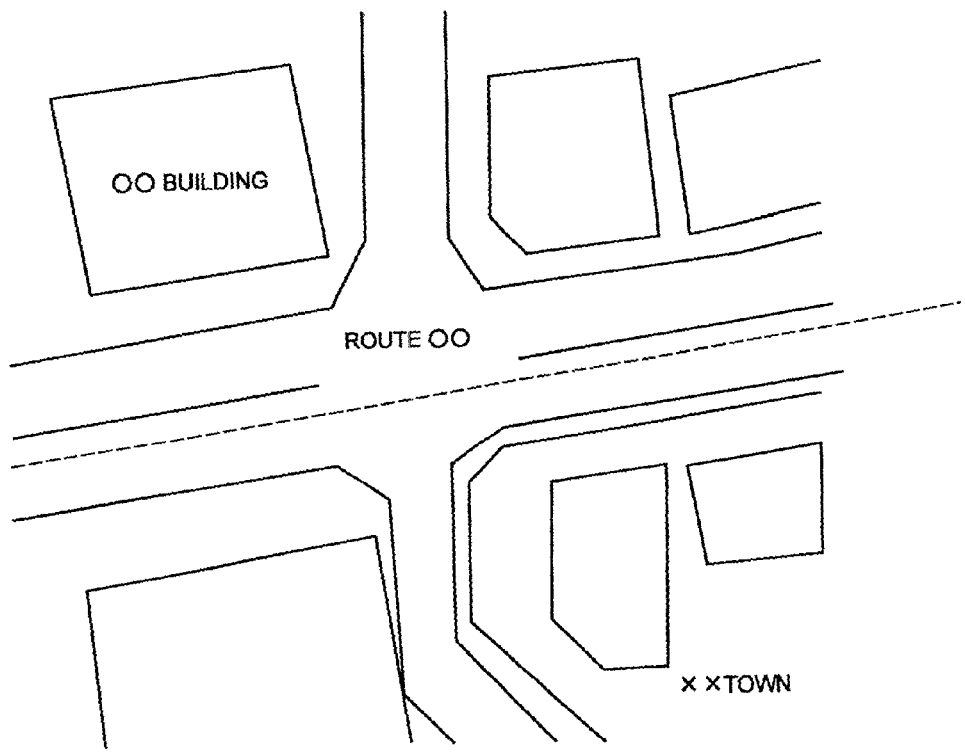
FIG. 7 is a schematic diagram showing one example of map data for use in the first embodiment of the present invention.

FIG. 5 is a schematic diagram showing one example of satellite images for use in the first embodiment of the present invention, FIGS. 6A and 6B are schematic diagrams showing one example of three-dimensional data obtained by the first embodiment of the present invention, and FIG. 7 is a schematic diagram showing one example of the map data for use in the first embodiment of the present invention.

Figure 8A:
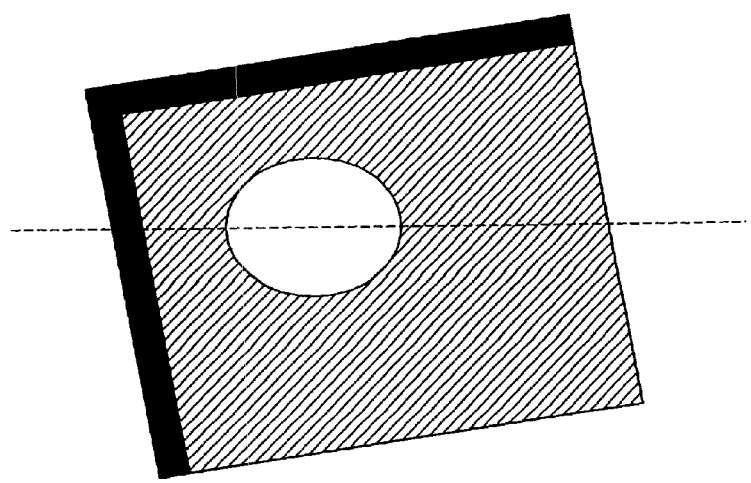
FIGS. 8A and 8B are schematic diagrams showing one example of three-dimensional data set by area setting means in FIG. 2.
Figure 8B:
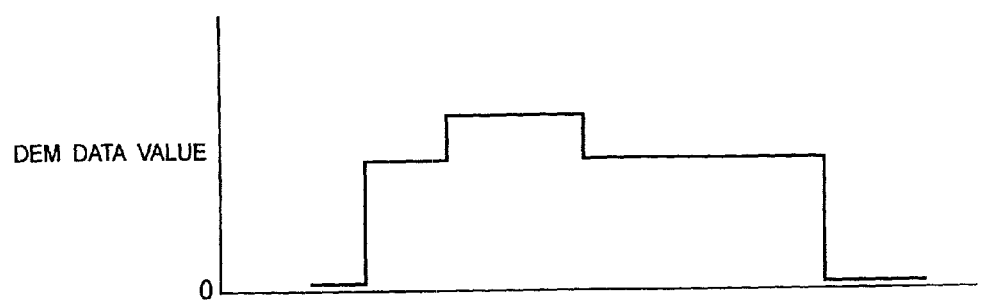
Figure 9:
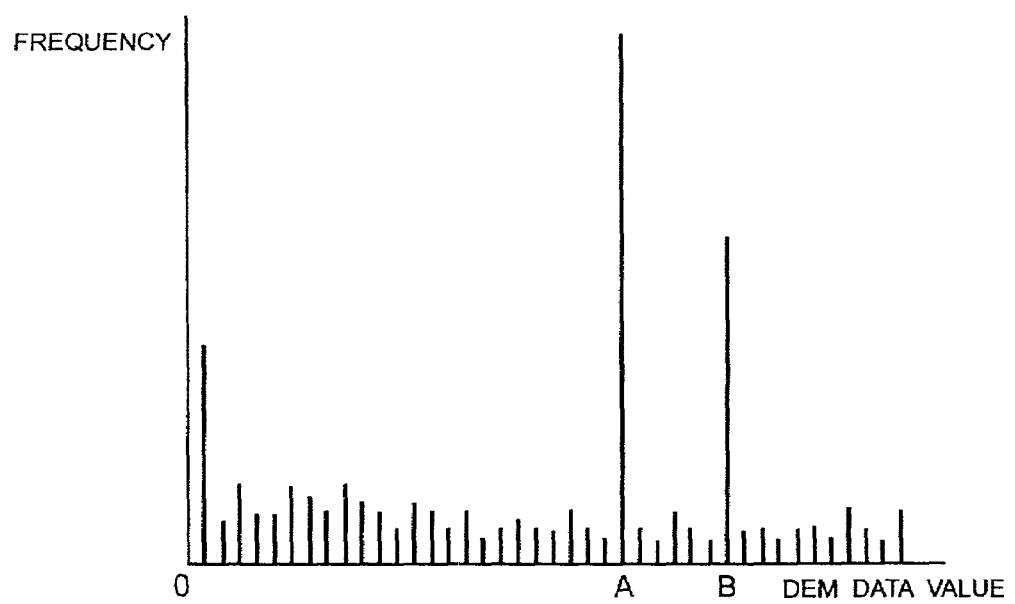
FIG. 9 is a schematic diagram showing one example of a histogram showing the distribution of three-dimensional data obtained with in-area histogram analysis means in FIG. 2.
Figure 10A:
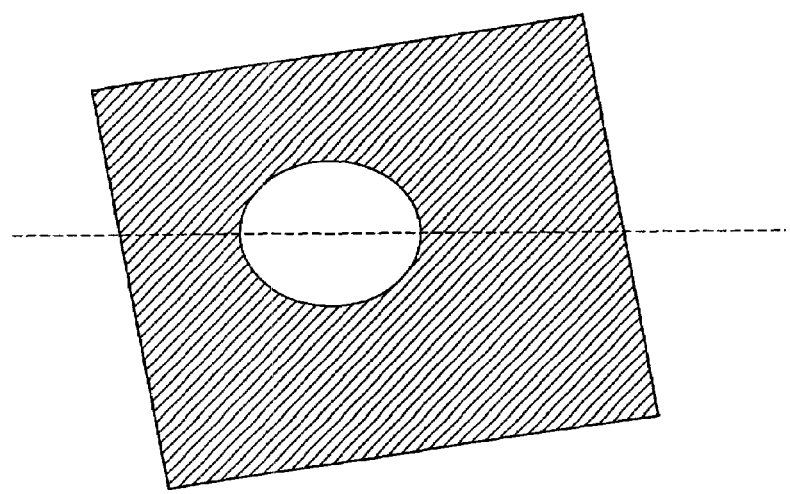
FIGS. 10A and 10B are schematic diagrams showing one example of a three-dimensional data area corrected by DEM data modifying means in FIG. 2.
Figure 10B:
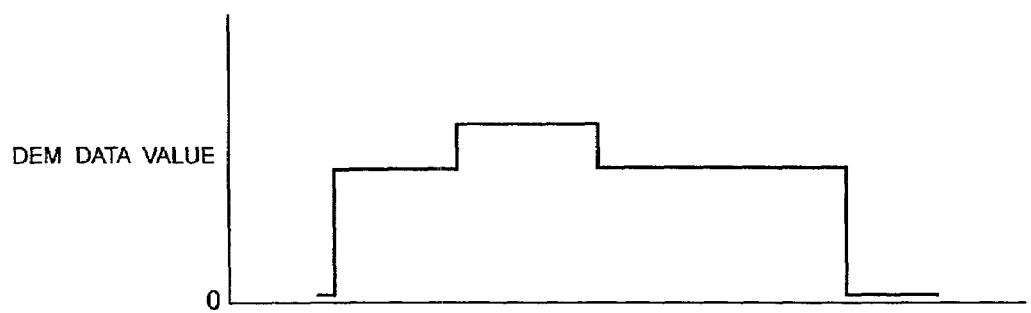

Also, FIG. 8 is a schematic diagram showing one example of the three-dimensional data set by the area setting means 32 in FIG. 2, FIG. 9 is a schematic diagram showing one example of a histogram showing the distribution of the three-dimensional data obtained by the in-area histogram analysis means 33 in FIG. 2, and FIG. 10 is a schematic diagram showing one example of the three-dimensional data corrected by the DEM data modifying means 34 in FIG. 2.

Specific operations of the first embodiment of the present invention will be described referring to these FIGS. 1 to 10. In FIG. 5 shown are two satellite images obtained by stereo-photographing an object, to which the first embodiment of the present invention is applied. Furthermore, although for the satellite image, a significantly wide range of area is usually photographed, a part of the image is magnified and shown for simplifying description, and several buildings are seen around the roads intersecting each other in the center of the image.

In the first embodiment of the present invention, the satellite stereo images as described above, previously stored in the satellite image storing means 1, are given to the stereo processing means 2, and the stereo matching processing is automatically performed on the computer in the same fashion as a conventional method.

Here, the stereo matching processing is to determine corresponding points in images having the same point imaged therein, for two images obtained by photographing an object from different viewpoints, and use their parallax to determine the depth dimension and form up to the target according to the principle of triangulation technique. Various methodologies have already been proposed for this stereo matching processing, but in this embodiment, an area correlation method that is widely used is used in the same fashion as the method described in the above described Japanese Patent Publication No. 8-16930 specification.

In this area correlation method, the range in which the search window is moved is limited to the direction of the epipolar lines in the image for alleviating processing, whereby the magnitude of displacement in the x direction of the corresponding point in the right image, namely a parallax can be obtained for each point in the left image.

The direction of the epipolar lines is usually different from the direction of scan lines in the image, but coordinate transformation is performed, whereby the direction of the epipolar lines can be made to match with the direction of scan lines to make rearrangement. The method of coordinate transformation is described in the above described "Image Analysis Handbook".

In the stereo image rearranged as described above, the range in which the search window of the corresponding point is moved can be restricted on the scan line, and thus the parallax is obtained as a difference in x coordinates between corresponding points in the left and right images.

In FIG. 5 is shown an example of two satellite images obtained by photographing the same point from different viewpoints. For the satellite image, a significantly wide range of area is usually photographed, but for simplifying description, the image is shown with a part thereof magnified, and several buildings are seen around the roads intersecting each other in the center of the image.

When comparing the left and right images in two satellite images obtained by stereo-photographing an object, the rooftop surfaces of buildings are imaged in the positions displaced depending on their respective heights, while the position of a road is substantially the same in both images. For example, a building a in the left image shown in FIG. 5 corresponds to a building b in the right image, but this building b is drawn in the same position in the left image corresponds to a building b'. For the rooftop surfaces of these buildings a and b', the magnitude of displacement c in each x coordinate is a parallax.

When the parallax obtained through the above described processing is visualized as a pixel value, the image is dark for the ground surface of a road with no parallax, while the image is bright depending on the height of the building for the rooftop of the building, as shown in FIG. 6A. Cross sections of those buildings with pixel values showing parallaxes in the dot line in FIG. 6A plotted on the longitudinal axis are shown in FIG. 6B. Height information corresponding to a structure on the rooftop of the building can be obtained from FIG. 6B. If information of imaging points and visual angles obtained from these images are used, the height per pixel for parallax can be known, and thus the three-dimensional data showing geographical features around the photographed point is obtained from the above described image.

However, since areas with no textures and areas in which correspondence by coefficients of correlation cannot be obtained are also included, a large number of points indicating erroneous heights that are very different from surroundings are included in the image of the above described three-dimensional data. Particularly, since hiding occurs around a building and so on, the number of points for which correspondence cannot be obtained becomes large, which may result in cases where extremely high values are shown, or the building is significantly damaged.

One example of the map data included in the map data storing means 4 and rasterized to be visualized is shown in FIG. 7. In the map data, zone demarcation lines, names of administrative districts/roads/buildings and the like are layered in various ways and included as vector data or raster data in addition to shapes of buildings and roads and the like, and location information such as latitude and longitude described with predetermined coordinate systems is included for each data.

Types of data included in the map data are different depending on the map data, but by using the vector data of those data showing shapes of buildings, errors of the three-dimensional data as described above by the DEM data automatically correcting means 3 are corrected.

Specifically, first, the three-dimensional data obtained by the registration means 31 is superimposed on the map data in such a manner that their corresponding points match each other. Since the three-dimensional data is obtained in response to satellite images, it can be considered that the geodetic system is similar to a system that is used in the satellite image, and information called meta data including each information such as the shooting direction and time when the image is formed, and information of latitude and longitude in four corners of the image is attached to the satellite image. Thus, a coordinate for any point in the image for the three-dimensional data can be obtained via interpolation.

Also, for each data in the map image, information of latitude and longitude is included as a coordinate value of each apex if the information is vector data. However, if the employed geodetic system is different, latitude and longitude values denoting the same point on the ground are different, and it is therefore impossible to consider points to which the latitude and longitudinal values correspond as the same point for providing correspondence. For this reason, points are first shifted by using a predetermined parameter so that they are equal in latitude and longitude, by which several corresponding points are obtained.

In addition, an affine transformation parameter allowing those points to match each other is determined by the least square method or the like, and the transformation is applied to any one of the map data and three-dimensional data, thereby superimposing the map data on the three-dimensional data in such a manner that the same points match each other.

After the map data is superimposed on the three-dimensional, the three-dimensional data included in a closed area surrounded by vector data is set for each building as an area corresponding to the building by the area setting means 32.

One example of a three-dimensional data area corresponding to the building located at the upper-left in FIG. 7, which is obtained by such operations, is shown in FIG. 8 with the area being magnified. In this case, the obtained three-dimensional data and the area in the image do not match completely, and there exists an area showing a high value locally in a part of three-dimensional data due to the structure on the rooftop of the building.

Then, the distribution of three-dimensional data is examined for each area obtained by the in-area histogram analysis means 33. For the area shown in FIG. 8, an example of a histogram of the internal three-dimensional data is shown in FIG. 9.

To observe this, the values corresponding to the rooftop surface of the building and the structure on the rooftop, respectively, show relatively high frequency. Also, since the rooftop surface in the three-dimensional data and the building area in the map data do not match completely, there exist small peaks even at the positions in which parallax is about 0.

The in-area histogram analysis means 33 records values showing frequency above a predetermined ration to the number of three-dimensional data in an area, as representative values in the area. In the case of the above described area, A and B are representative values.

Also, the representative value for each area is used to correct three-dimensional data in the area by the DEM data modifying means 34. Specifically, the distribution of three-dimensional data values in the proximate is examined for each point in the area, and if there exists the value of highest frequency near the representative value, the three-dimensional data is replaced with the representative value. If the value of highest frequency is not a value existing near the representative value, the three-dimensional data is replaced with a representative value showing the highest frequency. The three-dimensional data corrected by the above described methodology is shown in FIG. 10. Process operations described above are operations according to the first embodiment of the present invention.

FIGS. 11 to 15 illustrate modification operations by the DEM data modifying means 34 in FIG. 2. The modification operations by the DEM data modifying means 34 will be described in detail below referring to FIGS. 11 to 15.

Pre-modified DEM data magnified for the inside a certain building area is shown in FIG. 11. In FIG. 11, values described inside respective cells are pixel values showing height information, which is expressed by eight stage values for simplifying description.

Also, FIG. 9 shows an example of a histogram of the internal three-dimensional data as described above. In FIG. 9, values of DEM data showing height and their frequencies are added to the lateral and longitudinal axes, respectively. Assume that of these, values of A and B of high frequency correspond to pixel values of "5" and "8" in FIG. 11.

In the DEM data modifying means 34, processing of selecting several values of high frequency from the histogram in each area as representative values in the area is first performed. Thereby, values of the DEM data of "A" and "B" in FIG. 9 are selected as representative values in the area.

Figure 12:
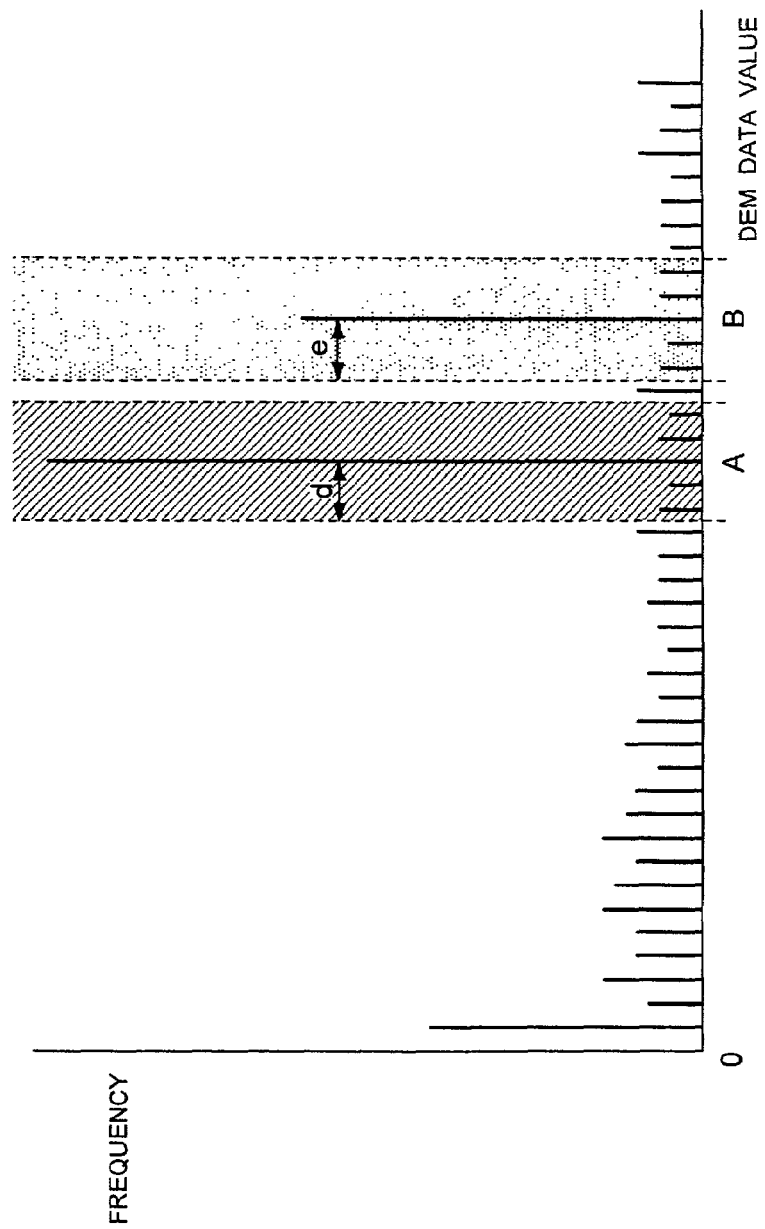
FIG. 12 illustrates modification operations by DEM data modifying means in FIG. 2.

Then, the DEM data modifying means 34 performs processing of adding labels corresponding to the representative value for pixels having values of the DEM data in the range extending from the representative value to a predetermined threshold, of respective pixels in the area. FIG. 12 shows a range of values of the DEM data corresponding to each representative value by the threshold values, for the histogram shown in FIG. 9, wherein the ranges of values of the DEM data considered as the representative values are determined by the threshold d for A and by the threshold e for B in FIG. 12, respectively.

Results of adding a label of A or B to pixels included in this range of data values, with application to the building area of the DEM image shown in FIG. 11, are shown in FIG. 13. The label A is added to pixels showing data values "4", "5" and "6", and the label B is added to pixels showing data values "7" and "8", but no label is added to the area of the data value "1" that does not correspond to the set range of data values.

Figure 14:
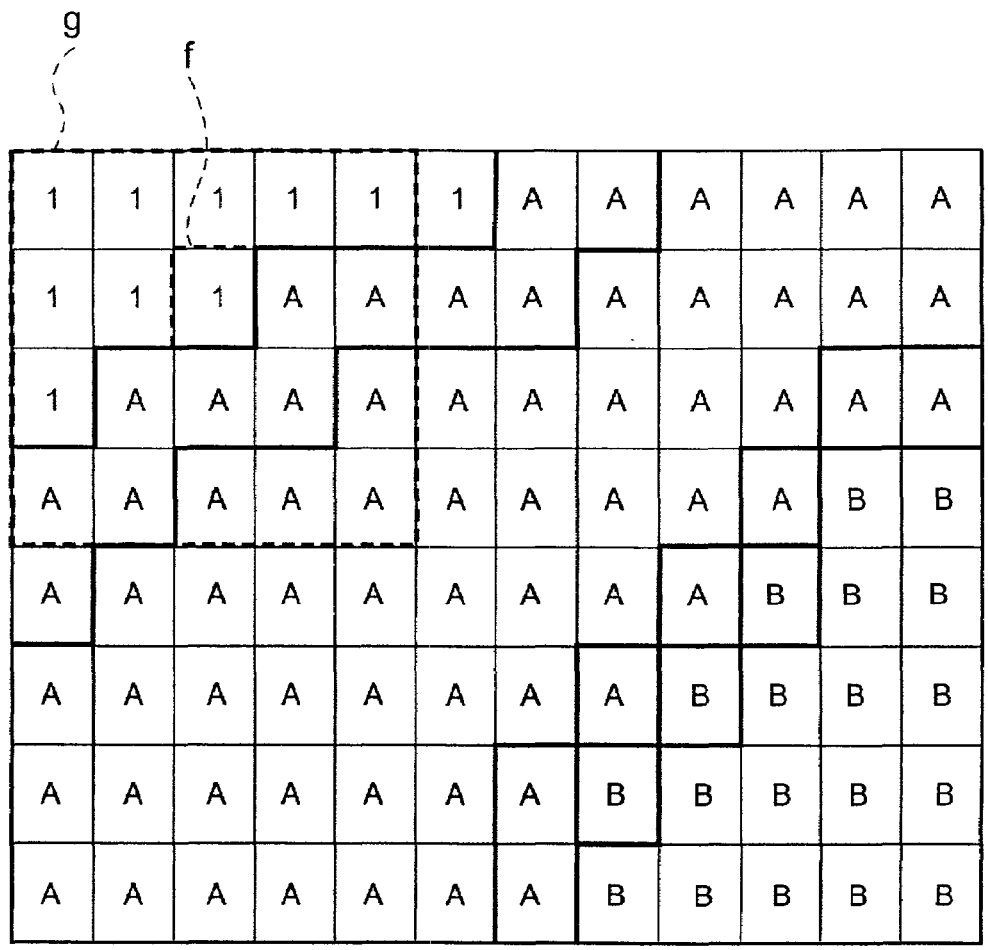
FIG. 14 illustrates modification operations by DEM data modifying means in FIG. 2.

Also, for each pixel remaining without being associated with the representative value through the above described labelling process, the distribution of labels added to adjacent pixels is examined, and labels of high frequency are selected as labels of such pixels. FIG. 14 shows adjacent areas for pixels with no labels added thereto in the DEM data image shown in FIG. 13.

For a pixel f (the pixel shown by a dotted line) in FIG. 14, for example, a range (the range shown by a dotted line g) of a five pixel square with the pixel f located in the center is set and labels of pixels included in this range are examined. As a result, the label A that is the most frequent label in the range g is taken as a label of the pixel f. However, if there exist no pixels with labels added thereto in a set adjacent range, no label is added to a target pixel. This adjacent label selection processing is repeatedly performed until labels are added to all pixels in a target building area. If pixels with no label added thereto remain in the area even after the above described processing is applied to all the pixels with no label added thereto in the area, the processing is repeatedly performed for the remaining pixels with no label added thereto. In this repeated processing, for a group of pixels with no label added thereto, a pixel adjacent to the pixel with a label added thereto is taken one after another, and the number of pixels with no label added thereto is decreased. When labels are added to all the pixels in the target building area, repetition of the above described adjacent label selection processing is ended.

When labels are determined for all the pixels in the building area, processing of replacing the value of each pixel with a representative value set for the label is performed. When labels are set for all the pixels in the DEM data image in FIG. 13, and they are replaced with representative values, a modified DEM data image is obtained as shown in FIG. 15.

Figure 16:
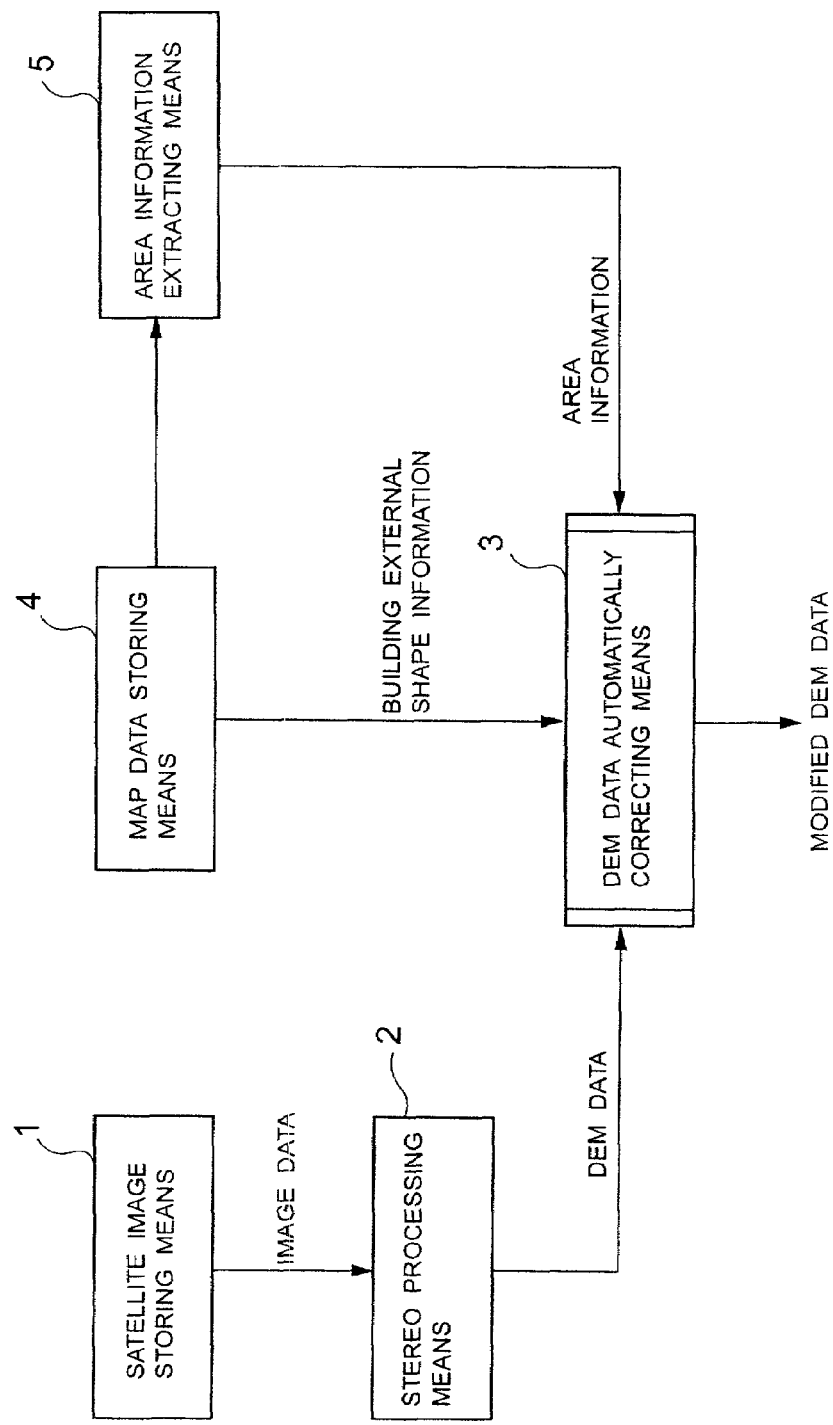
FIG. 16 is a block diagram showing the configuration of the stereo image processing apparatus according to the second embodiment of the present invention.

FIG. 16 is a block diagram showing the configuration of the stereo image processing apparatus according to the second embodiment of the present: invention. In FIG. 16, the stereo image processing apparatus according to the second embodiment of the present invention comprises satellite image storing means 1, stereo processing means 2, DEM data automatically correcting means 3, map data storing means 4 and area information extracting means 5.

The satellite image storing means 1 stores satellite image data. The stereo processing means 2 subjects the satellite image data obtained from the satellite image storing means 1 to stereo matching processing to generate three-dimensional data.

The DEM data automatically correcting means 3 correct automatically erroneous data to be corrected such as noises and losses in the three-dimensional data obtained by the stereo processing means 2 by using information of external shape of buildings and the like that can be obtained separately from map data. The map data storing means 4 provides the map data including information of external shape of buildings and the like to the DEM data automatically correcting means 3. The area information extracting means 5 extracts area information such as land use on the map of roads/railroads/rivers/sea and the like from the map data.

Figure 17:
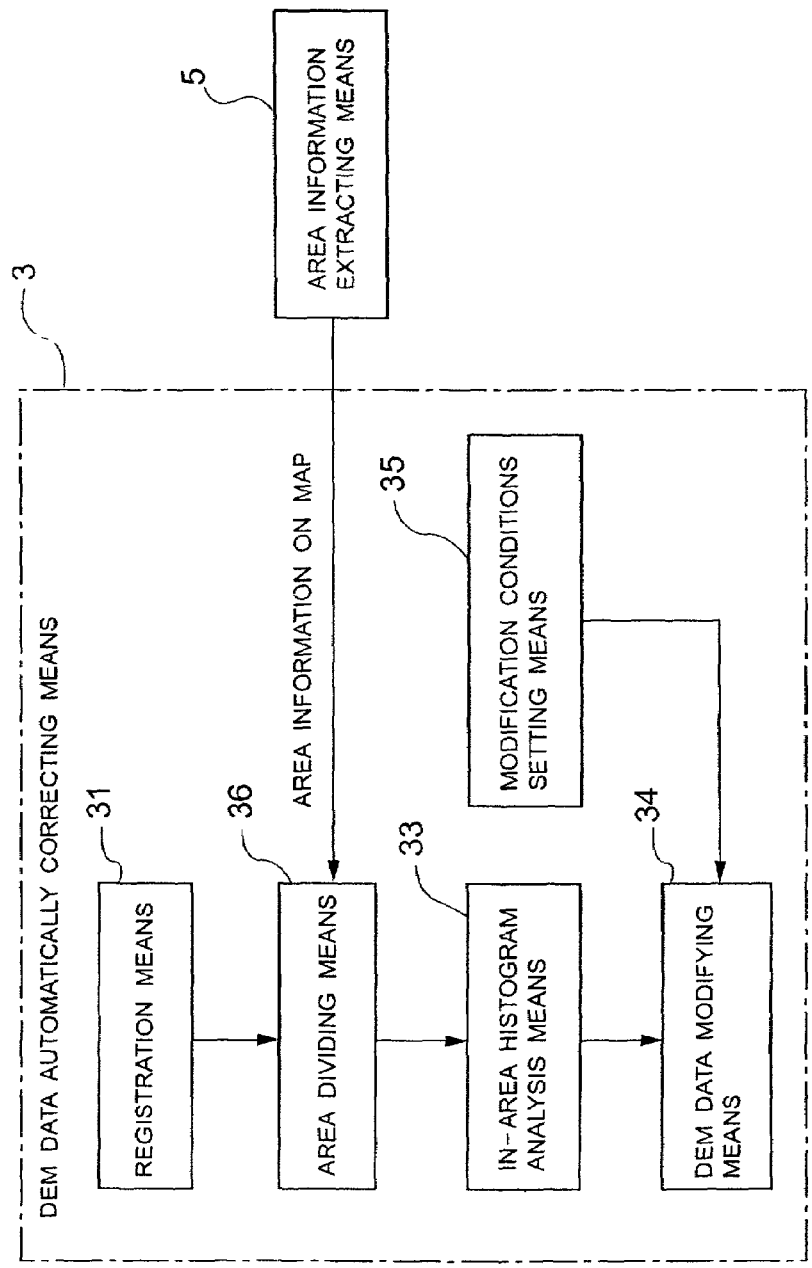
FIG. 17 is a block diagram showing the configuration of DEM data automatically correcting means in FIG. 16.

FIG. 17 is a block diagram showing the configuration of the DEM data automatically correcting means 3 in FIG. 16. In FIG. 17, the DEM data automatically correcting means 3 comprises registration means 31, area dividing means 36, in-area histogram analysis means 33, modification condition setting means 35 and DEM data modifying means 34.

The registration means 31 superimposes the three-dimensional data obtained by the stereo processing means 2 on the map data including information of external shape of buildings given from the map data storing means 4 by performing parallel translation/transformation and the like so that the same geographical coordinate points included in the both data match with each other. The area dividing means 36 sets, for each building in the map data superimposed by the registration means 31, the three-dimensional data in the area within the external shape of the building as the candidate area of each building, and spatially divides the three-dimensional data in accordance with the area information on the map.

The in-area histogram analysis means 33 analyzes the histogram distribution of the three-dimensional data included in the area in each area set by the area dividing means 36 to obtain statistic information such as values of high frequency. The modification condition setting means 35 sets modification conditions for the three-dimensional data corresponding to the area information of each land use on the map. Based on the statistic information in each area obtained by the in-area histogram analysis means 33 and the modification conditions set by the modification condition setting means 35, the DEM data modifying means 34 modifies the three-dimensional data included in the area by replacing the three-dimensional data with values of high frequency and outputs the same.

Figure 18:
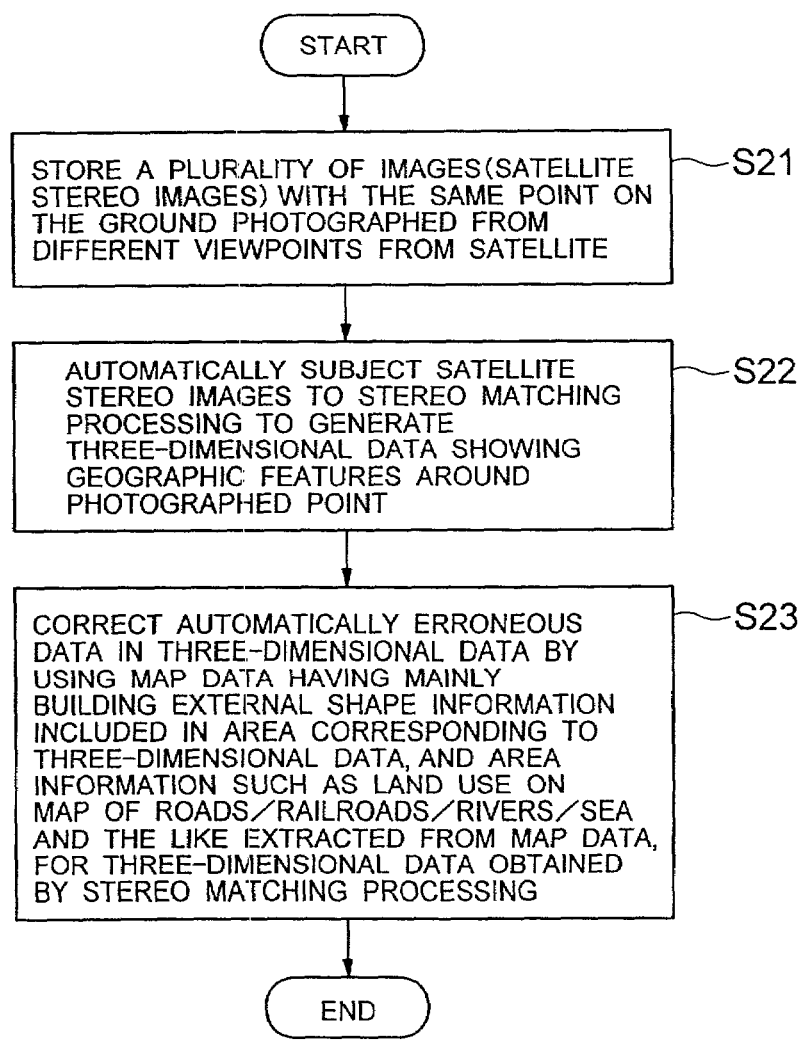
FIG. 18 is a flowchart showing operations of the stereo image processing apparatus according to the second embodiment of the present invention.
Figure 19A:
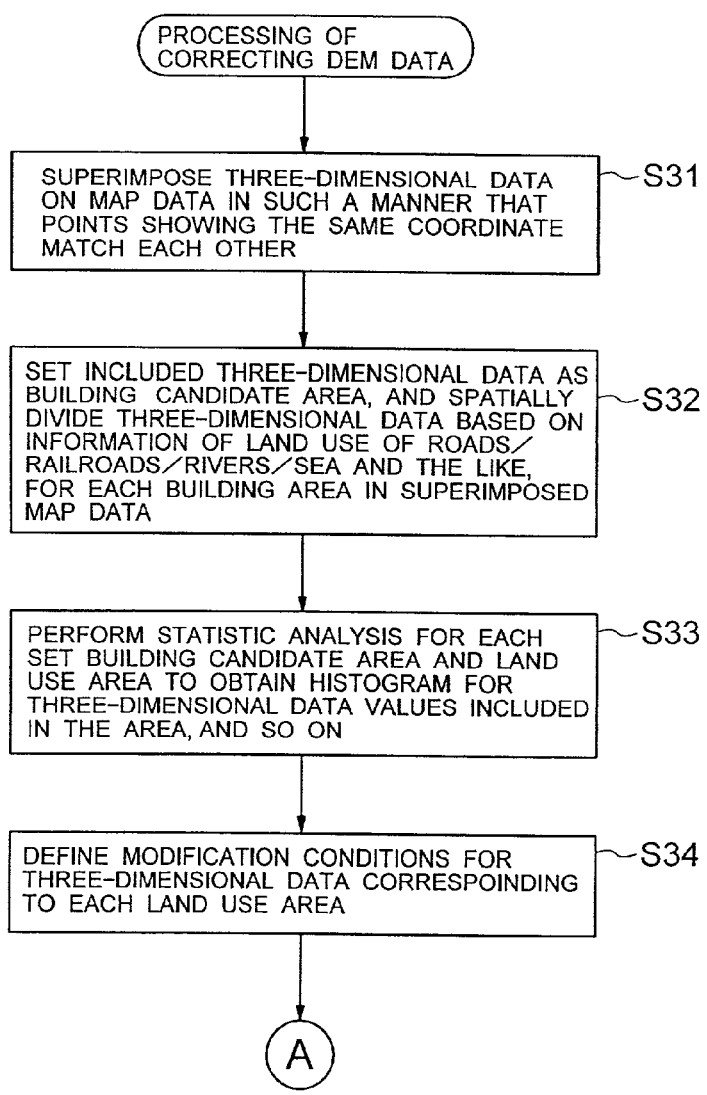
FIGS. 19A and 19B are flowcharts showing operations of DEM data automatically correcting means in FIG. 16.
Figure 19B:
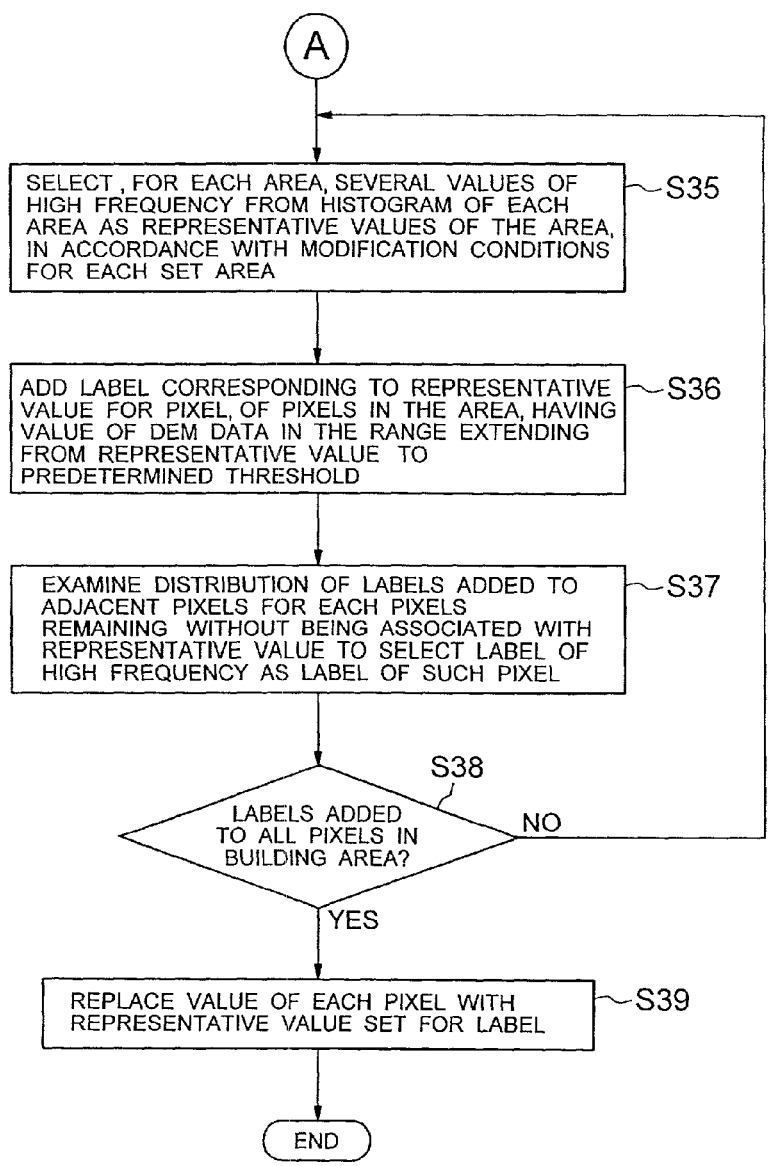

FIG. 18 is a flowchart showing operations of the stereo image processing apparatus according to the second embodiment of the present invention, and FIG. 19 is a flowchart showing operations of the DEM data automatically correcting means 3 in FIG. 16. Operations of the stereo image processing apparatus according to the third embodiment of the present invention will be described referring to these FIGS. 16 to 19.

First, a plurality of images obtained by photographing the same point on the ground from different viewpoints from the satellite, namely satellite stereo images are stored in the satellite image storing means 1 (step S21 in FIG. 18), and those satellite stereo images are given to the stereo processing means 2.

The stereo processing means 2 automatically subjects the obtained satellite stereo images to stereo matching processing to generate the three-dimensional data showing geographic features around the photographed point (step S22 in FIG. 18). Also in this embodiment, no limits are imposed on methodologies for use in the stereo matching processing as in the case of the first embodiment of the present invention.

For the three-dimensional data obtained by the stereo matching processing, the DEM data automatically correcting means 3 uses in combination the building external shape information stored in the map data storing means 4 and the area information such as land use on the map of roads/railroads/rivers/sea and the like extracted from the map data by the area information extracting means 5 to correct automatically erroneous data in the three-dimensional data (step S23 in FIG. 18).

In the DEM data automatically correcting means 3, the registration means 31 superimposes the three-dimensional data on the map data in such a manner that the points showing the same coordinate match with each other (step S31 in FIG. 19). If the geodetic system employed in the three-dimensional data and the satellite images providing its base is different from the geodetic system used in the map data, since latitude and longitude values of the same point are different from each other, transformation is carried out so that the values are equal to each other, information of a predetermined point at which latitude and longitudinal values are consistent with each other is used to determine a transformation parameter, transformation such as affine transformation is applied to any one of the values, and the three-dimensional data is superimposed on the map data in such a manner that the same points in the both data match with each other.

The area dividing means 36 sets the three-dimensional data included inside as a building candidate area for each building area in the superimposed map data, and spatially divides the tree-dimensional data based on area information of roads/railroads/rivers/sea and the like obtained from the area information extracting means 5 (step S32 in FIG. 19). There may be cases where these building candidate areas and areas divided according to area information overlap one another. For example, they are the cases where the building area may be included in an urban area but cannot exist in a sea area, and so on.

For each set building candidate area and areas divided according to area information, the in-area histogram analysis means 33 performs statistic analysis to obtain a histogram, and so on for the three-dimensional data values included in the area (step S33 in FIG. 19).

The modification condition setting means 35 defines modification conditions for the three-dimensional data corresponding to area information of the above described each land uses (step S34 in FIG. 19). To give a specific example, internal discontinuous three-dimensional data is considered as errors and is smoothed in the case of road areas, and for sea and river areas, since correct three-dimensional data cannot be obtained by general stereo matching methodologies due to the fact that they are almost uniform areas with no textures and that they are influenced by changes in shapes, reflection of sunlight and the like, the height is defined as "0" uniformly in the case of sea, or height information of the adjacent land is used in the case of rivers.

For each area, the DEM data modifying means 34 selects several values exhibiting high frequency in accordance with the modification conditions for each area information set in the modification condition setting means 35, and replaces those values of selected points with the value of highest frequency in the three-dimensional data near those selected points in the three-dimensional data within the area to modify three-dimensional data.

That is, for each area, the DEM data modifying means 34 selects several values of high frequency from the histogram of each area as a representative value of the area in accordance with the modification conditions for each set area (step S35 in FIG. 19), and adds labels corresponding to the representative value for pixels having values of the DEM data in the range extending from the representative value to a predetermined threshold, of respective pixels in the area (step S36 in FIG. 19).

Thereafter, for each pixel remaining without being associated with the representative value, the DEM data modifying means 34 examines the distribution of the labels added to nearby pixels, and selects a label of high frequency as a label of the pixel (step S37 in FIG. 19). When labels are determined for all the pixels in the building area (step S38 in FIG. 19), the DEM data modifying means 34 replaces the value of each pixel with the representative value set for the label (step S39 in FIG. 19). This processing of replacement of the representative values by the DEM data modifying means 34 is similar to that described above using FIGS. 11 to 15.

As described above, since the three-dimensional data is all obtained automatically on the computer by the stereo processing means 2, the DEM data automatically correcting means 3 and the area information extracting means 5, operations by operators are not required.

Also, in addition to information of external shape of buildings of the map data, the three-dimensional data modification conditions corresponding to area information are set, and erroneous data included in the three-dimensional data is corrected based thereon, thereby making it possible to obtain the three-dimensional data more accurate than those by conventional methods not only in the building area but also in other areas.

Figure 20:
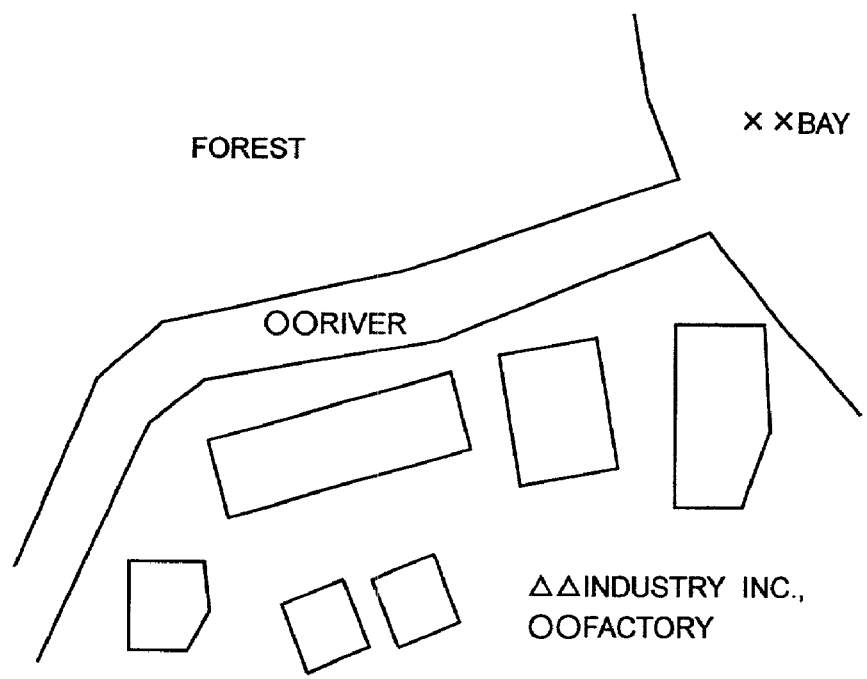
FIG. 20 is a schematic diagram showing one example of map data including area information.

FIG. 20 is a schematic diagram showing one example of the map data including area information. Specific operations according to the second embodiment of the present invention will be described referring to this FIG. 20. The second embodiment of the present invention is similar to the above described first embodiment of the present invention in that the satellite stereo images as described above previously stored in the satellite image storing means 1 are first given to the stereo processing means 2, and the stereo matching processing is automatically performed on the computer in the same fashion as a conventional method. Also, it is similar to the above described first embodiment of the present invention in that images of the three-dimensional data as shown in FIG. 6 are obtained by using stereo matching by the area correlation method.

This embodiment is different from the first embodiment of the present invention in the sense that not only information of external shape of buildings but also area information of roads, forests, water areas and the like such as one example of the map data shown in FIG. 20, of the map data stored in the map data storing means 4, are extracted from the map data by the area information extracting means 5, and are used for processing of correcting the three-dimensional data in the DEM data automatically correcting means 3.

This processing of correcting the three-dimensional data in the DEM data automatically correcting means 3 will be described specifically. First, the registration means 31 superimposes the three-dimensional data and satellite image obtained in the same fashion as the first embodiment of the present invention on the map data in such a manner that corresponding points match one another.

After they are superimposed, the area dividing means 36 uses the area information extracted from the map data by the area information extracting means 5 to divide spatially the three-dimensional data, and corresponding three-dimensional areas are set also for each building area as in the case of the area setting means 32 of the first embodiment of the present invention.

For each area obtained in this way, three dimensional data values exhibiting high frequency are determined as representative values for each area by the in-area histogram analysis means 33, in the same fashion as the first embodiment of the present invention.

Also, modification conditions of three-dimensional data corresponding to area information of the above described each land use are defined by the modification condition setting means 35. To give a specific example, a method similar to that of the first embodiment of the present invention is used in the case of areas inside an urban zone in which buildings are supposed to exist, but internal discontinuous three-dimensional data is considered as errors and is smoothed in the case of road areas even if they exist in the same urban zone.

Also, for sea and river areas, since correct three-dimensional data cannot be obtained by general stereo matching methodologies due to the fact that they are almost uniform areas with no textures and that they are influenced by changes in shapes, reflection of sunlight and the like, the height is defined as "0" uniformly in the case of sea, or height information of the adjacent land (the most frequent values of the three-dimensional data) is directly used in the case of rivers. In addition, in the case of forests and the like, methods in which only points showing three-dimensional data values obviously different from the surroundings are modified, and so on are employed.

In accordance with such modification conditions, the DEM data modifying means 34 uses representative values obtained for each area by the in-area histogram analysis means 33 to correct automatically the three-dimensional data in each area. The above process operations are process operations of the second embodiment of the present invention.

Figure 21:
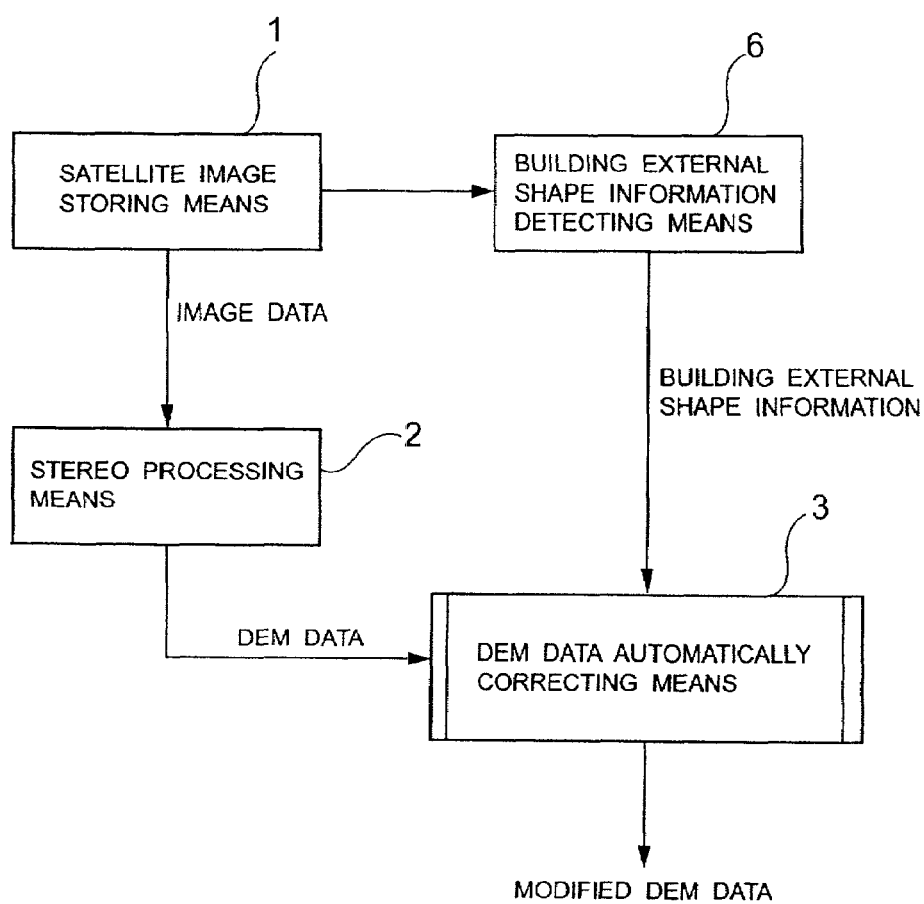
FIG. 21 is a block diagram showing the configuration of the stereo image processing apparatus according to the third embodiment of the present invention.

FIG. 21 is a block diagram showing the configuration of the stereo image processing apparatus according to the third embodiment of the present invention. In FIG. 21, the stereo image processing apparatus according to the third embodiment of the present invention comprises satellite image storing means 1, stereo processing means 2, DEM data automatically correcting means 3 and building external shape information detecting means 6.

The satellite image storing means 1 stores satellite image data. The stereo processing means 2 subjects the satellite image data obtained from the satellite image storing means 1 to stereo matching processing to generate three-dimensional data.

The DEM data automatically correcting means 3 automatically corrects erroneous data to be corrected such as noises and losses in the three-dimensional data obtained by the stereo processing means 2, by using information of external shape of buildings and the like obtained separately from the building external shape information detecting means 6. The building external shape information detecting means 6 analyzes the satellite images stored in the satellite image storing means 1 to extract the information of external shape of buildings.

Since the DEM data automatically correcting means 3 in the third embodiment of the present invention has a configuration similar to that of the DEM data automatically correcting means 3 in the first embodiment of the present invention shown in FIG. 2 except that information of external shape of buildings is inputted from the building external shape information detecting means 6, description of its configuration is not presented here.

Figure 22:
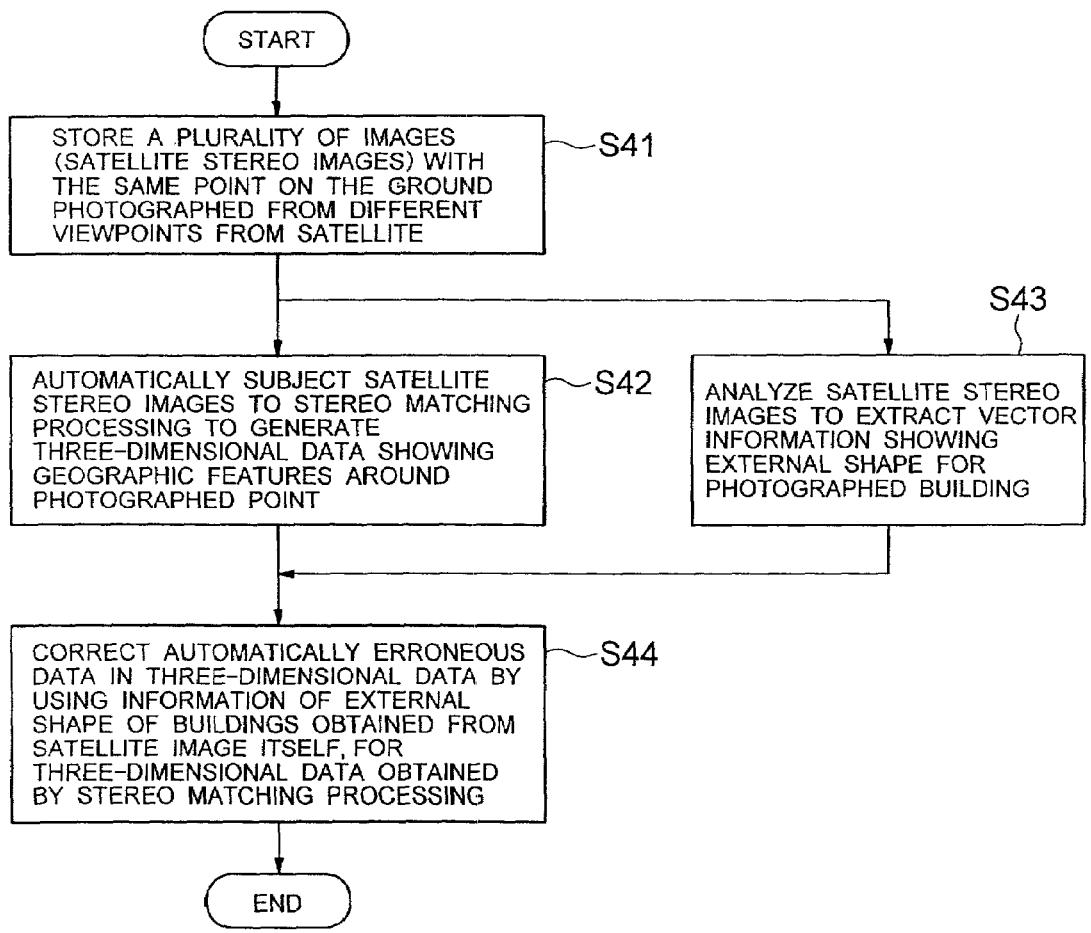
FIG. 22 is a flowchart showing operations of the stereo image processing apparatus according to the third embodiment of the present invention.
Figure 23:
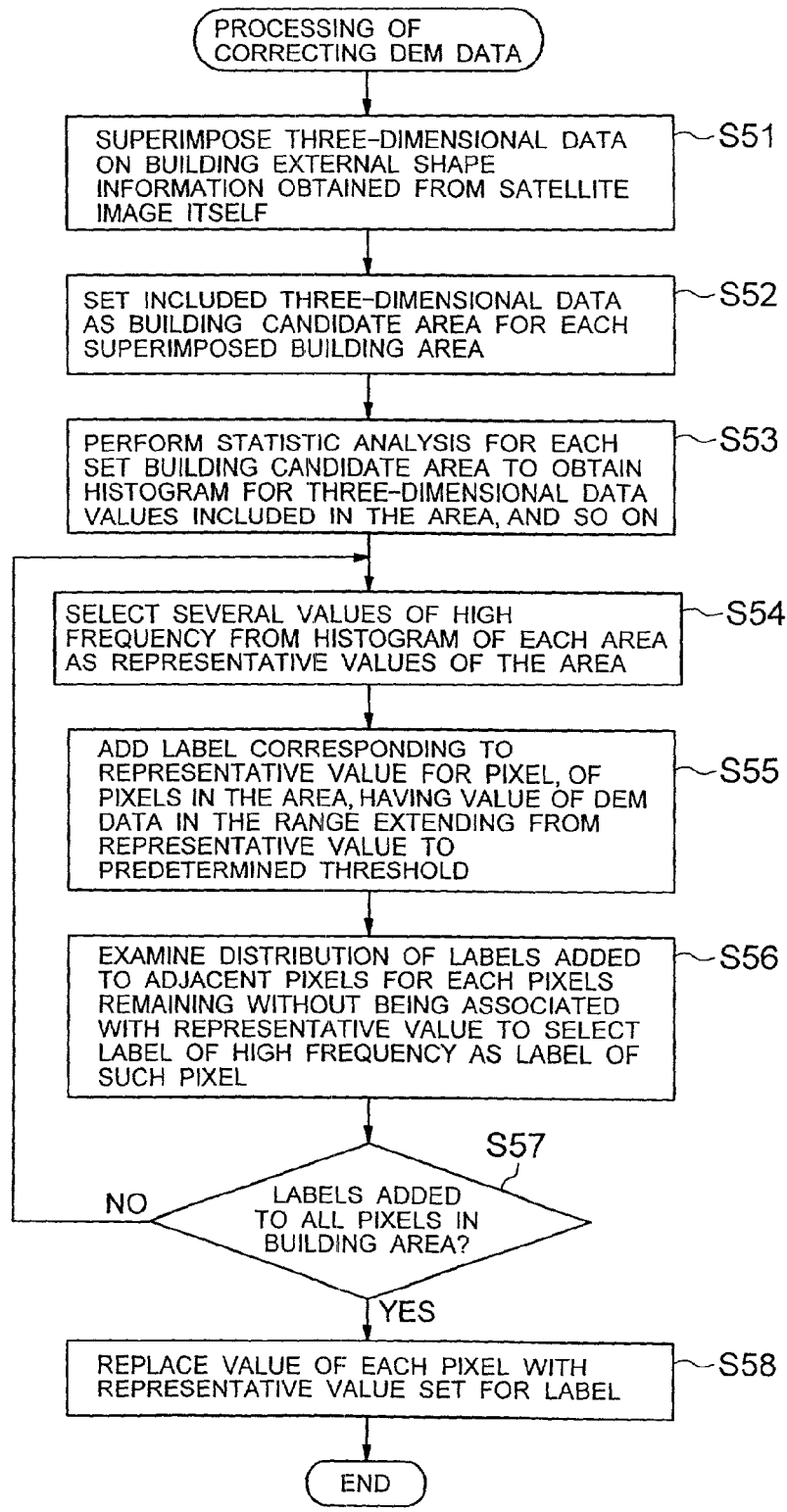
FIG. 23 is a flowchart showing operations of DEM data automatically correcting means in FIG. 21.

FIG. 22 is a flowchart showing operations of the stereo image processing apparatus according to the third embodiment of the present invention, and FIG. 23 is a flowchart showing operations of the DEM data automatically correcting means 3 in FIG. 16. The operations of the stereo image processing apparatus according to the third embodiment of the present invention will be described referring to these FIGS. 21 to 23.

First, a plurality of images obtained by photographing the same point on the ground from different viewpoints from the satellite, namely satellite stereo images are stored in the satellite image storing means 1 (step S41 in FIG. 22), and those satellite stereo images are given to the stereo processing means 2 and the building external shape information detecting means 6.

The stereo processing means 2 automatically subjects the obtained satellite stereo images to stereo matching processing to generate the three-dimensional data showing geographic features around the photographed point (step S42 in FIG. 22). Also in this embodiment, no limits are imposed on methodologies for use in the stereo matching processing as in the case of the first embodiment of the present invention.

The building external shape information detecting means 6 analyzes the obtained satellite stereo images, and extracts vector information showing the external shape for the photographed building (step S43 in FIG. 22). Specifically, in the building external shape information detecting means 6, groups composed mainly of lines such as rectangles, among closed curve groups obtained by binarizing results of edge detection for the image and sublinearizing the same to perform coupling processing, are selected as information of external shape of buildings.

For the three-dimensional data obtained by the stereo matching processing, the DEM data automatically correcting means 3 uses the information of external shape of buildings obtained from the satellite image itself by the building external shape information detecting means 6 to correct automatically erroneous data in three-dimensional data (step S44 in FIG. 22).

In the DEM data automatically correcting means 3, the registration means 31 superimposes the three-dimensional data on the information of external shape of buildings obtained by the building external shape information detecting means 6 (step S51 in FIG. 23). In this case, since the images to be used as the reference are the same, transformation processing for matching geodetic systems is not usually required.

The area setting means 32 sets the internally included three-dimensional data as a building candidate area for each superimposed building area (step S52 in FIG. 23). For each set building candidate area, the in-area histogram analysis means 33 performs statistic analysis to obtain a histogram, and so on for the three-dimensional data included in the area (step S53 in FIG. 23).

For each area, the DEM data modifying means 34 selects several values exhibiting high frequency, and replaces those values of selected points with the value of highest frequency in the three-dimensional data near those selected points in the three-dimensional data within the area to modify the three-dimensional data.

That is, the DEM data modifying means 34 selects several values of high frequency from the histogram of each area as a representative value of the area (step S54 in FIG. 23), and adds labels corresponding to the representative value for pixels having values of DEM data in the range extending from the representative value to a predetermined threshold, of respective pixels in the area (step S55 in FIG. 23).

Thereafter, for each pixel remaining without being associated with the representative value, the DEM data modifying means 34 examines the distribution of the labels added to nearby pixels, and selects a label of high frequency as a label of the pixel(step S56 in FIG. 23). When labels are determined for all the pixels in the building area (step S57 in FIG. 23), the DEM data modifying means 34 replaces the value of each pixel with the representative value set for the label (step S58 in FIG. 23). This processing of replacement of representative values by the DEM data modifying means 34 is similar to that described above using FIGS. 11 to 15.

As described above, since the three-dimensional data is all obtained automatically on the computer by the stereo processing means 2, the DEM data automatically correcting means 3 and the building external shape information detecting means 6, operations by operators are not required.

Also, by correcting three-dimensional data based on information of external shape of buildings with the three-dimensional data extracted and analyzed only from the satellite images, three-dimensional data more accurate than those by conventional methods can be obtained even in the case where the map data cannot be obtained and where information described in the map data does not match the satellite images because the information is old and so on.

In addition, specific process operations according to the third embodiment of the present invention will be described. The third embodiment of the present invention is similar to the above described first embodiment of the present invention in that satellite stereoimages as described above previously stored in the satellite image storing means 1 are first given to the stereo processing means 2, and the stereo matching processing is automatically performed on the computer in the same fashion as a conventional method, Also, it is similar to the above described first embodiment of the present invention in that images of the three-dimensional data as shown in FIG. 6 are obtained by using stereo matching by the area correlation method.

The satellite stereo images stored in the satellite image storing means 1 are further analyzed by the building external shape information detecting means 6, and for the photographed building, vector information showing its external shape is extracted. Specifically, groups composed mainly of lines such as rectangles, among closed curve groups obtained by binarizing results of edge detection for the satellite image and sublinearizing the same to perform coupling processing, are selected, and a vector sequence connecting each apex is obtained as information of the external shape of buildings.

Also, operation of correcting automatically erroneous data in the three-dimensional data obtained by the DEM data automatically correcting means 3 is performed, but in this embodiment, the information of the external shape of buildings obtained from the satellite image itself by the above described building external shape information detecting means 6 is used to correct the three-dimensional data in the same fashion as the first embodiment of the present invention. The above described process operation is the process operation of the third embodiment of the present invention.

Figure 24:
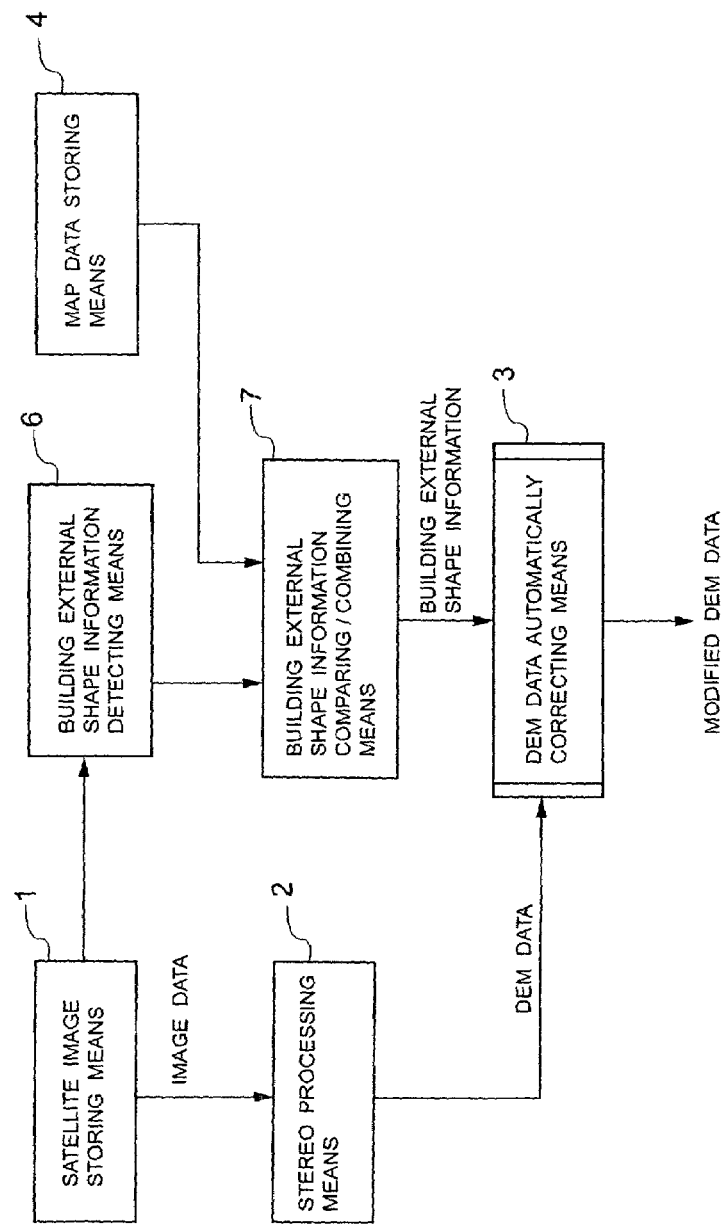
FIG. 24 is a block diagram showing the configuration of the stereo image processing apparatus according to the fourth embodiment of the present invention.

FIG. 24 is a block diagram showing the configuration of the stereo image processing apparatus according to the fourth embodiment of the present invention. In FIG. 24, the stereo image processing apparatus according to the fourth embodiment of the present invention comprises satellite image storing means 1, stereo processing means 2, DEM data automatically correcting means 3, map data storing means 4, building external shape information detecting means 6 and building external shape information comparing/combining means 7.

The satellite image storing means 1 stores satellite image data. The stereo processing means 2 subjects the satellite image data obtained from the satellite image storing means 1 to stereo matching processing to generate three-dimensional data. The DEM data automatically correcting means 3 automatically corrects erroneous data to be corrected such as noises and losses in the three-dimensional data obtained from the stereo processing means 2, by using information of external shape of buildings and the like obtained separately from the building external shape information comparing/combining means 7.

The map data storing means 4 provides map data such as information of the external shape of buildings. The building external shape information detecting means 6 analyzes the satellite image stored in the satellite image storing means 1 to extract the information of the external shape of buildings. The building external shape information comparing/combining means 7 compares and combines the information of the external shape of buildings of the map data provided from the map data storing means 4 with the information of the external shape of buildings extracted by the building external shape information detecting means 6.

Since the DEM data automatically correcting means 3 in the fourth embodiment of the present invention is similar in configuration to the DEM data automatically correcting means 3 in the first embodiment of the present invention shown in FIG. 2 except that information of the external shape of buildings is inputted from the building external shape information comparing/combining means 7, description of its configuration is not presented here.

Figure 25:
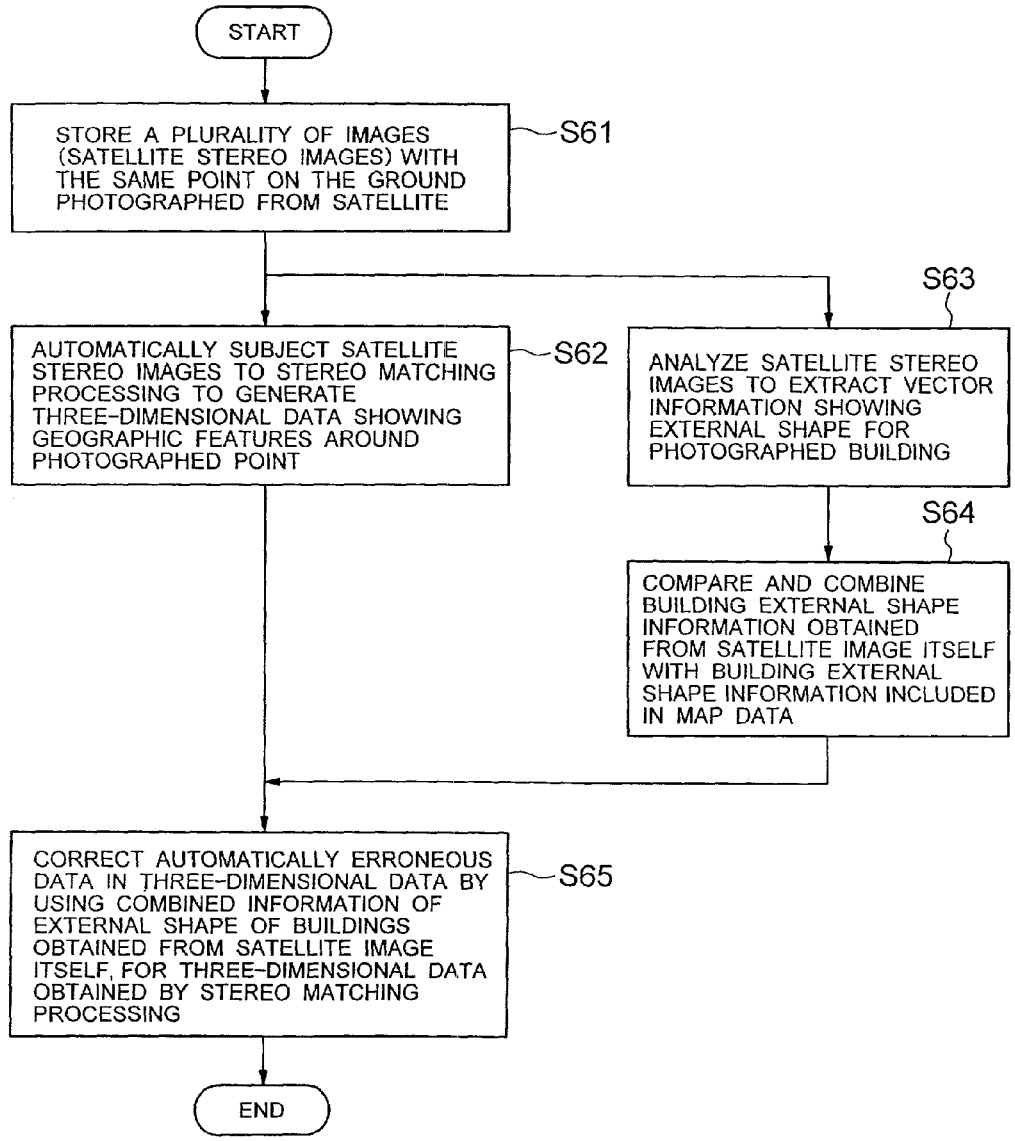
FIG. 25 is a flowchart showing operations of the stereo image processing apparatus according to the fourth embodiment of the present invention.
Figure 26:
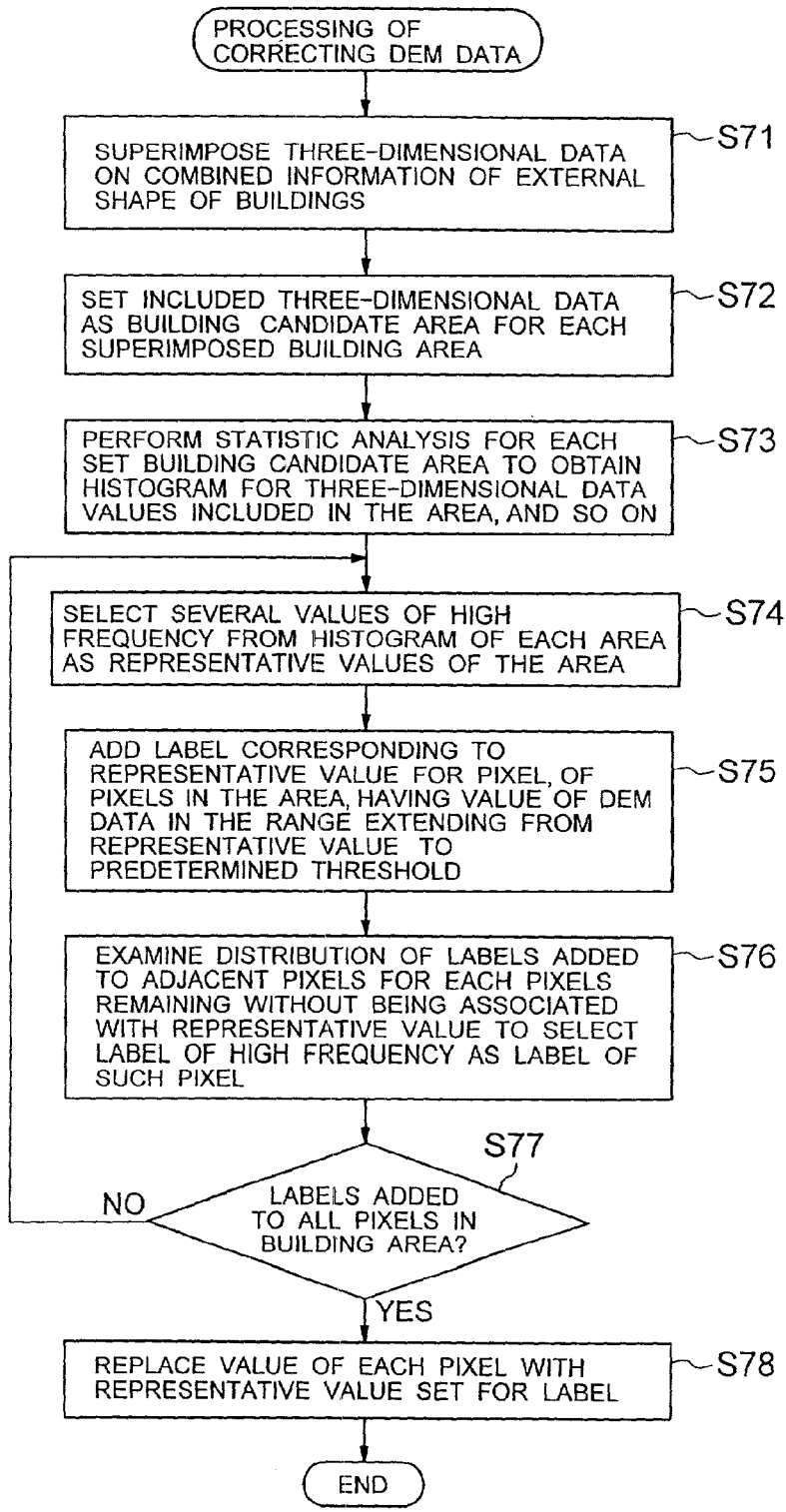
FIG. 26 is a flowchart showing operations of DEM data automatically correcting means in FIG. 24.

FIG. 25 is a flowchart showing operations of the stereo image processing apparatus according to the fourth embodiment of the present invention, and FIG. 26 is a flowchart showing operations of the DEM data automatically correcting means 3 in FIG. 24. Operations of the stereo image processing apparatus according to the fourth embodiment of the present invention will be described referring to these FIGS. 24 to 26.

First, a plurality of images obtained by photographing the same point on the ground from different viewpoint from the satellite, namely satellite stereo images are stored in the satellite image storing means 1 (step S61 in FIG. 25), and those satellite stereo images are given to the stereo processing means 2 and the building external shape information detecting means 6.

The stereo processing means 2 automatically subjects the obtained satellite stereo images to stereo matching processing to generate three-dimensional data showing geographic features around the photographed point (step S62 in FIG. 25). Also in this embodiment, no limits imposed are on methodologies for use in the stereo matching processing as in the case of the first embodiment of the present invention.

The building external shape information detecting means 6 analyzes the obtained satellite stereo images, and extracts vector information showing the external shape for the photographed building (step S63 in FIG. 25). Specifically, in the building external shape information detecting means 6, groups composed mainly of lines such as rectangles, among closed curve groups obtained by binarizing results of edge detection for the image and sublinearizing the same to perform coupling processing, are selected as the information of the external shape of buildings.

The building external shape information comparing/combining means 7 performs processing of comparing and combining the building external shape information extracted by the building external shape information detecting means 6 with the building external shape information included in the map data stored in the map data storing means 4 (step S64 in FIG. 25).

Specifically, a time when map data is created is often different from a time when the satellite image is obtained, and there are cases where the map data corresponding to photographed new buildings does not exist, and therefore if the information of the external shape of buildings is obtained from the satellite image by the building external shape information extracting means 6 in an area with no buildings existing on the map data, it is assumed that buildings exist, while in contrast, if the information of the external shape of buildings is obtained from map data for an area for which the information of the external shape of buildings cannot be obtained from the satellite image, it is assumed that no buildings exist in the area. An area with the external shape of buildings obtained from both the map data and satellite image can be treated as an area in which buildings exist as a matter of course, but if there is a large deviation, the map data is essentially used on a preferential basis.

For the three-dimensional data obtained by the stereo matching processing, the DEM data automatically correcting means 3 uses the information of the external shape of buildings combined by the building external shape information comparing/combining means 7 to correct automatically erroneous data in three-dimensional data (step S65 in FIG. 25).

In the DEM data automatically correcting means 3, the registration means 31 superimposes the three-dimensional data on the information of the external shape of buildings combined by the building external shape information comparing/combining means 7 (step S71 in FIG. 25).

The area setting means 32 sets the internally included three-dimensional data as a building candidate area for each superimposed building area (step S72 in FIG. 26). For each set building candidate area, the in-area histogram analysis means 33 performs statistic analysis to obtain a histogram, and so on for three-dimensional data values included in the area (step S73 in FIG. 26).

For each area, the DEM data modifying means 34 selects several values exhibiting high frequency, and replaces those values of selected points with the value of highest frequency in the three-dimensional data near those selected points in the three-dimensional data within the area to modify three-dimensional data.

That is, the DEM data modifying means 34 selects several values of high frequency from the histogram of each area as a representative value of the area (step S74 in FIG. 26), and adds labels corresponding to the representative value for pixels having values of the DEM data in the range extending from the representative value to a predetermined threshold, of respective pixels in the area (step S75 in FIG. 26).

Thereafter, for each pixel remaining without being associated with the representative value, the DEM data modifying means 34 examines the distribution of the labels added to nearby pixels, and selects a label of high frequency as a label of the pixel (step S76 in FIG. 26). When labels are determined for all the pixels in the building area (step S77 in FIG. 26), the DEM data modifying means 34 replaces the value of each pixel with the representative value set for the label (step S78 in FIG. 26). This processing of replacement of the representative value by the DEM data modifying means 34 is similar to that described above using FIGS. 11 to 15.

As described above, since three-dimensional data is all obtained automatically on the computer by the stereo processing means 2, the DEM data automatically correcting means 3, the building external shape information detecting means 6 and the building external shape information comparing/combining means 7, operations by operators are not required.

Also, since the building external shape information in the map data and the building external shape information obtained by analyzing the satellite images are used in combination, three-dimensional data more accurate than those by conventional methods can be obtained even when information described in the map data is different from the satellite images, and influence of errors when the satellite images are analyzed can be reduced because a higher priority is given to the map data in the common area.

In addition, specific process operations according to the fourth embodiment of the present invention will be described. The fourth embodiment of the present invention is similar to the above described first embodiment of the present invention in that the satellite stereo images as described above previously stored in the satellite image storing means 1 are first given to the stereo processing means 2, and the stereo matching processing is automatically performed on the computer in the same fashion as a conventional method. Also, it is similar to the above described first embodiment of the present invention in that the images of the three-dimensional data as shown in FIG. 6 are obtained by using stereo matching by the area correlation method.

The satellite stereo images stored in the satellite image storing means 1 are further analyzed by the building external shape information detecting means 6, and for the photographed building, vector information showing its external shape is extracted by a method similar to that of the third embodiment of the present invention.

The obtained vector information is given to the building external shape information comparing/combining means 7 together with data showing the external shapes of buildings in the map stored in the map data storing means 4, and processing of combining the external shapes of buildings is performed.

If a time when the map data is created is different from a time when the satellite image is obtained, there are many cases where information does not match each other because map data corresponding to a new building does not exist, or a building that would have existed for the map data has already been demolishes at the time of taking a picture for the satellite image and thus the building is not photographed. Since it can be considered that usually, new satellite images can be obtained relatively easily compared to the map data requiring a long period before it is created, processing as described below is performed considering that the satellite image is the latest.

First, the information of the external shape of buildings obtained from the image by the building external shape information extracting means 6 is compared with the information of the external shape of buildings in the map stored in the map data storing means 4, and a pair of the information of the external shape of buildings, which exist at locations only a little way from each other and of which difference in areas is smaller than a predetermined value and ratio of the common part is larger than a predetermined value, is made to correspond to each other as information indicating the same building. This building is considered as a permanently existing building, and the external shape thereof is defined as final information of external shape of buildings by using the map data.

If a corresponding building does not exist in the map data in spite of the fact that external shape information of the building has been obtained from the image, it is selected as a newly constructed building. On the other hand, if a corresponding building cannot be obtained in the image in spite of the fact that the building exists in the map data, it is assumed that the building does not exist in the area.

In addition, the final information of the external shape of buildings obtained through processing as described above by the DEM data automatic processing means 3 is used to correct automatically the three-dimensional data in the same fashion as the first embodiment of the present invention. The above described process operations are the process operations of the fourth embodiment of the present invention.

Figure 27:
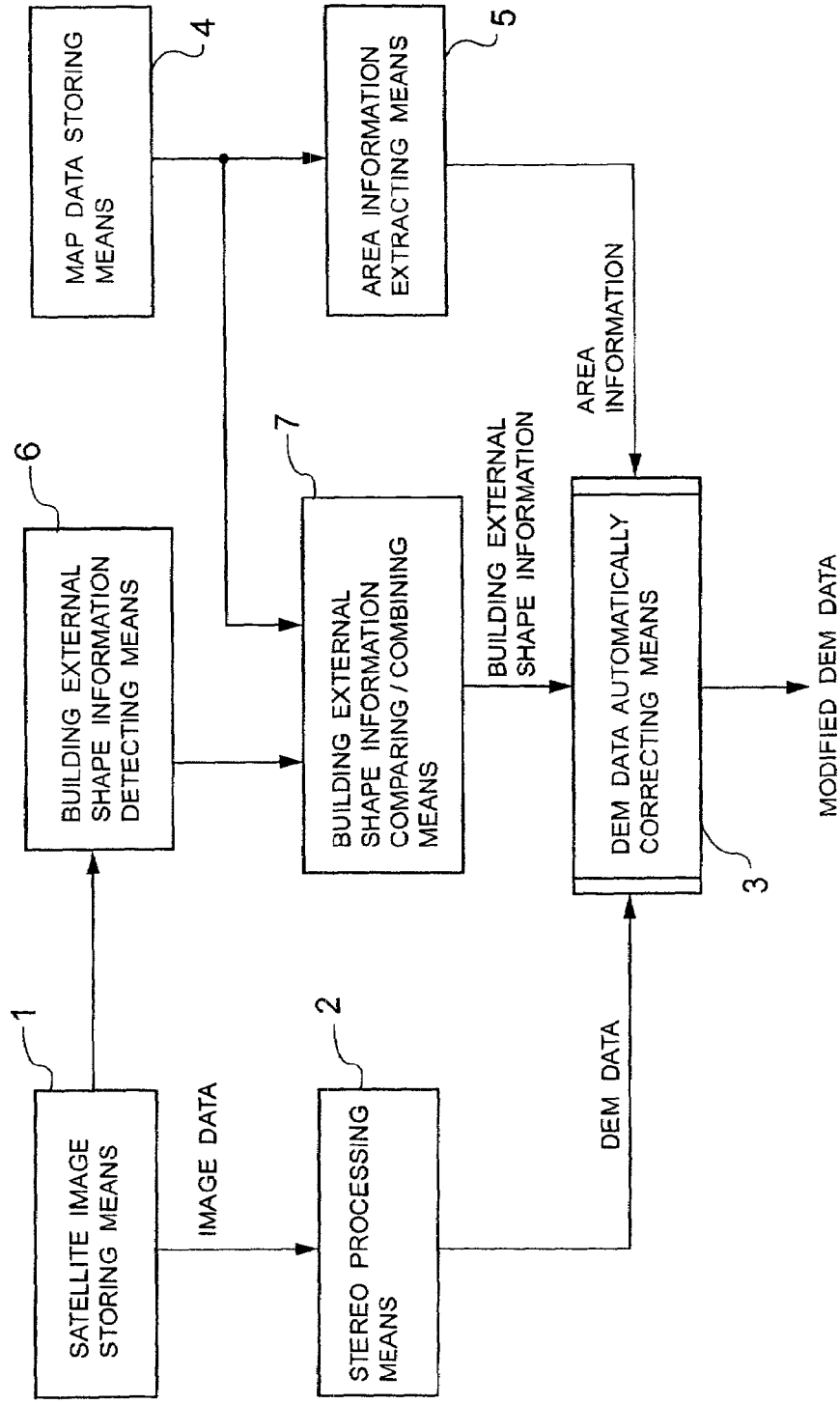
FIG. 27 is a block diagram showing the configuration of the stereo image processing apparatus according to the fifth embodiment of the present invention.

FIG. 27 is a block diagram showing the configuration of the stereo image processing apparatus according to the fifth embodiment of the present invention. In FIG. 27, the stereo image processing apparatus according to the fifth embodiment of the present invention comprises satellite image storing means 1, stereo processing means 2, DEM data automatically correcting means 3, map data storing means 4, area information extracting means 5, building external shape information detecting means 6 and building external shape information comparing/combining means 7.

The satellite image storing means 1 stores satellite image data. The stereo processing means 2 subjects the satellite image data obtained from the satellite image storing means 1 to stereo matching processing to generate three-dimensional data. The DEM data automatically correcting means 3 automatically corrects erroneous data to be corrected such as noises and losses in the three-dimensional data obtained by the stereo processing means 2, by using information of external shape of buildings and the like obtained separately from the building external shape information comparing/combining means 7.

The map data storing means 4 provides map data such as information of the external shape of buildings. The area information extracting means 5 extracts area information such as land use on the map of roads/railroads/rivers/sea and the like from the map data. The building external shape information detecting means 6 analyzes the satellite image stored in the satellite image storing means 1 to the extract information of the external shape of buildings. The building external shape information comparing/combining means 7 compares and combines the information of the external shape of buildings of the map data provided from the map data storing means 4 with the information of the external shape of buildings extracted by the building external shape information detecting means 6.

Since the DEM data automatically correcting means 3 in the fifth embodiment of the present invention is similar in configuration to the DEM data automatically correcting means 3 in the second embodiment of the present invention shown in FIG. 17 except that information of the external shape of buildings is inputted from the building external shape information comparing/combining means 7, description of its configuration is not presented here.

Figure 28:
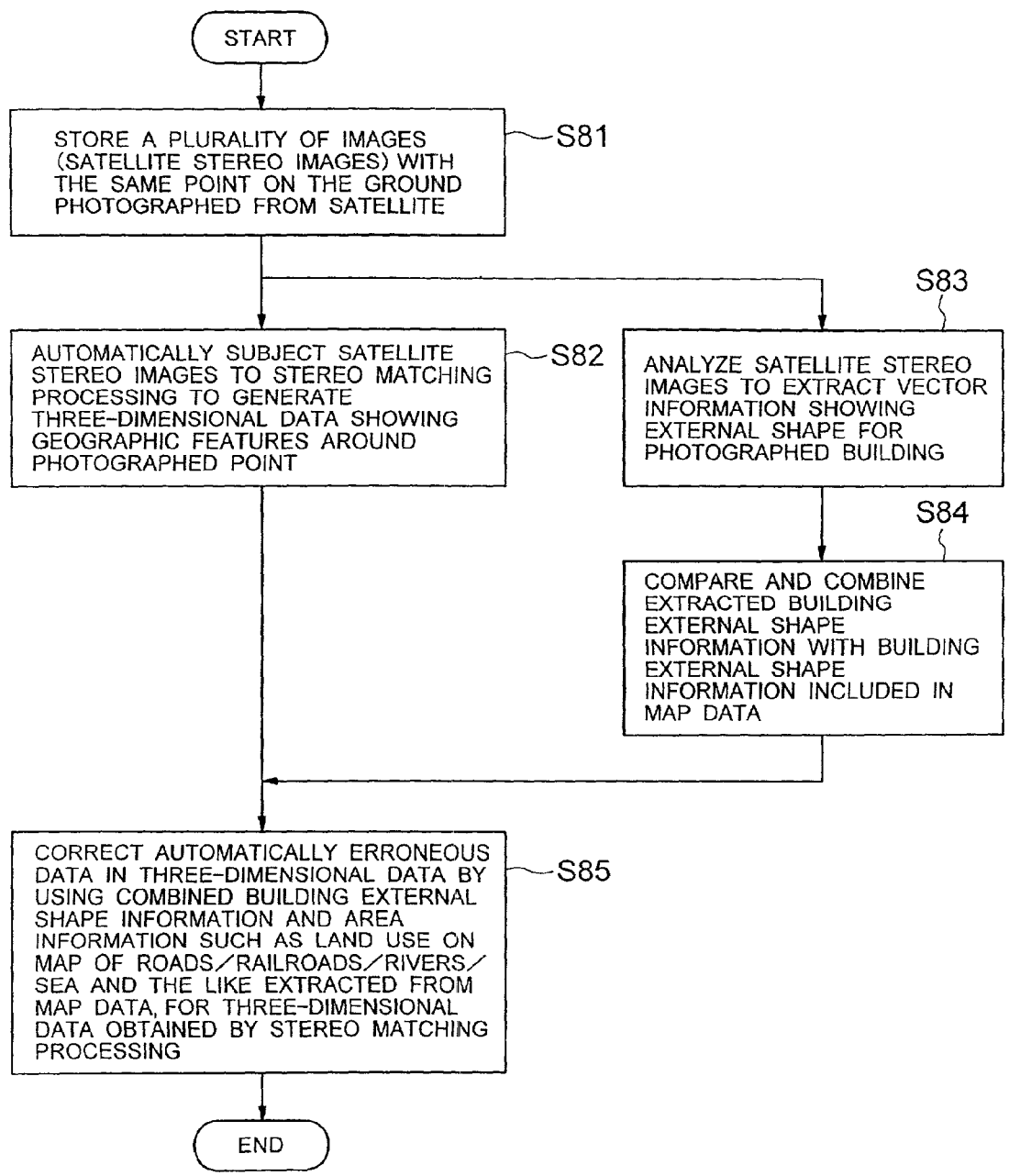
FIG. 28 is a flowchart showing operations of the stereo image processing apparatus according to the fifth embodiment of the present invention.
Figure 29A:
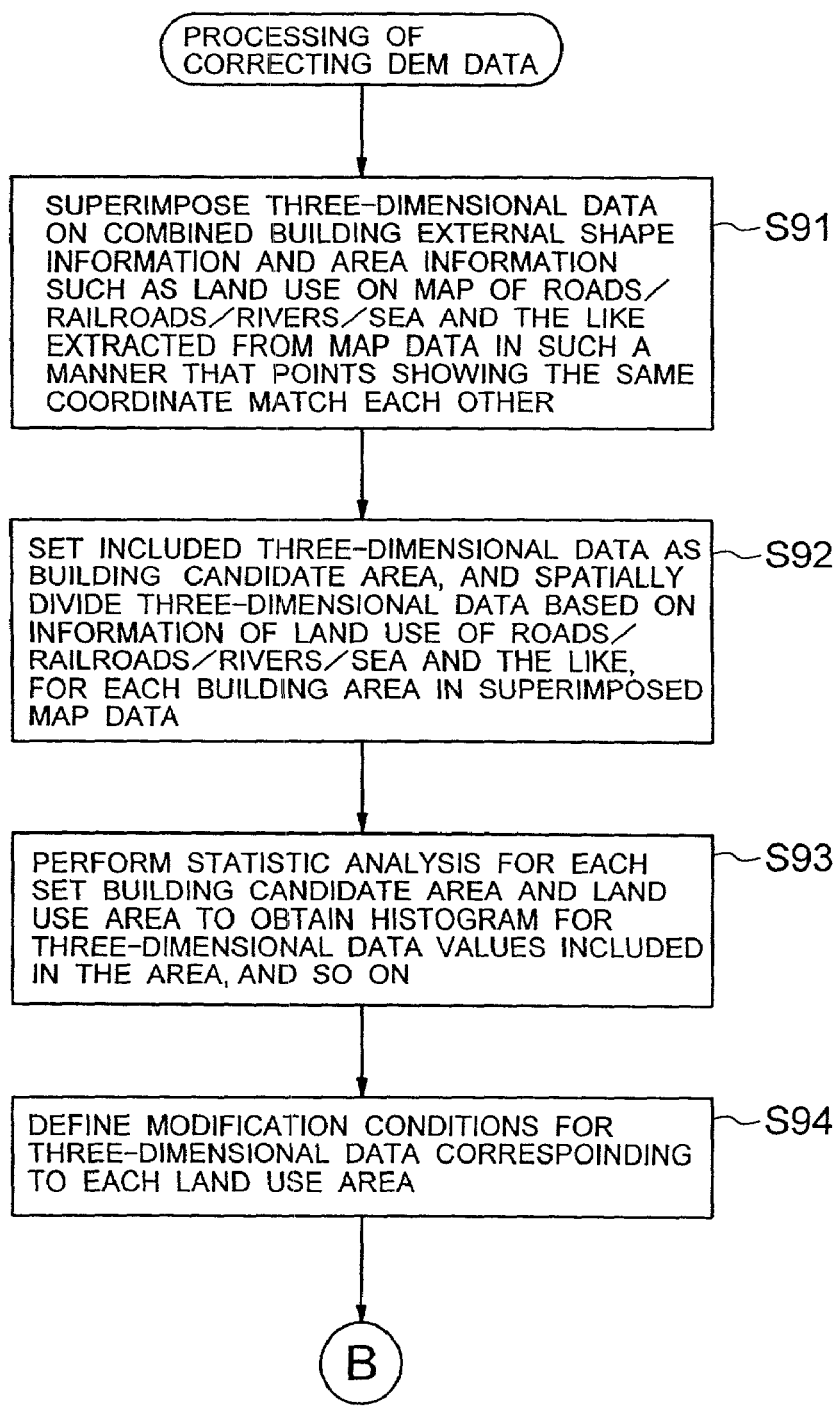
FIGS. 29A and 29B are flowcharts showing operations of DEM data automatically correcting means in FIG. 27.
Figure 29B:
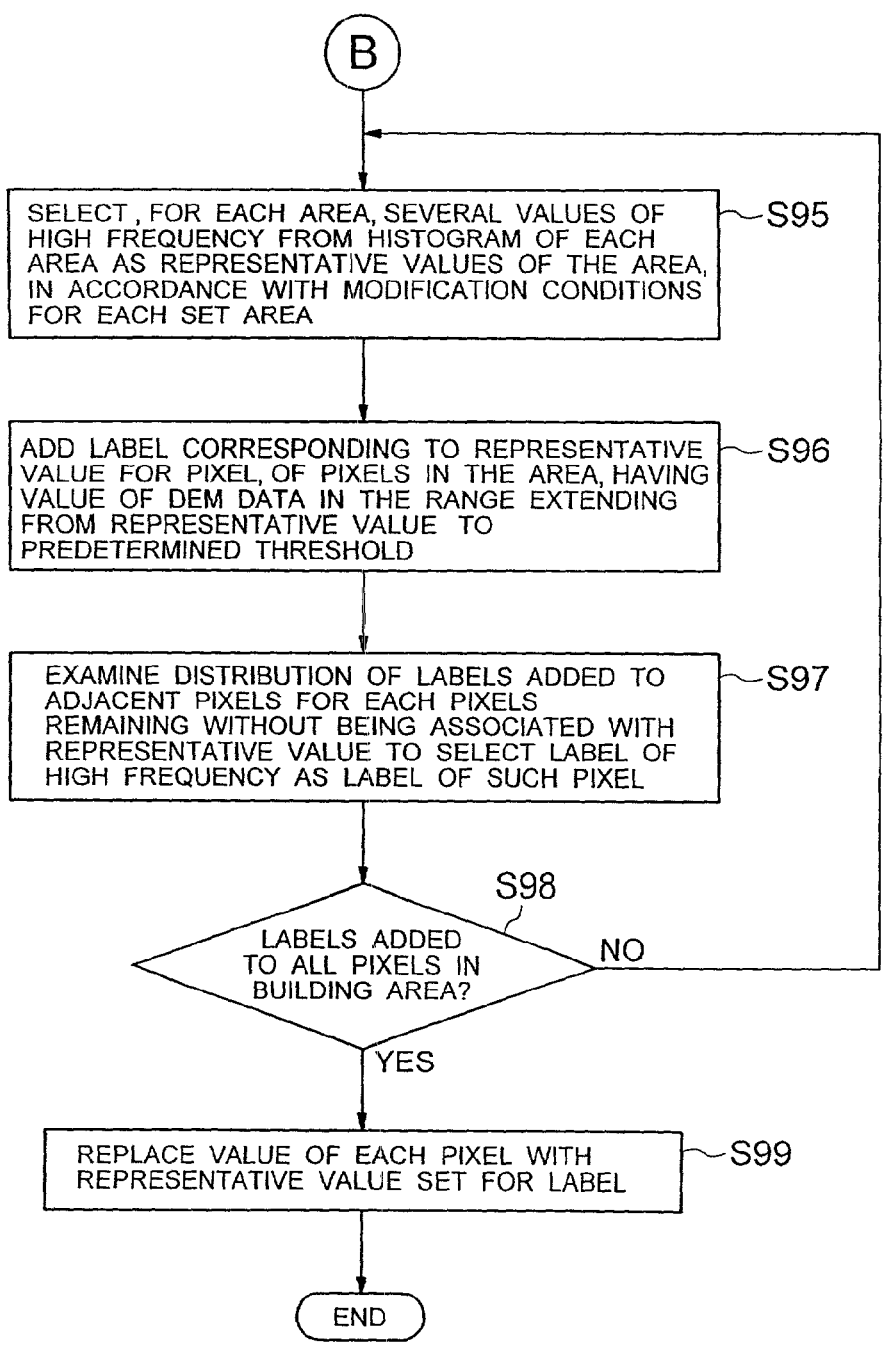

FIG. 28 is a flowchart showing operations of the stereo image processing apparatus according to the fifth embodiment of the present invention, and FIG. 29 is a flowchart showing operations of the DEM data automatically correcting means 3 in FIG. 27. Operations of the stereo image processing apparatus according to the fifth embodiment of the present invention will be described referring to these FIGS. 27 to 29.

First, a plurality of images obtained by photographing the same point on the ground from different viewpoints from the satellite, namely satellite stereo images are stored in the satellite image storing means 1 (step S81 in FIG. 28), and those satellite stereo images are given to the stereo processing means 2 and the building external shape information detecting means 6.

The stereo processing means 2 automatically subjects the obtained satellite stereo images to stereo matching processing to generate the three-dimensional data showing geographic features around the photographed point (step S82 in FIG. 28). Also in this embodiment, no limits are imposed on methodologies for use in the stereo matching processing as in the case of the first embodiment of the present invention.

The building external shape information detecting means 6 analyzes the obtained satellite stereo images, and extracts vector information showing the external shape for the photographed building (step S83 in FIG. 28). Specifically, in the building external shape information detecting means 6, groups composed mainly of lines such as rectangles, among closed curve groups obtained by binarizing results of edge detection for the image and sublinearizing the same to perform coupling processing, are selected as the information of the external shape of buildings.

The building external shape information comparing/combining means 7 performs processing of comparing and combining the building external shape information extracted by the building external shape information detecting means 6 with the building external shape information included in the map data stored in the map data storing means 4 (step S84 in FIG. 28). Since this combination processing is similar to that of the above described fourth embodiment of the present invention, description thereof is not presented here.

For the three-dimensional data obtained by the stereo matching processing, the DEM data automatically correcting means 3 uses in combination the area information such as land use on the map of roads/railroads/rivers/sea and the like extracted from the map data by the area information extracting means 5 and the combined information of the external shape of buildings obtained from the building external shape comparing/combining means 7 to correct automatically erroneous data in the three-dimensional data (step S85 in FIG. 28).

In the DEM data automatically correcting means 3, the registration means 31 superimposes the three-dimensional data on the area information such as land use on the map of roads/railroads/rivers/sea and the like extracted from the map data by the area information extracting means 5 and the information of the external shape of buildings combined by the building external shape information comparing/combining means 7 (step S91 in FIG. 29).

The area dividing means 36 sets as a building candidate area the three-dimensional data included inside for each building area in the superimposed map data, and spatially divides the tree-dimensional data based on area information of roads/railroads/rivers/sea and the like obtained from the area information extracting means 5 (step S92 in FIG. 29). Since the division process by the area dividing means 36 is similar to that of the above described second embodiment of the present invention, the description thereof is not presented here.

For each area set by the area dividing means 36, the in-area histogram analysis means 33 performs statistic analysis to obtain a histogram, and soon for three-dimensional data values included in the area (step S93 in FIG. 29). The modification condition setting means 35 defines modification conditions for the three-dimensional data corresponding to area information of the above described each land uses (step S94 in FIG. 29). Since the setting of the modification conditions of three-dimensional data by the modification condition setting means 35 is similar to that of the above described second embodiment of the present invention, description thereof is not presented here.

For each area, the DEM data modifying means 34 selects several values exhibiting high frequency in accordance with the modification conditions for each area set in the modification condition setting means 35, and replaces those values of selected points with the value of highest frequency in the three-dimensional data near those selected points in the three-dimensional data within the area to modify three-dimensional data.

That is, for each area, the DEM data modifying means 34 selects several values of high frequency from the histogram of each area as a representative value of the area in accordance with the modification conditions for each set area (step S95 in FIG. 29), and adds labels corresponding to the representative value for pixels having values of DEM data in the range extending from the representative value to a predetermined threshold, of respective pixels in the area (step S96 in FIG. 29).

Thereafter, for each pixel remaining without being associated with the representative value, the DEM data modifying means 34 examines the distribution of the labels added to nearby pixels, and selects a label of high frequency as a label of the pixel (step S97 in FIG. 29). When labels are determined for all the pixels in the building area (step S98 in FIG. 29), the DEM data modifying means 34 replaces the value of each pixel with the representative value set for the label (step S99 in FIG. 29). This processing of replacement of representative values by the DEM data modifying means 34 is similar to that described above using FIGS. 11 to 15.

As described above, since three-dimensional data is all obtained automatically on the computer by the stereo processing means 2, the DEM data automatically correcting means 3, the area information extracting means 5, the building external shape information detecting means 6 and the building external shape information comparing/combining means 7, operations by operators are not required.

Also, as in the case of the above described fourth embodiment of the present invention, since the building external shape information in the map data and the building external shape information obtained by analyzing the satellite images are used in combination, the three-dimensional data more accurate than those by conventional methods can be obtained even when information described in the map data is different from the satellite images, and influence of errors when the satellite images are analyzed can be reduced because a higher priority is given to the map data in the common area.

In addition, since three-dimensional data modification conditions corresponding to area information in the map data are set to correct erroneous data included in the three-dimensional data, the three-dimensional data more accurate than those by conventional methods can be obtained not only in building areas but in other areas.

Figure 30:
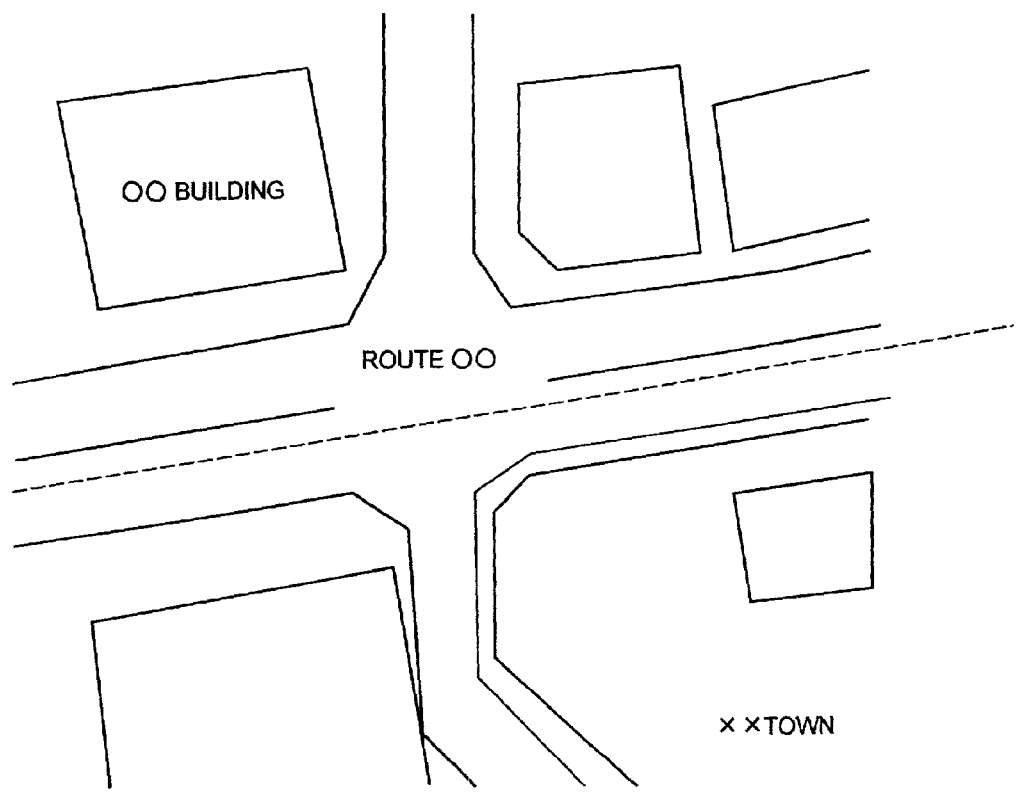
FIG. 30 is a schematic diagram showing one example of map data including area information.

FIG. 30 is a schematic diagram showing one example of the map data including area information. Specific operations of the fifth embodiment of the present invention will be described referring to this FIG. 30. The fifth embodiment of the present invention is similar to the above described first embodiment of the present invention in that the satellite stereo images as described above previously stored in the satellite image storing means 1 are first given to the stereo processing means 2, and the stereo matching processing is automatically performed on the computer in the same fashion as a conventional method. Also, it is similar to the above described first embodiment of the present invention in that images of three-dimensional data as shown in FIG. 6 are obtained by using stereo matching by the area correlation method.

The satellite stereo images stored in the satellite image storing means 1 are further analyzed by the building external shape information detecting means 6, and for the photographed building, vector information showing its external shape is extracted by a method similar to that of the above described third embodiment of the present invention. The obtained vector information is given to the building external shape information comparing/combining means 7 together with data showing the external shapes of buildings in the map stored in the map data storing means 4, and processing of combining the external shapes of buildings is performed. This combination processing is similar to operations of the building external shape information comparing/combining means 7 in the above described fourth embodiment of the present invention.

Also, area information of roads, forests, water areas and the like is extracted from map data included in the the map data storing means 4 and as shown in FIG. 30 by the area information extracting means 5, and is given to the DEM data automatically correcting means 3 along with the building external shape information obtained by the above described process, and processing of correcting three-dimensional data is automatically performed in the same fashion as the second embodiment of the present invention. The above described operations are the process operations according to the fifth embodiment of the present invention.

Figure 31:
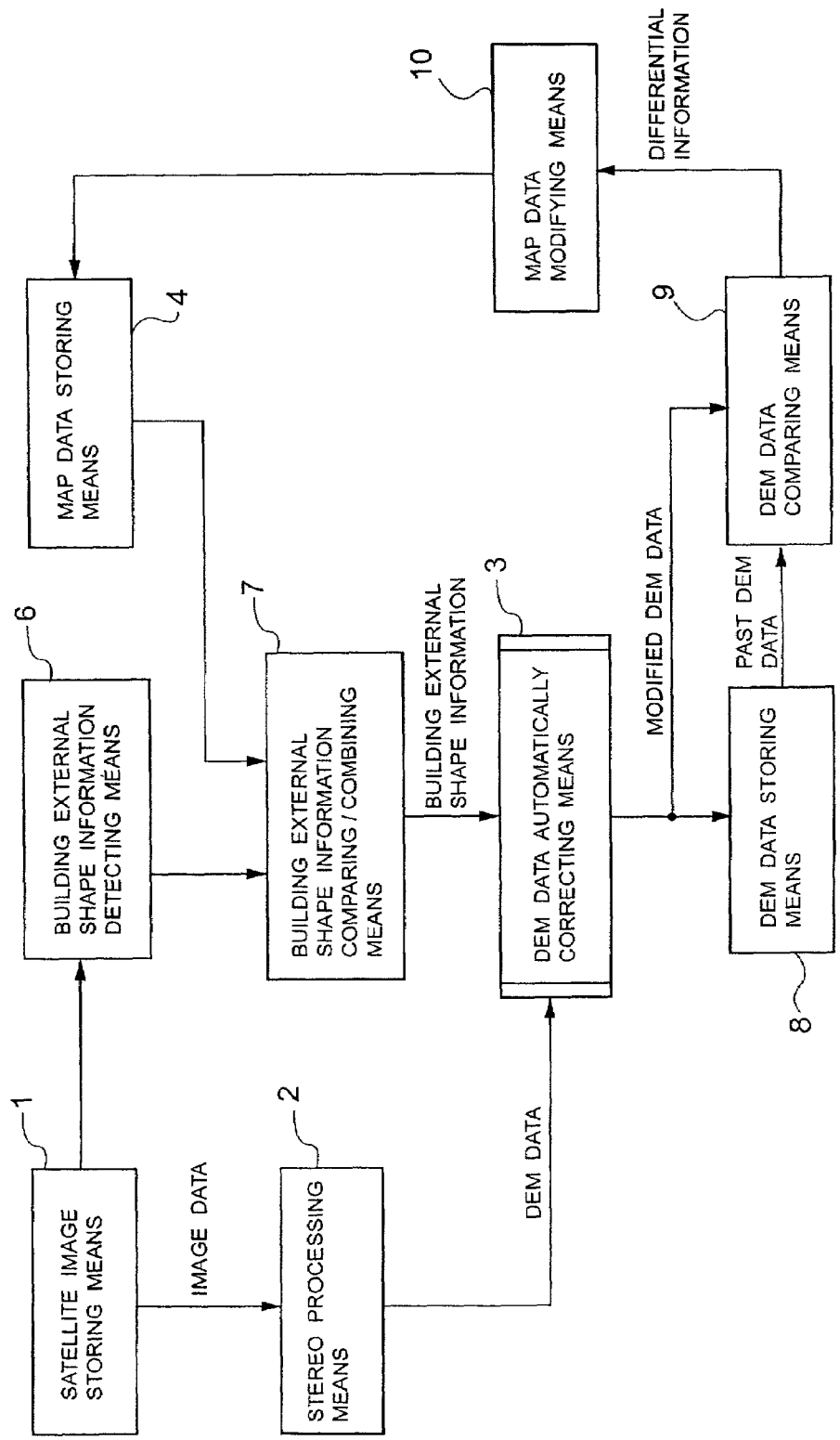
FIG. 31 is a block diagram showing the configuration of the stereo image processing apparatus according to the sixth embodiment of the present invention.

FIG. 31 is a block diagram showing the configuration of the stereo image processing apparatus according to the sixth embodiment of the present invention. In FIG. 31, the stereo image processing apparatus according to the sixth embodiment of the present invention comprises satellite image storing means 1, stereo processing means 2, DEM data automatically correcting means 3, map data storing means 4, building external shape information detecting means 6, building external shape information comparing/combining means 7, DEM data storing means 8, DEM data comparing means 9 and map data modifying means 10.

The satellite image storing means 1 stores satellite image data. The stereo processing means 2 subjects the satellite image data obtained from the satellite image storing means 1 to stereo matching processing to generate three-dimensional data. The DEM data automatically correcting means 3 automatically corrects erroneous data to be corrected such as noises and losses in the three-dimensional data obtained from the stereo processing means 2, by using information of external shape of buildings and the like obtained separately from the building external shape information comparing/combining means 7.

The map data storing means 4 provides map data such as the information of the external shape of buildings. The building external shape information detecting means 6 analyzes the satellite image stored in the satellite image storing means 1 to extract the information of the external shape of buildings. The building external shape information comparing/combining means 7 compares and combines the information of the external shape of buildings of the map data provided from the map data storing means 4 with the information of the external shape of buildings extracted by the building external shape information detecting means 6.

The DEM data storing means 8 stores the modified three-dimensional data outputted from the DEM data automatically correcting means 3. The DEM data comparing means 9 compares three-dimensional data previously stored in the DEM data storing means 8 with the modified three-dimensional data outputted from the DEM data automatically correcting means 3. The map data modifying means 10 modifies the map data stored in the map data storing means 4, based on differential information of the past three dimensional data and current three-dimensional data obtained by the DEM data comparing means 9.

Since the DEM data automatically correcting means 3 in the sixth embodiment of the present invention is similar in configuration to the DEM data automatically correcting means 3 in the first embodiment of the present invention shown in FIG. 2 except that the information of the external shape of buildings is inputted from the building external shape information comparing/combining means 7, description of its configuration is not presented here.

Figure 32:
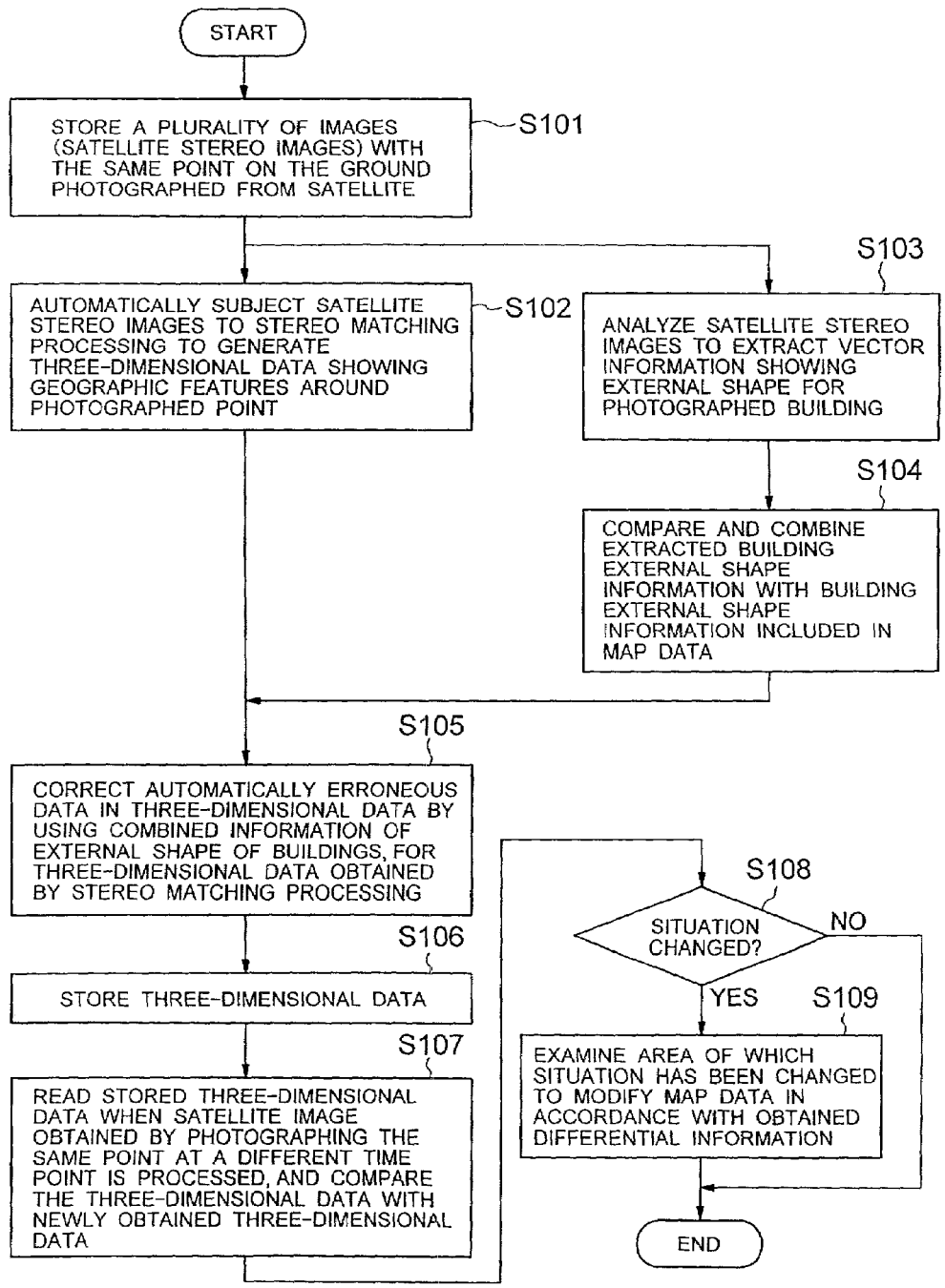
FIG. 32 is a flowchart: showing operations of the stereo image processing apparatus according to the sixth embodiment of the present invention.
Figure 33:
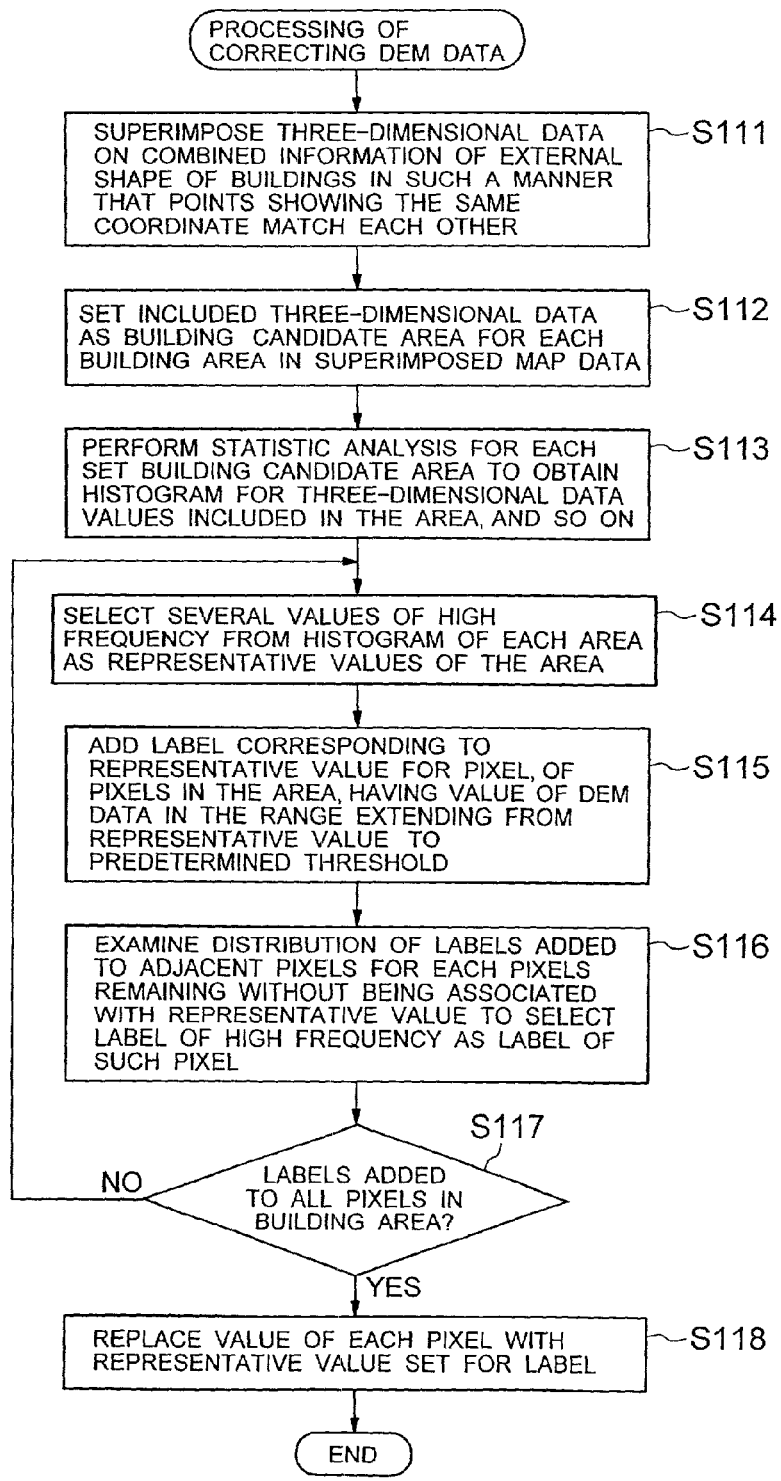
FIG. 33 is a flowchart showing operations of DEM data automatically correcting means in FIG. 31.

FIG. 32 is a flowchart showing operations of the stereo image processing apparatus according to the sixth embodiment of the present invention, and FIG. 33 is a flowchart showing operations of the DEM data automatically correcting means 3 in FIG. 31. Operations of the stereo image processing apparatus according to the sixth embodiment of the present invention will be described referring to these FIGS. 31 to 32.

First, a plurality of images obtained by photographing the same point on the ground from different viewpoints from the satellite, namely the satellite stereo images are stored in the satellite image storing means 1 (step S101 in FIG. 32), and those satellite stereo images are given to the stereo processing means 2 and the building external shape information detecting means 6.

The stereo processing means 2 automatically subjects the obtained satellite stereo images to stereo matching processing to generate the three-dimensional data showing geographic features around the photographed point (step S102 in FIG. 32). Also in this embodiment, no limits are imposed on methodologies for use in the stereo matching processing as in the case of the first embodiment of the present invention.

The building external shape information detecting means 6 analyzes the obtained satellite stereo images, and extracts vector information showing the external shape for the photographed building (step S103 in FIG. 32). Specifically, in the building external shape information detecting means 6, groups composed mainly of lines such as rectangles, among closed curve groups obtained by binarizing results of edge detection for the image and sublinearizing the same to perform coupling processing, are selected as the information of the external shape of buildings.

The building external shape information comparing/combining means 7 performs processing of comparing and combining the building external shape information extracted by the building external shape information detecting means 6 with the building external shape information included in the map data stored in the map data storing means 4 (step S104 in FIG. 32). Specifically, this combination processing is performed in the same fashion as the above described fourth embodiment of the present invention.

Figure 36:
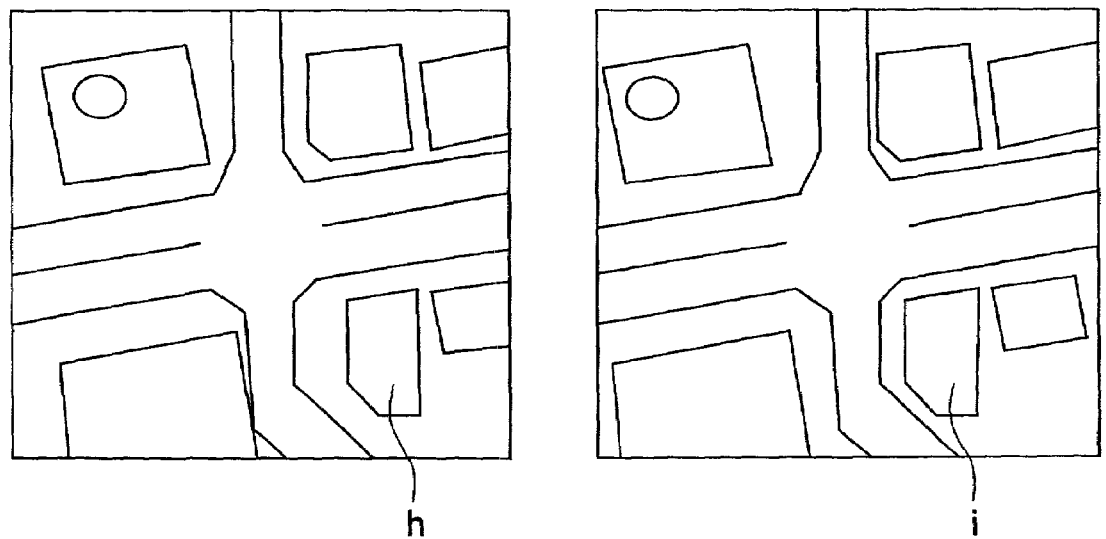
FIG. 36 illustrates processing of comparing DEM data by DEM data comparing means in FIG. 31.

For the three-dimensional data obtained by the stereo matching processing, the DEM data automatically correcting means 3 uses the information of the external shape of buildings combined by the building external shape information comparing/combining means 7 to correct automatically erroneous data in three-dimensional data (step S105 in FIG. 36).

In the DEM data automatically correcting means 3, the registration means 31 superimposes the three-dimensional data on the information of the external shape of buildings combined by the building external shape information comparing/combining means 7 (step S111 in FIG. 33).

The area setting means 32 sets the internally included three-dimensional data as a building candidate area for each superimposed building area (step S112 in FIG. 33). For each set building candidate area, the in-area histogram analysis means 33 performs statistic analysis to obtain a histogram, and so on for three-dimensional data included in the area (step S113 in FIG. 33).

For each area, the DEM data modifying means 34 selects several values exhibiting high frequency, and replaces those values of selected points with the value of highest frequency in the three-dimensional data near those selected points in the three-dimensional data within the area to modify three-dimensional data.

That is, the DEM data modifying means 34 selects several values of high frequency from the histogram of each area as a representative value of the area (step S114 in FIG. 33), and adds labels corresponding to the representative value for pixels having values of DEM data in the range extending from the representative value to a predetermined threshold, of respective pixels in the area (step S115 in FIG. 33).

Thereafter, for each pixel remaining without being associated with the representative value, the DEM data modifying means 34 examines the distribution of the labels added to nearby pixels, and selects a label of high frequency as a label of the pixel (step S116 in FIG. 33). When labels are determined for all the pixels in the building area (step S117 in FIG. 33), the DEM data modifying means 34 replaces the value of each pixel with the representative value set for the label (step S118 in FIG. 33). This processing of replacement of representative values by the DEM data modifying means 34 is similar to that described above using FIGS. 11 to 15.

The DEM data storing means 8 stores the three-dimensional data obtained as described above (step S106 in FIG. 32), and when processing is performed for a satellite image obtained by photographing the same point at a different time, the DEM data comparing means 9 reads its three-dimensional data from the DEM data storing means 8, and compares the three-dimensional data with the newly obtained three-dimensional data (step S107 in FIG. 32).

Specifically, for example, buildings and the like that did not exist at a time point in the past when a picture was taken for the satellite image, but are photographed in a new satellite image are detected by the building external shape information detecting means 6, and are recorded as buildings by the building external shape information comparing/combining means 7, and thus they exist in three-dimensional data but do not exist in the map data.

The map data modifying means 10 modifies the map data stored in the map data storing means 4 in accordance with differential information obtained by examining areas of which situations have been changed (steps S108 and S109 in FIG. 32).

As described above, since the three-dimensional data is all obtained automatically on the computer by the stereo image processing means 2, the DEM data automatically correcting means 3, the building external shape information detecting means 6 and the building external shape information comparing/combining means 7, operations by operators are not required.

Also, as in the case of the above described fourth embodiment of the present invention, since the building external shape information in the map data and the building external shape information obtained by analyzing the satellite images are used in combination, the three-dimensional data more accurate than those by conventional methods can be obtained even when information described in the map data is different from the satellite images, and influence of errors when the satellite images are analyzed can be reduced because a higher priority is given to the map data in the common area.

In addition, since the map data is updated from differential information relative to the past result of extraction of the three-dimensional data, the embodiment can be applied even when new map data cannot be obtained for an area in which the satellite image is formed, and the updated map data itself can be used for creation of maps, geographic information systems and the like.

Specific operations according to the sixth embodiment of the present invention will now be described. The sixth embodiment of the present invention is similar to the above described first embodiment of the present invention in that the satellite stereo images as described above previously stored in the satellite image storing means 1 are first given to the stereo processing means 2, and the stereo matching processing is automatically performed on the computer in the same fashion as a conventional method. Also, it is similar to the above described first embodiment of the present invention in that images of the three-dimensional data as shown in FIG. 6 are obtained by using the stereo matching by the area correlation method.

The satellite stereo images stored in the satellite image storing means 1 are further analyzed by the building external shape information detecting means 6, and for the photographed building, vector information showing its external shape is extracted by a method similar to that of the above described third embodiment of the present invention. The obtained vector information is given to the building external shape information comparing/combining means 7 along with data showing external shapes of buildings in the map stored in the map data storing means 4, and processing of combining the external shapes of buildings is performed. This combination processing is similar to operations of the building external shape information comparing/combining means 7 in the above described fourth embodiment of the present invention.

Also, by the DEM data automatically correcting means 3, the final building external shape information obtained by processing as described above is used to correct automatically the three-dimensional data in the same fashion as the first embodiment of the present invention. The DEM data storing means 8 stores the three-dimensional data corrected by a method described above. When a satellite image obtained by photographing the same point at a different time is processed, the DEM data comparing means 9 reads the past DEM data from the DEM data storing means 8, and compares the DEM data with the newly obtained three-dimensional data.

Figure 37:
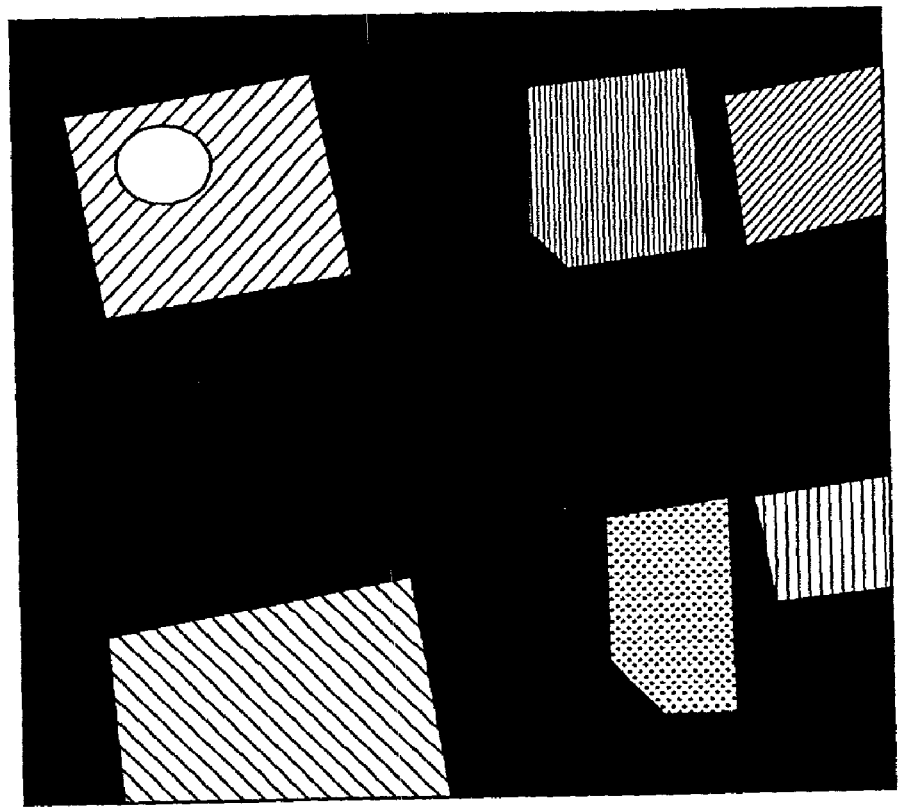
FIG. 37 illustrates processing of comparing DEM data by DEM data comparing means in FIG. 31.
Figure 38:
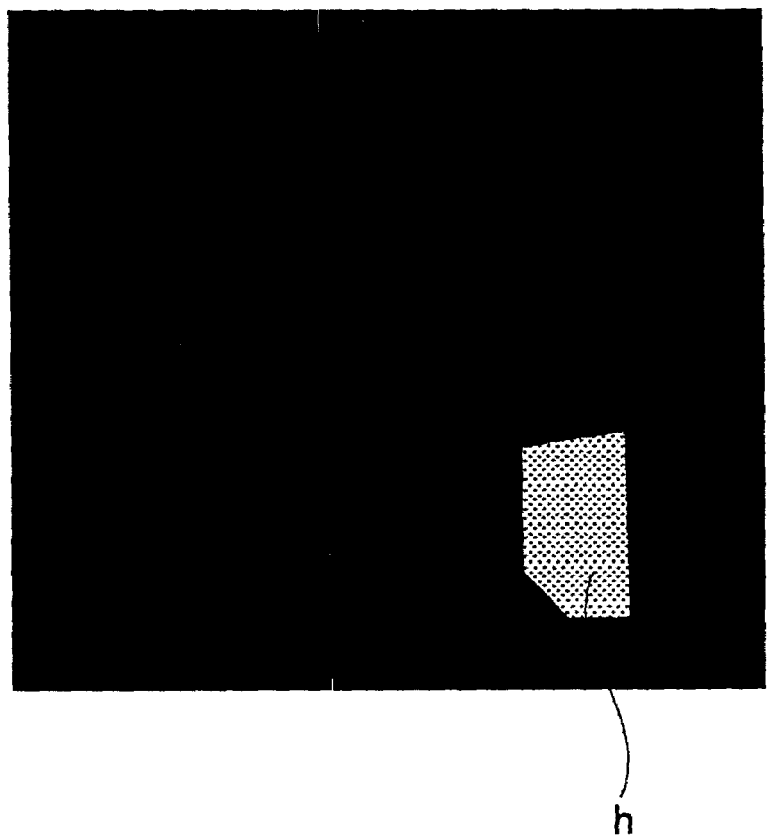
FIG. 38 illustrates processing of comparing DEM data by DEM data comparing means in FIG. 31.
Figure 39:
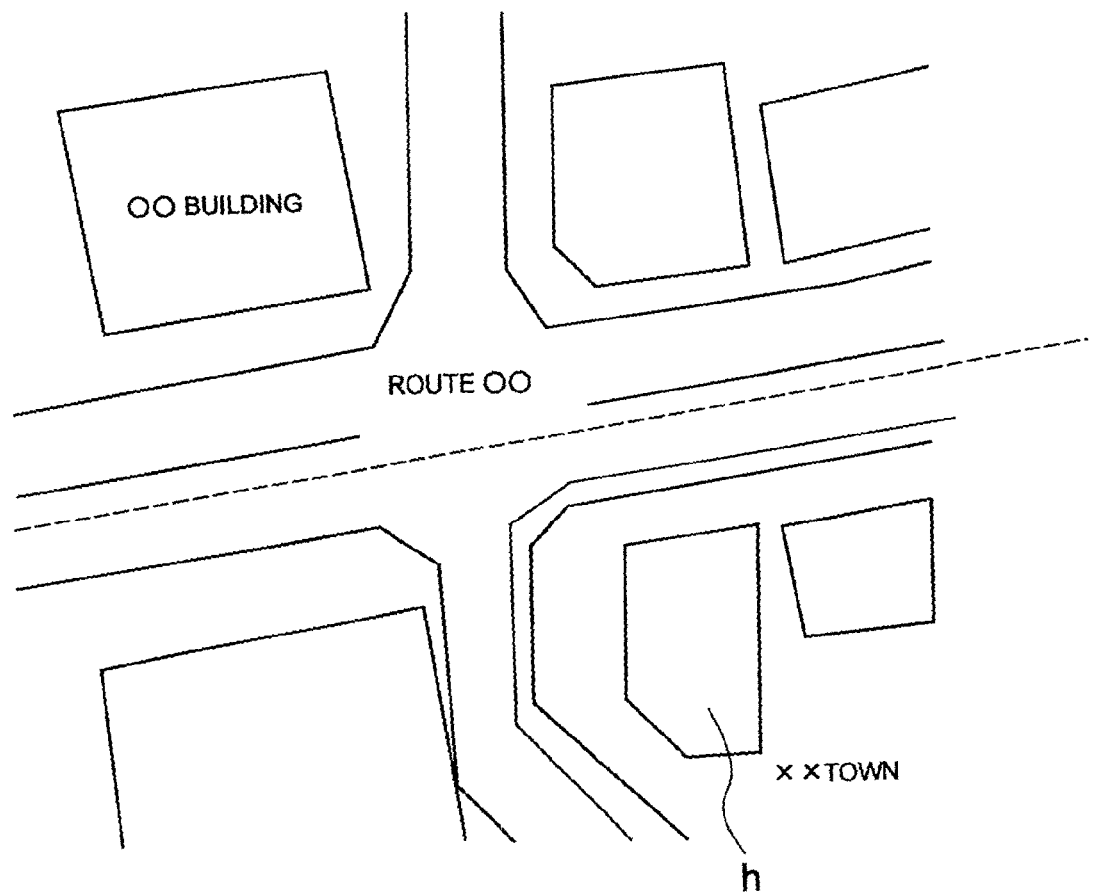
FIG. 39 shows map data modified according to the sixth embodiment of the present invention.

FIGS. 34 to 38 illustrate DEM data comparison processing by the DEM data comparing means 9 in FIG. 31, and FIG. 39 shows map data modified according to the sixth embodiment of the present invention. Processing of modifying map data according to the six embodiment of the present invention will be described referring to the FIG. 30 and FIGS. 34 to 39.

Figure 34:
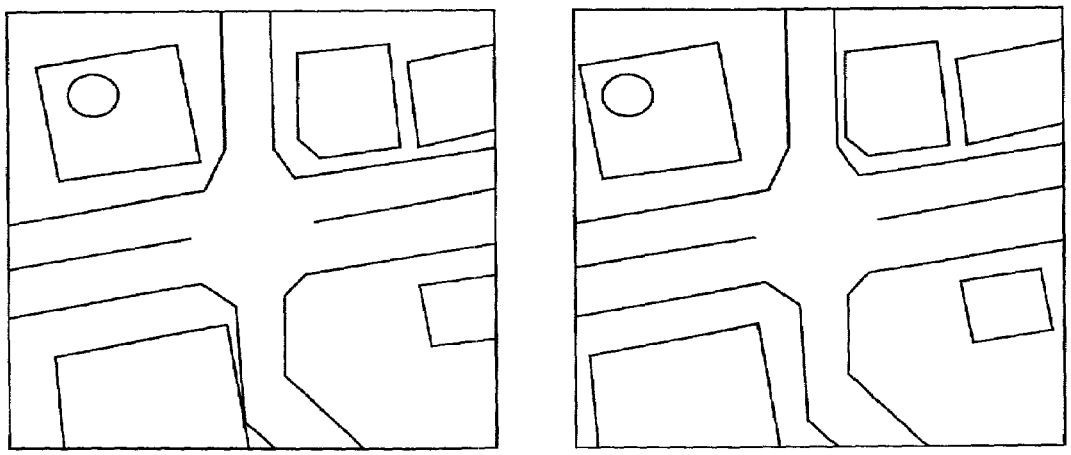
FIG. 34 illustrates processing of comparing DEM data by DEM data comparing means in FIG. 31.

FIG. 30 shows an example of the map data stored in the map data storing means 4, and FIG. 34 shows an example of the satellite stereo images obtained by photographing the surroundings of the point corresponding to this map data at a time in the past. The DEM data as shown in FIG. 35, obtained in the DEM data automatically correcting means 3 by the above described processing for FIG. 34 is stored in the DEM data storing means 8 together with information of date and time when they were photographed for the image.

On the other hand, an example of the satellite stereo images obtained by newly photographing the surroundings of the same point is shown in FIG. 36. New buildings that have not existed at a previous time and are not imaged in FIG. 34 are imaged as buildings h and i in FIG. 36. When the satellite stereo images are stored in the satellite image storing means 1, and the three-dimensional data is calculated by the above described method as in the case of the past satellite images shown in FIG. 34, and is corrected automatically, the DEM data as shown in FIG. 37 is newly obtained as output from the DEM data automatically correcting means 3.

The obtained DEM data is stored in the DEM data storing means 8 together with photographing time information of the satellite images, and is given to the DEM data comparing means 9. The DEM data comparing means 9 reads the DEM data in the same point in the past as shown in FIG. 35, stored previously in the DEM data storing means 8, and superimposes the DEM data on the newly obtained DEM data as shown in FIG. 37 to determine differential data.

Figure 35:
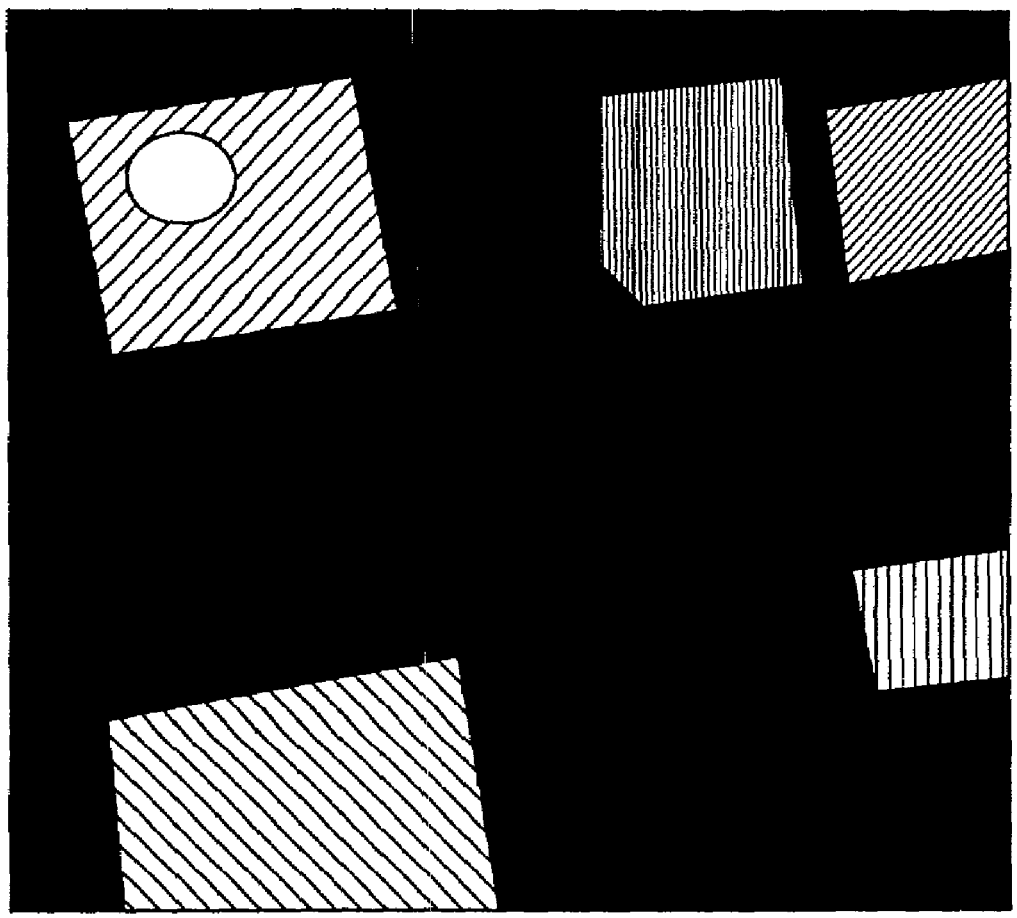
FIG. 35 illustrates processing of comparing DEM data by DEM data comparing means in FIG. 31.

For example, according to differences between the DEM data in FIGS. 35 and 37, the differential data as shown in FIG. 38 is obtained. For buildings imaged in the both images, similar height information is obtained in each DEM data, and therefore a value almost equal to 0 is given as the difference, but buildings that did not exist in the past image are obtained as areas having differential values such as the building h shown in FIG. 38.

Similarly, for buildings that existed in the past image but have been lost due to demolition and the like, and buildings of which shapes and heights have been changed due to reconstruction, corresponding differential areas are obtained.

Binarization/outline extraction is carried out from the obtained differential areas, whereby outline information for changed buildings is obtained. Up to this point, detailed DEM data comparison processing carried out by the DEM data comparing means 9 has been described.

The map data modifying means 10 modifies the map data stored in the map data storing means 4, in accordance with differential information obtained through DEM data comparison processing by the above described DEM data comparing means 9. The result of modifying the map data in FIG. 30 based on the building outline information obtained from the building h shown in FIG. 38 is shown in FIG. 39. It corresponds to a portion with the building h added by the map data modifying means 10 in FIG. 39. The above operations are the process operations according to the sixth embodiment of the present invention.

Figure 40:
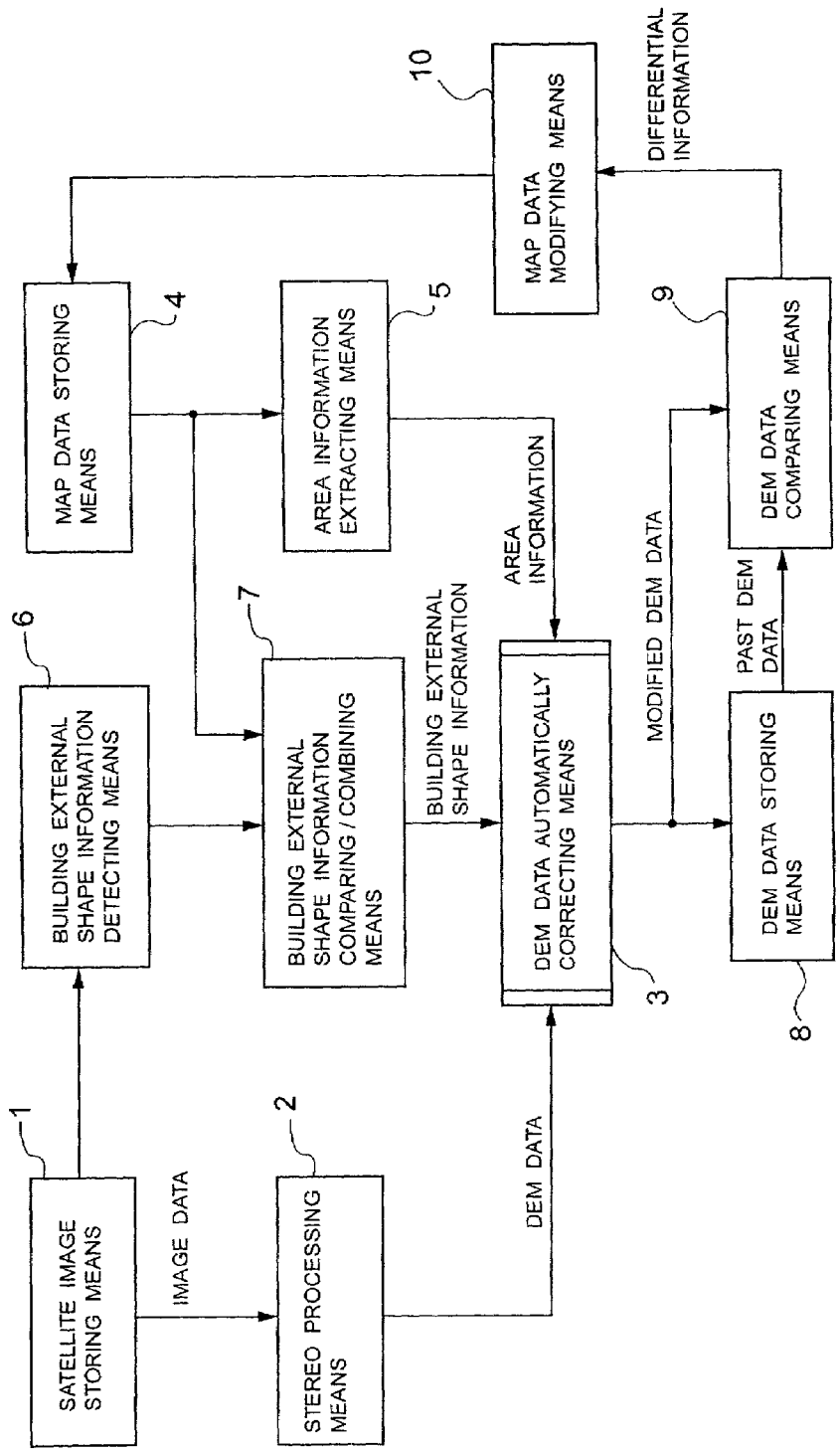
FIG. 40 is a block diagram showing the configuration of the stereo image processing apparatus according to the seventh embodiment of the present invention.

FIG. 40 is a block diagram showing the configuration of the stereo image processing apparatus according to the seventh embodiment of the present invention. In FIG. 40, the stereo image processing apparatus according to the seventh embodiment of the present invention comprises satellite image storing means 1, stereo processing means 2, DEM data automatically correcting means 3, map data storing means 4, area information extracting means 5, building external shape information detecting means 6, building external shape information comparing/combining means 7, DEM data storing means 8, DEM data comparing means 9 and map data modifying means 10.

The satellite image storing means 1 stores satellite image data. The stereo processing means 2 subjects the satellite image data obtained from the satellite image storing means 1 to stereo matching processing to generate three-dimensional data. The DEM data automatically correcting means 3 automatically corrects erroneous data to be corrected such as noises and losses in the three-dimensional data obtained from the stereo processing means 2, by using information of external shape of buildings and the like obtained separately from the building external shape information comparing/combining means 7.

The map data storing means 4 provides map data such as the external shapes of buildings. The area information extracting means 5 extracts area information such as land use on the map of roads/railroads/rivers/sea and the like from the map data. The building external shape information detecting means 6 analyzes the satellite image stored in the satellite image storing means 1 to extract information of the external shape of buildings. The building external shape information comparing/combining means 7 compares and combines the information of the external shape of buildings of the map data provided from the map data storing means 4 with the information of the external shape of buildings extracted by the building external shape information detecting means 6.

The DEM data storing means 8 stores modified three-dimensional data outputted from the DEM data automatically correcting means 3. The DEM data comparing means 9 compares the three-dimensional data previously stored in the DEM data storing means 8 with the modified three-dimensional data outputted from the DEM data automatically correcting means 3. The map data modifying means 10 modifies the map data stored in the map data storing means 4, based on differential information of the past three dimensional data and current three-dimensional data obtained by the DEM data comparing means 9.

The DEM data automatically correcting means 3 in the seventh embodiment of the present invention is similar in configuration to the DEM data automatically correcting means 3 in the second embodiment of the present invention shown in FIG. 17 except that information of external shape of buildings is inputted from the building external shape information comparing/combining means 7, description of its configuration is not presented here.

Figure 42A:
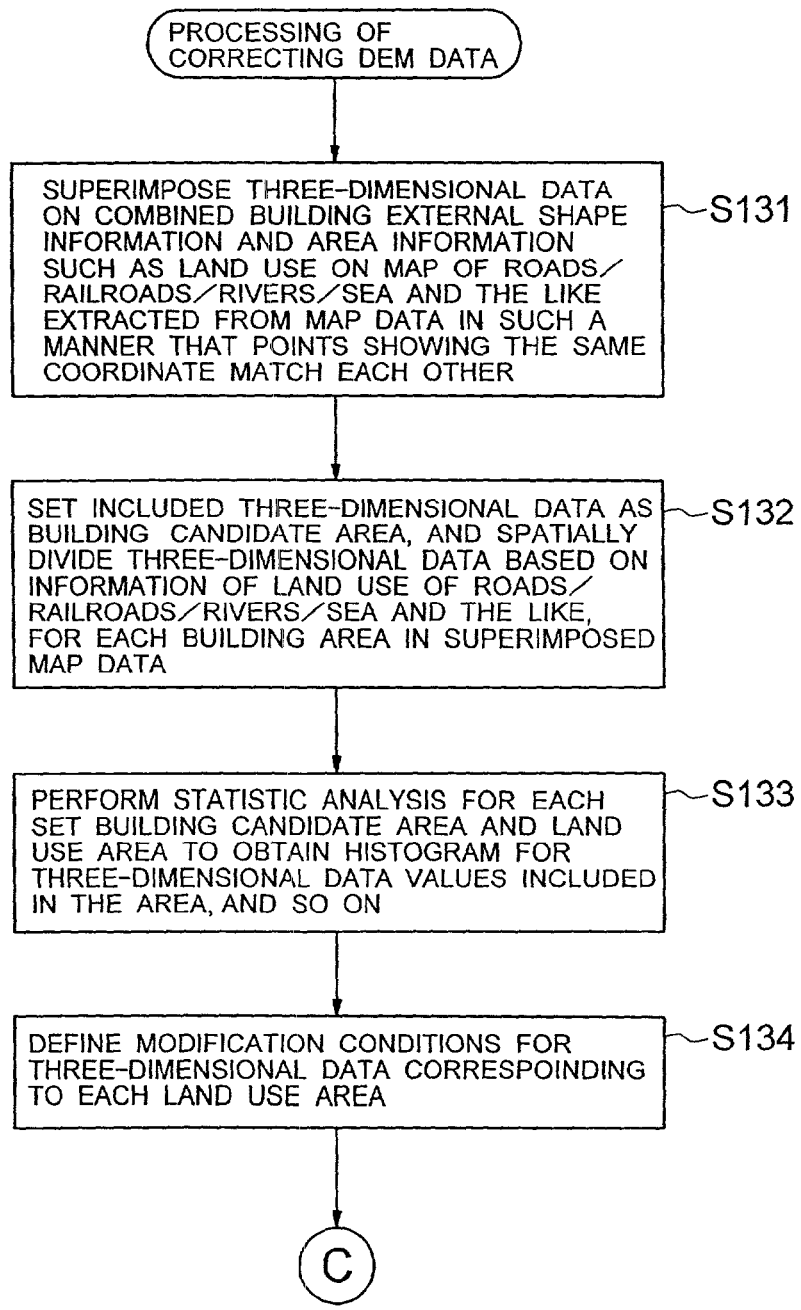
FIGS. 42A and 42B are flowcharts showing operations of DEM data automatically correcting means in FIG. 40.
Figure 42B:
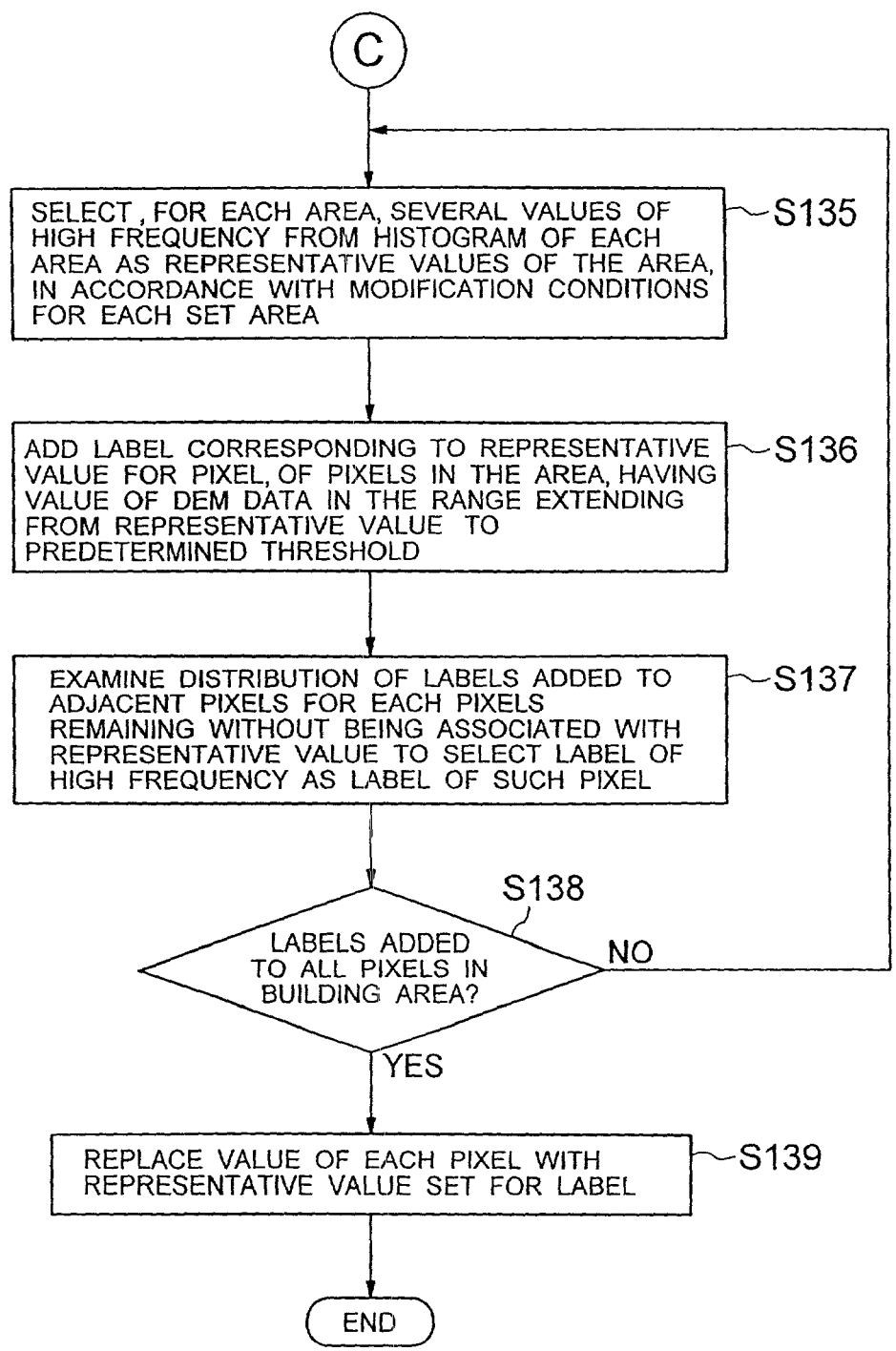

FIG. 41 is a flowchart showing operations of the stereo image processing apparatus according to the seventh embodiment of the present invention, and FIG. 42 is a flowchart showing operations of the DEM data automatically correcting means 3 in FIG. 40. Operations of the stereo image processing apparatus according to the seventh embodiment of the present invention will be described referring to these FIGS. 40 to 42.

First, a plurality of images obtained by photographing the same point on the ground from different viewpoints from the satellite, namely satellite stereo images are stored in the satellite image storing means 1 (step S121 in FIG. 41), and those satellite stereo images are given to the stereo processing means 2 and the building external shape information detecting means 6.

The stereo processing means 2 automatically subjects the obtained stereo images to stereo matching processing to generate the three-dimensional data showing geographic features around the photographed point (step S122 in FIG. 41). Also in this embodiment, no limits are imposed on methodologies for use in the stereo matching processing as in the case of the first embodiment of the present invention.

The building external shape information detecting means 6 analyzes the obtained satellite stereo images, and extracts vector information showing the external shape for the photographed building (step S123 in FIG. 41). Specifically, in the building external shape information detecting means 6, groups composed mainly of lines such as rectangles, among closed curve groups obtained by binarizing results of edge detection for the image and sublinearizing the same to perform coupling processing, are selected as the information of the external shape of buildings.

The building external shape information comparing/combining means 7 performs processing of comparing and combining the building external shape information extracted by the building external shape information detecting means 6 with the building external shape information included in the map data stored in the map data storing means 4 (step S124 in FIG. 41). Since this combination processing is similar to that of the above described fourth embodiment of the present invention, description thereof is not presented here.

For the three-dimensional data obtained by the stereo matching processing, the DEM data automatically correcting means 3 uses in combination the area information such as land use on the map of roads/railroads/rivers/sea and the like extracted from the map data by the area information extracting means 5 and the combined information of the external shape of buildings obtained from the building external shape information comparing/combining means 7 to correct automatically erroneous data in the three-dimensional data (step S125 in FIG. 41).

In the DEM data automatically correcting means 3, the registration means 31 superimposes the three-dimensional data on the area information such as land use on the map of roads/railroads/rivers/sea and the like extracted from the map data by the area information extracting means 5 and the information of the external shape of buildings combined by the building external shape information comparing/combining means 7 (step S131 in FIG. 42).

The area dividing means 36 sets as a building candidate area the three-dimensional data included inside for each building area in the superimposed map data, and spatially divides the tree-dimensional data based on area information of roads/railroads/rivers/sea and the like obtained from the area information extracting means 5 (step S132 in FIG. 42). Since the division process by the area dividing means 36 is similar to that of the above described second embodiment of the present invention, the description thereof is not presented here.

For each area set by the area dividing means 36, the in-area histogram analysis means 33 performs statistic analysis to obtain a histogram, and so on for three-dimensional data values included in the area (step S133 in FIG. 42). The modification condition setting means 35 defines modification conditions for the three-dimensional data corresponding to area information of the above described each land uses (step S134 in FIG. 42). Since the setting of modification conditions of three-dimensional data by the modification condition setting means 35 is similar to that of the above described second embodiment of the present invention, description thereof is not presented here.

For each area, the DEM data modifying means 34 selects several values exhibiting high frequency in accordance with the modification conditions for each area set in the modification condition setting means 35, and replaces those values of selected points with the value of highest frequency in the three-dimensional data near those selected points in the three-dimensional data within the area to modify the three-dimensional data.

That is, for each area, the DEM data modifying means 34 selects several values of high frequency from the histogram of each area as a representative value of the area in accordance with modification conditions for each set area (step S135 in FIG. 42), and adds labels corresponding to the representative value for pixels having values of the DEM data in the range extending from the representative value to a predetermined threshold, of respective pixels in the area (step S136 in FIG. 42).

Thereafter, for each pixel remaining without being associated with the representative value, the DEM data modifying means 34 examines the distribution of the labels added to nearby pixels, and selects a label of high frequency as a label of the pixel (step S137 in FIG. 42). When labels are determined for all the pixels in the building area (step S138 in FIG. 42), the DEM data modifying means 34 replaces the value of each pixel with the representative value set for the label (step S139 in FIG. 42). This processing of replacement of representative values by the DEM data modifying means 34 is similar to that described above using FIGS. 11 to 15.

The DEM data storing means 8 stores three-dimensional data obtained as described above (step S126 in FIG. 41), and when processing is performed for a satellite image obtained by photographing the same point at a different time, the DEM data comparing means 9 reads its three-dimensional data from the DEM data storing means 8, and compares the three-dimensional data with the newly obtained three-dimensional data (step S127 in FIG. 41).

Specifically, for example, buildings and the like that did not exist at a time point in the past when a picture was taken for the satellite image, but are photographed in a new satellite image are detected by the building external shape information detecting means 6, and are recorded as buildings by the building external shape information comparing/combining means 7, and thus they exist in the three-dimensional data but do not exist in the map data.

The map data modifying means 10 modifies the map data stored in the map data storing means 4 in accordance with differential information obtained by examining areas of which situations have been changed (steps S128 and S129 in FIG. 41).

As described above, since the three-dimensional data is all obtained automatically on the computer by the stereo image processing means 2, the DEM data automatically correcting means 3, the building external shape information detecting means 6 and the building external shape information comparing/combining means 7, operations by operators are not required.

Also, as in the case of the above described fourth embodiment of the present invention, since the building external shape information in the map data and the building external shape information obtained by analyzing the satellite images are used in combination, the three-dimensional data more accurate than those by conventional methods can be obtained even when information described in the map data is different from the satellite images, and influence of errors when the satellite images are analyzed can be reduced because a higher priority is given to the map data in the common area.

Furthermore, since three-dimensional data modification conditions corresponding to area information in the map data are set to correct erroneous data included in the three-dimensional data, the three-dimensional data more accurate than those by conventional methods can be obtained not only in building areas but in other areas. In addition, since the map data is updated from the differential information with the past result of extraction of the three-dimensional data, the embodiment can be applied even when new the map data cannot be obtained for an area in which the satellite image is formed, and the updated map data itself can be used for creation of maps, geographic information systems and the like.

Specific operations according to the seventh embodiment of the present invention will now be described. The seventh embodiment of the present invention is similar to the above described first embodiment of the present invention in that the satellite stereo images as described above previously stored in the satellite image storing means 1 are first given to the stereo processing means 2, and the stereo matching processing is automatically performed on the computer in the same fashion as a conventional method. Also, it is similar to the above described first embodiment of the present invention in that images of three-dimensional data as shown in FIG. 6 are obtained by using stereo matching by the area correlation method.

The satellite stereo images stored in the satellite image storing means 1 are further analyzed by the building external shape information detecting means 6, and for the photographed building, vector information showing its external shape is extracted by a method similar to that of the above described third embodiment of the present invention. The obtained vector information is given to the building external shape information comparing/combining means 7 together with the data showing the external shapes of buildings in the map stored in the map data storing means 4, and processing of combining information of the external shapes of buildings is performed. This combination processing is similar to operations of the building external shape information comparing/combining means 7 in the above described fourth embodiment of the present invention.

Also, area information of roads, forests, water areas and the like is extracted by the area information extracting means 5 from the map data as shown in FIG. 20, included in the map data storing means 4, and is given to the DEM data automatically correcting means 3 together with the building external shape information obtained with the above described processing, and processing of correcting the three-dimensional data is automatically performed in the same fashion as the above described second embodiment of the present invention.

The DEM data storing means 8 stores the three-dimensional data obtained as described above. When a satellite image with the same point imaged at a different time is processed in the same manner as that of the sixth embodiment of the present invention, the DEM data comparing means 9 reads the past DEM data from the DEM data storing means 8, and compares the data with the newly obtained three-dimensional data.

The map data modifying means 10 modifies the map data stored in the map data storing means 4 by a method similar to that of the sixth embodiment of the present invention, in accordance with differential information obtained through processing of comparing the DEM data by the above described DEM data comparing means 9. The above operations are the process operations according to the seventh embodiment of the present invention.

FIG. 43 is a block diagram showing the configuration of the stereo image processing apparatus according to the eighth embodiment of the present invention. In FIG. 43, the stereo image processing apparatus according to the eighth embodiment of the present invention comprises an input device 11, a data processing device 12, a storage device 13, a recording medium 14 and an output device 15.

A program for realizing the above described stereo image processing apparatus is recorded in the recording medium 14. Furthermore, as the recording medium 14, a magnetic disk, a semiconductor memory, a CD-ROM and other recording media can be used.

The program for realizing the above described stereo image processing apparatus is read in the data processing device 12 from the recording medium 14, and controls operations of the data processing device 12, secures areas for the satellite image storing means 1 and the map data storing means 4 in the storage device 13, makes the data processing device 12 generate at least the DEM data automatically correcting means in the first to fifth embodiments of the present invention, and controls operations thereof. The data processing device 12 carries out the processing same as that by the stereo image processing apparatus according to the first to fifth embodiments of the present invention, by controlling the program for realizing the stereo image processing apparatus. Also, the program for realizing the above described stereo image processing apparatus is read in the data processing device 12 from the recording medium 14, and controls operations of the data processing device 12, secures areas for the satellite image storing means 1, the map data storing means 4 and the DEM data storing means 8 in the storage device 13, makes the data processing device 12 generate at least the DEM data automatically correcting means in the sixth and seventh embodiments of the present invention, and controls operations thereof. The data processing device 12 carries out the processing same as that by the stereo image processing apparatus according to the sixth and seventh embodiments of the present invention, by controlling the program for realizing the stereo image processing apparatus.

Process operations using the satellite images have been described for the aforesaid first to eighth embodiments of the present invention, but a pair of stereo images obtained from aerial photographs can also be used to perform image processing in the same fashion as the first to eighth embodiments of the present invention. In this case, usually, points at the ground level are consecutively photographed from an aircraft flying in a certain direction at a constant speed so that areas overlapping among images are obtained, and those images are stored in the satellite image storing means 1 with each of the overlapping areas considered as a stereo image.

However, unlike the satellite image obtained from photographing the object to be imaged from a high altitude point by using a line sensor, the aerial photograph is obtained by digitalized with an apparatus such as a scanner an original silver salt photograph obtained by photographing the object by a camera from a relatively law altitude point, thus entailing errors at the time of photographing the object, deformations due to lens aberration and central projection, errors at the time of digitalizing photographs, and the like.

For camera lens deformation, in the aerial photograph, data corrected on the basis of parameters for the camera lens at the time of photographing the object can be normally obtained, but mismatch occurs due to other deformations at the time of map registration, and hence the image should be subjected to transformation into a coordinate system used in the map data to perform geometric correction.

In the present invention, the image data is superimposed on the map data in such a manner that points showing the same coordinates of the both data correspond to each other, in the registration means 31 included in the DEM data automatically correcting means 3, but in the case where the aerial photograph is used instead of the satellite image, the aerial photograph is first subjected to transformation into a coordinate system for use in the map data, and therefore a plurality of corresponding standard points called GCE (Ground Control Point) are selected manually from each of the image data and the map data.

Points such as intersections of roads and confluences of water areas that can easily be identified are selected as those standard points, a geometric transformation factor of affine transformation or two or more order polynominal transformation is determined by the least square method, and the aerial photograph and the DEM data image are subjected to transformation to correspond to the map data.

By changing the operations of the registration means 31 as described above, the process operations according to the present invention can be achieved also for the aerial photograph, by a method similar to that of each of the first to eighth embodiments of the present invention.

In this way, all the processing is automatically performed on the computer, including processing of correcting the three-dimensional data obtained through the stereo processing, whereby the accurate three-dimensional data can be obtained from the satellite stereo image and the aerial stereo image with no operations of the operator.

Also, the building external shape information obtained from the map data or the satellite image by analyzing the same is used to correct the three-dimensional data, whereby sufficiently accurate three-dimensional data can be obtained even for complicated objects such as buildings in urban areas.

In addition, land use and area information included in the map data is used to correct the three-dimensional data while changing conditions depending on each area, whereby the three-dimensional data more accurate than those by conventional methods can be obtained even in non-building areas.

In addition, the building external shape information obtained from the satellite image by analyzing the same is used to correct the three-dimensional data, whereby the three-dimensional data more accurate than those by conventional methods can be obtained even for images of areas of which the map data cannot be obtained.

The three-dimensional data and the new three-dimensional data obtained by the above described method are compared with each other, and information of difference between those data is extracted and incorporated in the map data, thereby making it possible to update the map data for the imaged area of the satellite image, and use the map data for creation of maps, geographic information systems and the like.

As described above, according to the present invention, the satellite image data obtained from satellite image storing means storing satellite image data is subjected to stereo matching processing to generate the three-dimensional data, and at least information of external shape of buildings obtained from the map data of map data storing means storing the map data including at least the information of external shape of buildings is used to correct automatically erroneous data to be corrected including at least noises and losses in the three-dimensional data, whereby sufficiently accurate three-dimensional data can be obtained from satellite stereo images and aerial stereo images automatically with no operations of operators and even for complicated objects such as buildings in urban areas.

What is claimed is:

1. A stereo image processing apparatus subjecting first image data obtained from a first flying object (airframe) during a first time period to stereo matching processing to generate first three-dimensional data and subjecting second image data obtained from a second flying object during a second time period different from said first time period to stereo matching processing to generate second three-dimensional data, comprising:

data correcting means for correcting erroneous data corrected including at least noises and losses in inputted three-dimensional data by using information of external shapes of buildings obtained from map data, said data correcting means inputting said first three-dimensional data to provide first modified three-dimensional data and inputting said second three-dimensional data to provide second modified three-dimensional data;

map data storing means for storing said map data;

data storing means for storing said first modified three-dimensional data;

data comparing means for comparing said first modified three-dimensional data stored in said data storing means with said second modified three-dimensional data; and map data modifying means for modifying said map data stored in said map data storing means based on differential information obtained from said data comparing means to provide modified two-dimensional map data.

2. The stereo image processing apparatus according to claim 1, wherein said data correcting means comprises:

registration means for superimposing said inputted three-dimensional data on said map data;

area data setting means for setting, for each building defining an area in the map data superimposed by said registration means, the inputted three-dimensional data included in the area as candidate three-dimensional data of each building;

in-area histogram analysis means for obtaining, in each area, statistic information from the candidate three-dimensional data included in the area; and data modifying means for modifying, based on the statistic information in each area obtained by said in-area histogram analysis means, the inputted three-dimensional data included in the area.

3. The stereo image processing apparatus according to claim 1, further comprising:

image storing means for storing said first image data.

4. The stereo image processing apparatus according to claim 1, wherein said first flying object is an artificial satellite, and said first image data is satellite image data obtained from said artificial satellite.

5. The stereo image processing apparatus according to claim 1, wherein said first flying object is an aircraft, and said first image data is aircraft image data obtained from said aircraft.

6. A method of processing first stereo images in which first image data obtained from a first flying object during a first time period is subjected to stereo matching processing to generate first three-dimensional data and processing second stereo images in which second image data obtained from a second flying object during a second time period different from said first time period is subjected to stereo matching processing to generate second three-dimensional data, comprising:

correcting first erroneous data including at least noises and losses in said first three-dimensional data by using information of external shapes of buildings obtained from map data to provide first modified three-dimensional data;

correcting second erroneous data including at least noises and losses in said second three-dimensional data by using said information of external shapes of buildings obtained from said map data to provide second modified three-dimensional data;

comparing said first modified three-dimensional data with said second modified three-dimensional data to provide differential information; and modifying said map data based on said differential information to provide modified two-dimensional map data.

7. The method according to claim 6, wherein said step of correcting first erroneous data comprises the steps of:

superimposing said first three-dimensional data on said map data;

setting, for each building defining an area in the superimposed map data, first three-dimensional data included in the area as candidate three-dimensional data of each building;

obtaining, for each area, statistic information from the candidate three-dimensional data included in the area; and modifying, based on the statistic information in said each area, the first three-dimensional data included in the area to provide first modified three-dimensional data.

8. The method according to claim 6, wherein said first image data is obtained from image storing means for storing the first image data.

9. The method according to claim 6, wherein said map data is obtained from map storing means for storing the map data.

10. The method according to claim 6, wherein said first flying object is an artificial satellite, and said first image data is satellite image data obtained from said artificial satellite.

11. The method according to claim 6, wherein said first flying object is an aircraft, and said first image data is aircraft image data obtained from said aircraft.

12. A recording medium in which a program for processing stereo images is recorded for making a computer carry out a process, the process comprising:

subjecting first image data obtained from a first flying object during a first time period to stereo matching processing to provide first three-dimensional data;

subjecting second image data obtained from a second flying object during a second time period different from said first time period to stereo matching processing to provide second three-dimensional data;

correcting first erroneous data including at least noises and losses in the first three-dimensional data by using at least information of external shapes of buildings obtained from map data to provide first modified three-dimensional data;

correcting second erroneous data including at least noises and losses in said second three-dimensional data by using said information of external shapes of buildings obtained from said map data to provide second modified three-dimensional data;

comparing said first modified three-dimensional data with said second modified three-dimensional data to provide differential information; and modifying said map data based on said differential information to provide modified two-dimensional map data.

13. The stereo image processing apparatus according to claim 2, further comprising:

image storing means for storing said first image data.

14. A method for correcting two-dimensional map data, comprising:

subjecting first image data obtained from a first flying object during a first time period to stereo matching processing to provide first three-dimensional data;

subjecting second image data obtained from a second flying object during a second time period different from the first time period to stereo matching processing to provide second three-dimensional data;

correcting the first three-dimensional data based on the two-dimensional map data to provide first modified three-dimensional data;

correcting the second three-dimensional data based on the two-dimensional map data to provide second modified three-dimensional data;

comparing the first modified three-dimensional data with the second modified three-dimensional data to provide differential information; and correcting the two-dimensional map data based on the differential information to provide modified two-dimensional map data.

15. The stereo image processing apparatus of claim 1, wherein said second flying object is the same as said first flying object.

16. The method of claim 6, wherein said second flying object is the same as said first flying object.

17. The recording medium of claim 12, wherein said second flying object is the same as said first flying object.

18. The method of claim 14, wherein said second flying object is the same as said first flying object.

* * * * *